(12) United States Patent
Takyo et al.

(10) Patent No.: US 8,841,875 B2
(45) Date of Patent: Sep. 23, 2014

(54) ELECTRONIC WATCH

(75) Inventors: Yu Takyo, Tokyo (JP); Toshiaki Fukushima, Saitama (JP); Akira Shiota, Saitama (JP); Toshinari Maeda, Saitama (JP); Nobuaki Suzuki, Tokyo (JP)

(73) Assignees: Citizen Holdings Co., Ltd., Tokyo (JP); Citizen Watch Co., Ltd, Tokyo (JP)

( * ) Notice: Subject to any disclaimer, the term of this patent is extended or adjusted under 35 U.S.C. 154(b) by 225 days.

(21) Appl. No.: 13/500,829

(22) PCT Filed: Oct. 6, 2010

(86) PCT No.: PCT/JP2010/067566
§ 371 (c)(1),
(2), (4) Date: Apr. 6, 2012

(87) PCT Pub. No.: WO2011/043389
PCT Pub. Date: Apr. 14, 2011

(65) Prior Publication Data
US 2012/0204640 A1 Aug. 16, 2012

(30) Foreign Application Priority Data
Oct. 7, 2009 (JP) ................................. 2009-233404

(51) Int. Cl.
*H02P 8/00* (2006.01)
*G04C 3/14* (2006.01)
*H02P 8/02* (2006.01)

(52) U.S. Cl.
CPC . *G04C 3/143* (2013.01); *H02P 8/02* (2013.01)
USPC ............... 318/696; 318/685; 368/85; 368/86; 368/87; 368/218; 368/219

(58) Field of Classification Search
CPC ................ H02P 8/22; H02P 8/14; H02P 5/50
USPC ......... 318/696, 685; 368/85, 86, 87, 218, 219
See application file for complete search history.

(56) References Cited

U.S. PATENT DOCUMENTS 4,241,433 A * 12/1980 Ueda et al. ...................... 368/76
4,460,282 A * 7/1984 Kanno ........................... 368/157
(Continued)

FOREIGN PATENT DOCUMENTS

JP 7-120567 5/1995
JP 8-33457 B 3/1996
(Continued)

OTHER PUBLICATIONS

International Search Report dated Jan. 11, 2011 in PCT/JP2010/067566.

*Primary Examiner* — Rita Leykin
(74) *Attorney, Agent, or Firm* — Sughrue Mion, PLLC

(57) ABSTRACT

Provided is an electronic watch capable of, even if an indicating hand having a large moment of inertia is used, accurately determining success and failure of rotation. The electronic watch detects rotation by using a first detection mode determination circuit (12) and a second detection mode determination circuit (13). In the electronic watch, a timing counter (14) for measuring a time after an output of a normal drive pulse is followed by a detection pulse selection circuit (151) provided as changing means for changing a width or a frequency of a detection pulse in accordance with an output time of the detection pulse. The detection pulse detects the rotation and simultaneously serves as an electromagnetic brake for a rotor (10). The electromagnetic brake for the rotor (10) is controlled by changing the width or the frequency of the detection pulse in a predetermined period, thereby achieving an accurate rotation detection. Alternatively, the setting of the width or the frequency of the detection pulse may be changed in accordance with a determination result in a first detection mode, an output voltage of a power supply, and a driving power of the normal drive pulse, instead of the output timing of the detection pulse.

14 Claims, 50 Drawing Sheets

(56) References Cited

U.S. PATENT DOCUMENTS

| | | | |
|---|---|---|---|
| 5,359,154 A * | 10/1994 | Tsukasa et al. | 177/145 |
| 5,878,004 A * | 3/1999 | Miyauchi et al. | 368/230 |
| 5,889,734 A * | 3/1999 | Sato | 368/64 |
| 5,933,392 A * | 8/1999 | Sato et al. | 368/157 |
| 6,194,862 B1 * | 2/2001 | Hara | 318/696 |
| 6,349,075 B1 * | 2/2002 | Miyauchi et al. | 368/230 |
| 6,946,813 B2 * | 9/2005 | Manaka | 318/685 |
| RE40,370 E * | 6/2008 | Sato et al. | 368/157 |
| 8,094,522 B2 * | 1/2012 | Satoh et al. | 368/80 |
| 2009/0238044 A1 | 9/2009 | Satoh et al. | |

FOREIGN PATENT DOCUMENTS

| | | |
|---|---|---|
| JP | 4165092 B | 8/2008 |
| WO | 2008004605 | 1/2008 |

\* cited by examiner

FIG.6
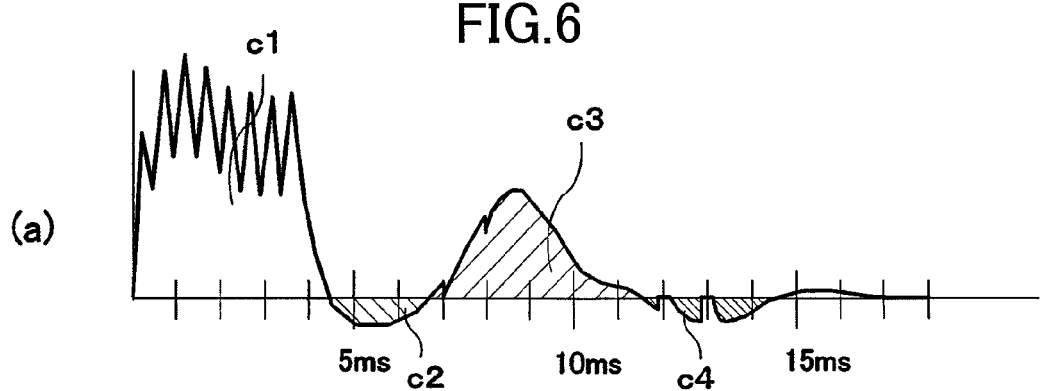
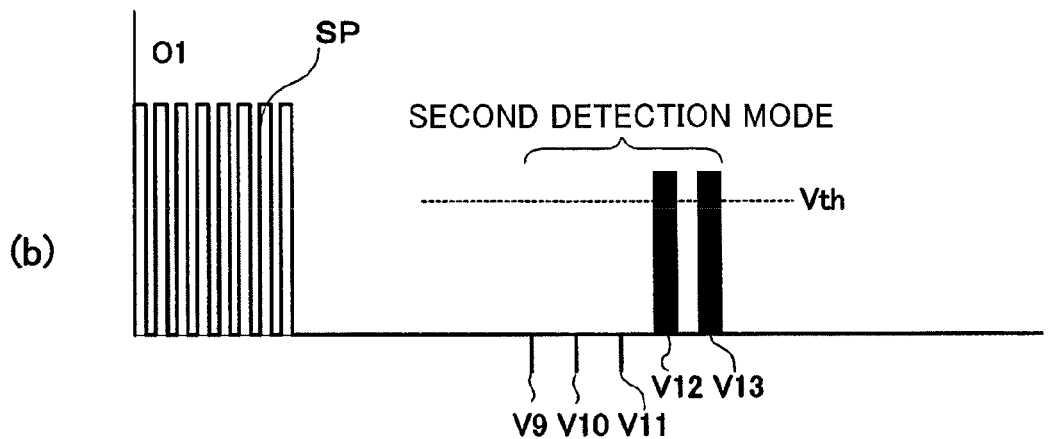
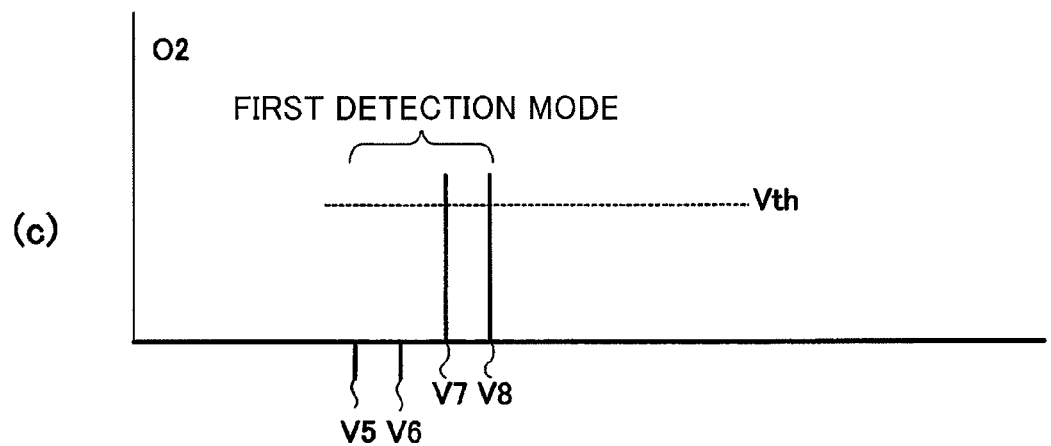

FIG.7
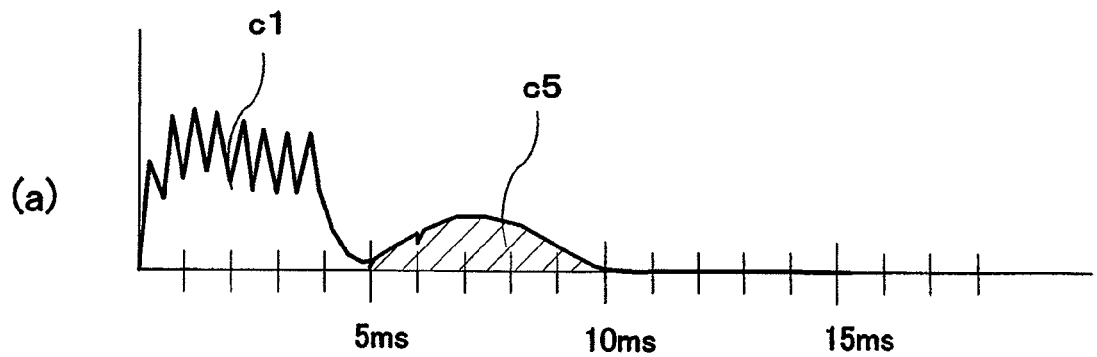
(a)
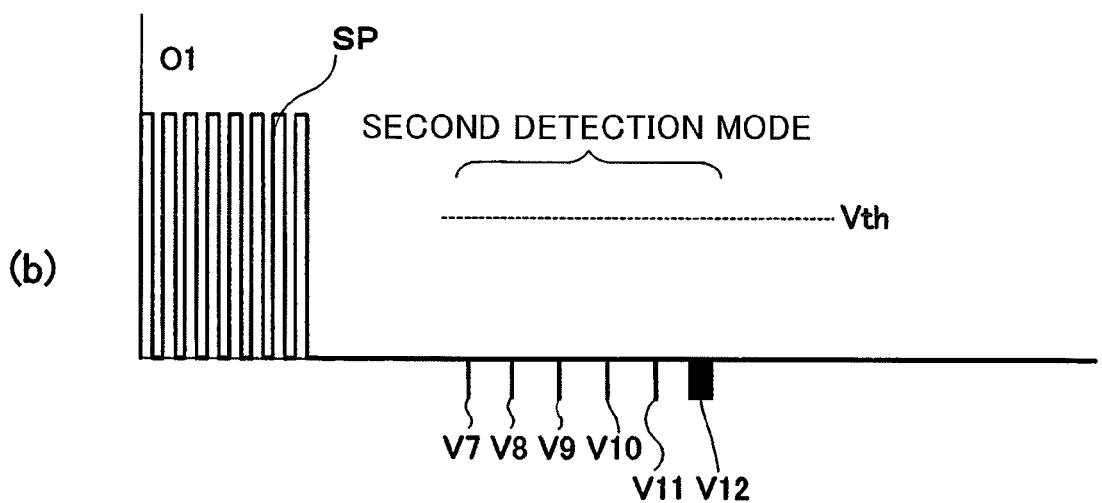
(b)
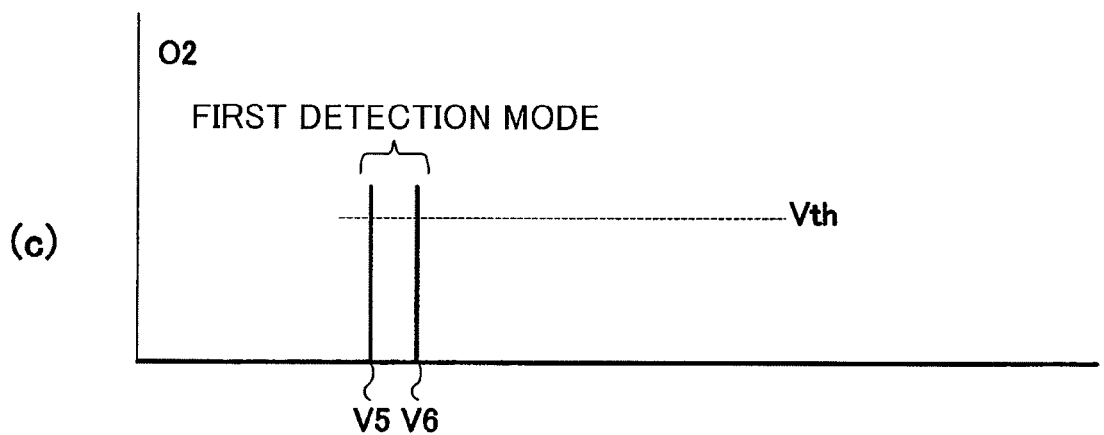
(c)

FIG.11
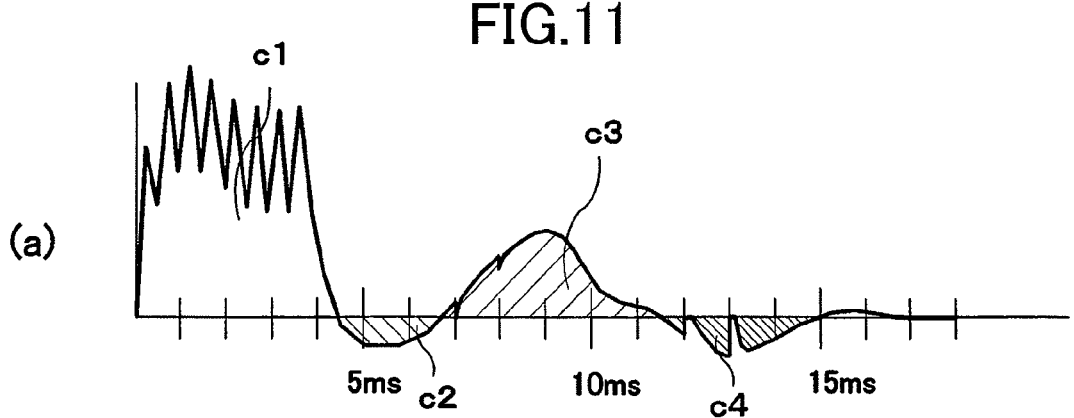
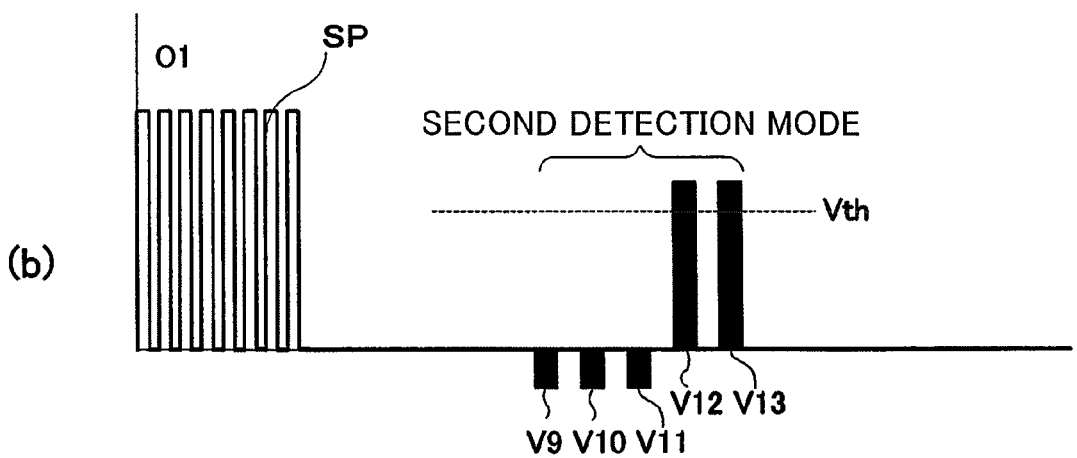
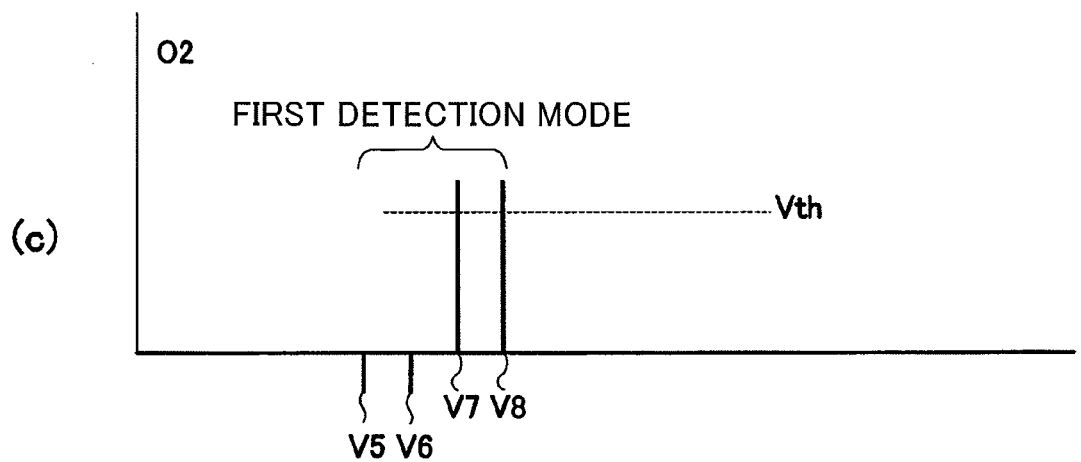

FIG.12
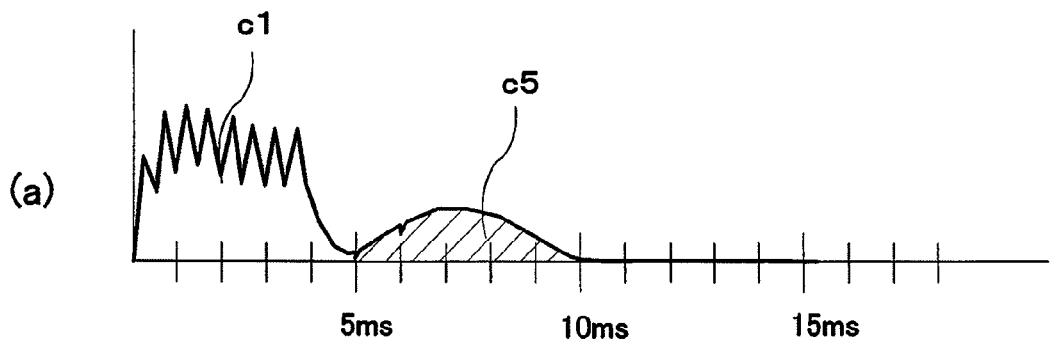
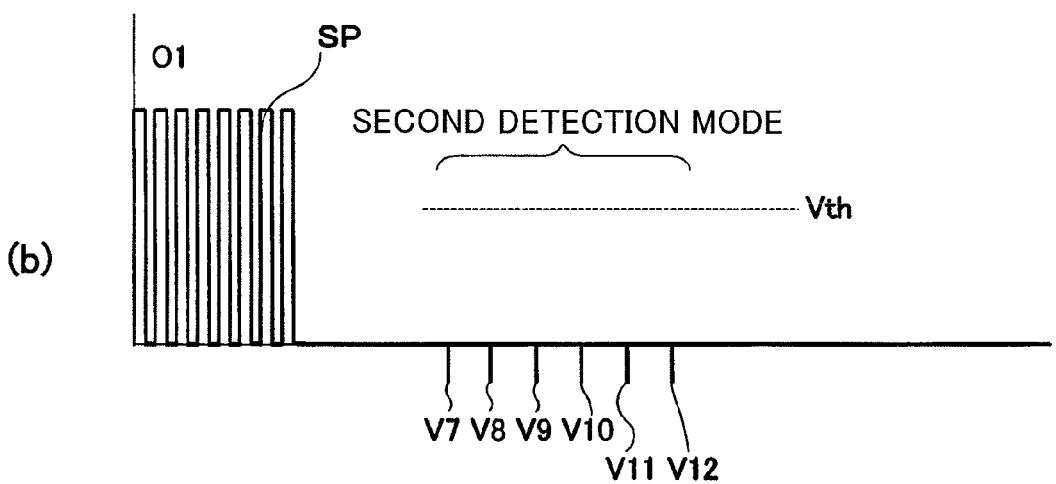
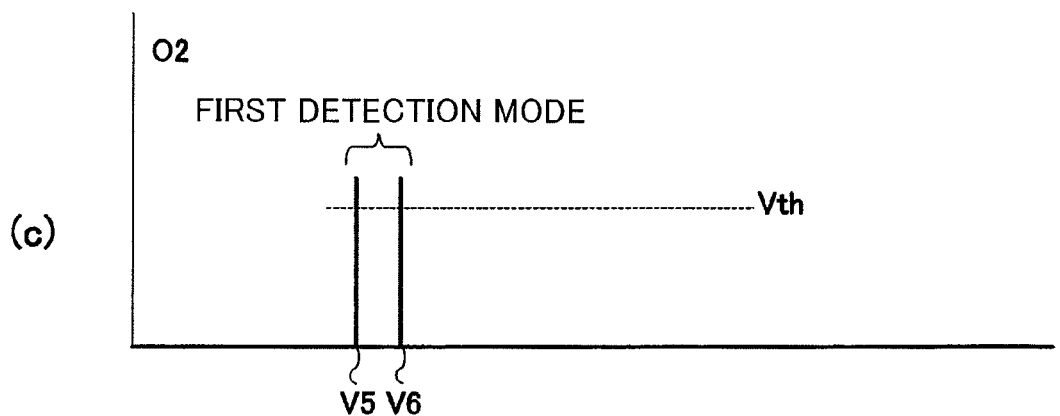

FIG. 16
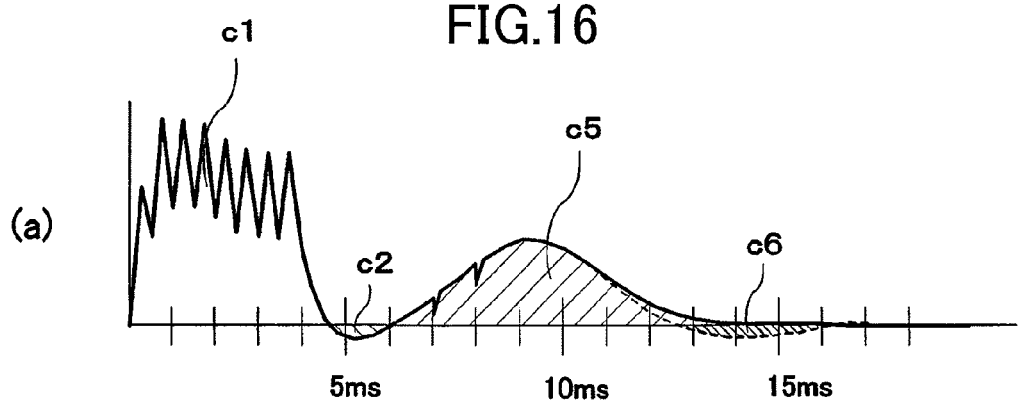
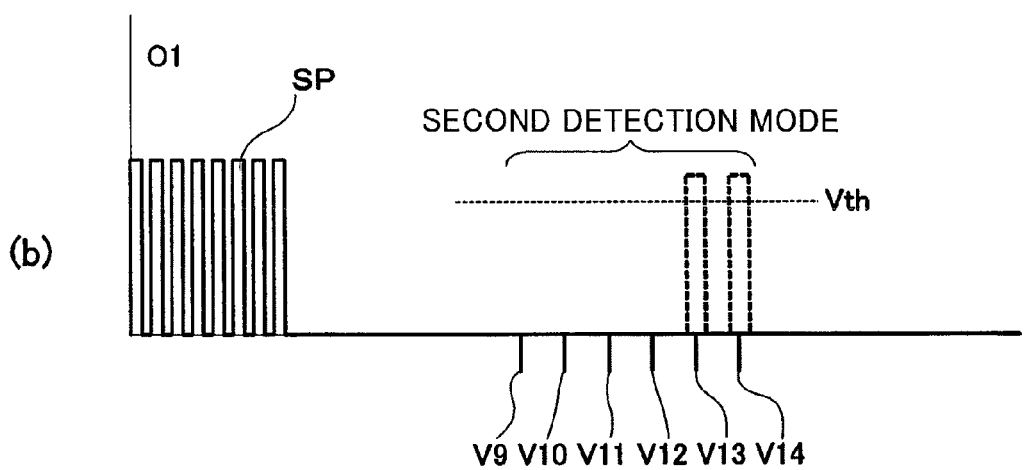
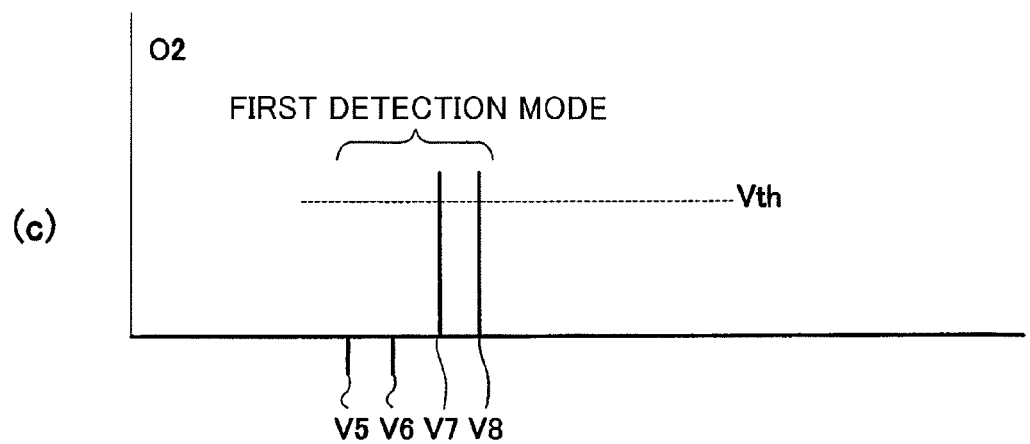

FIG.21
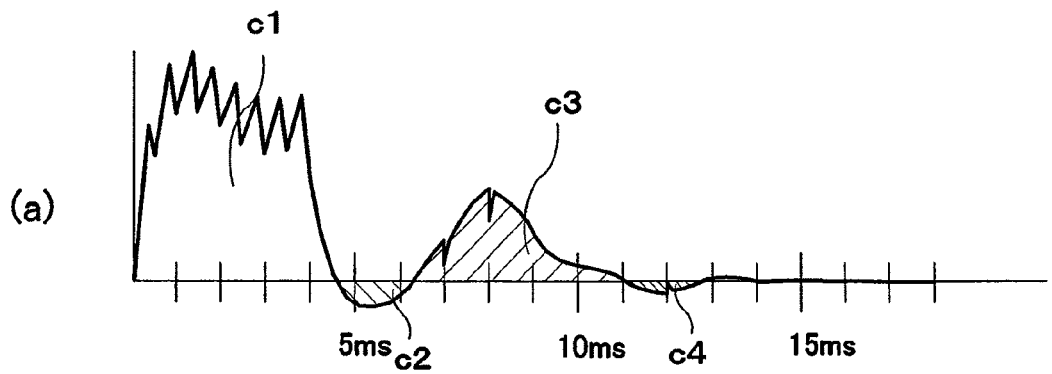
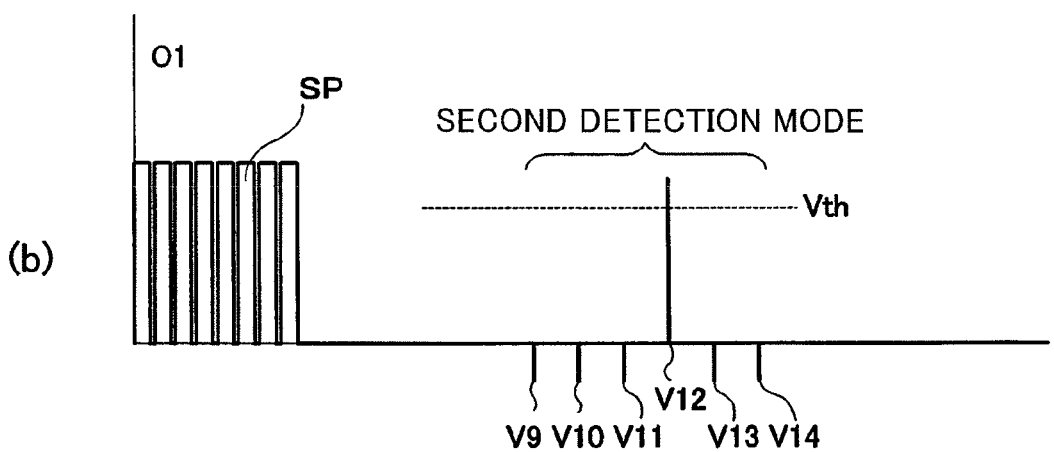
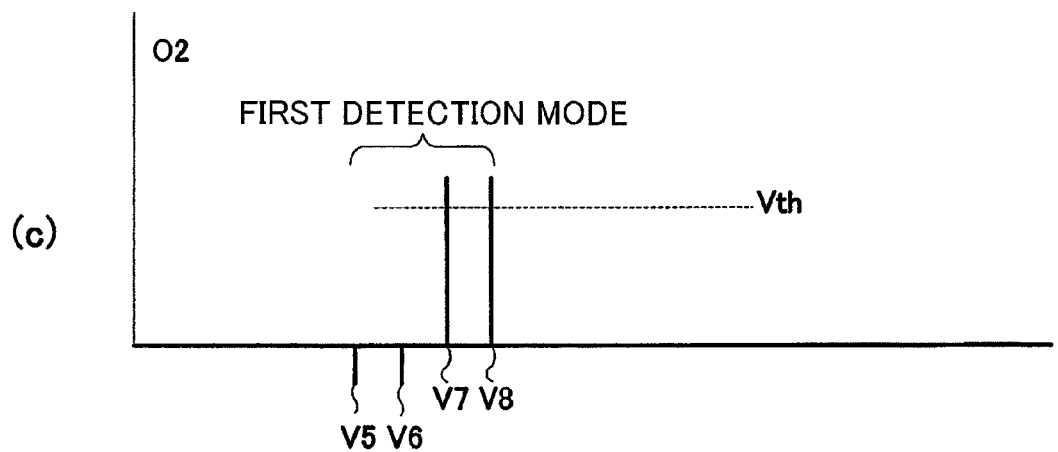

FIG.22
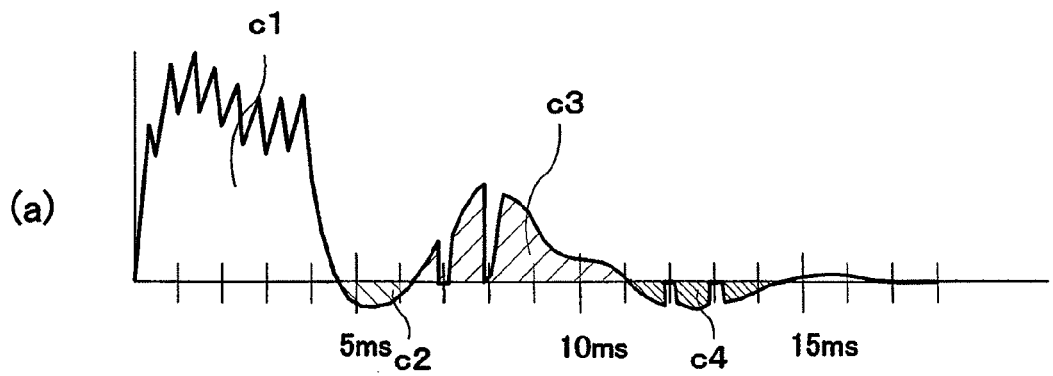
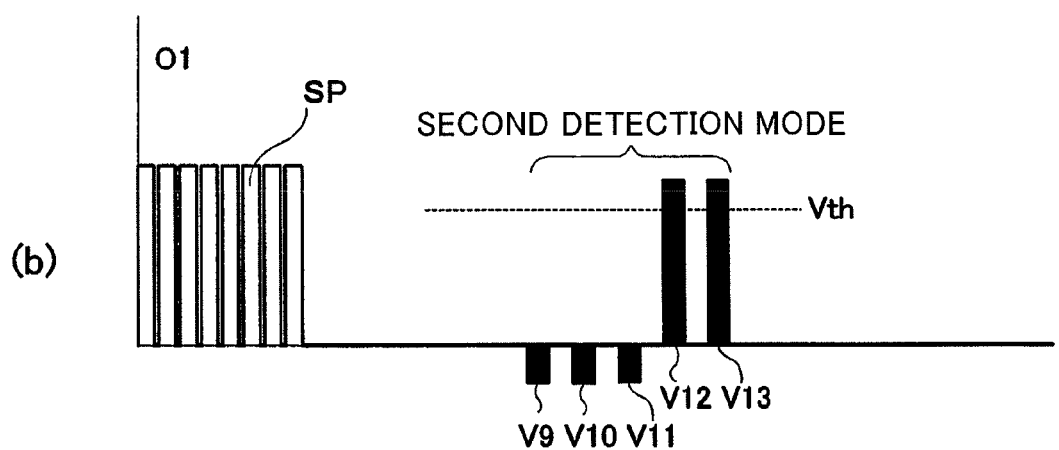
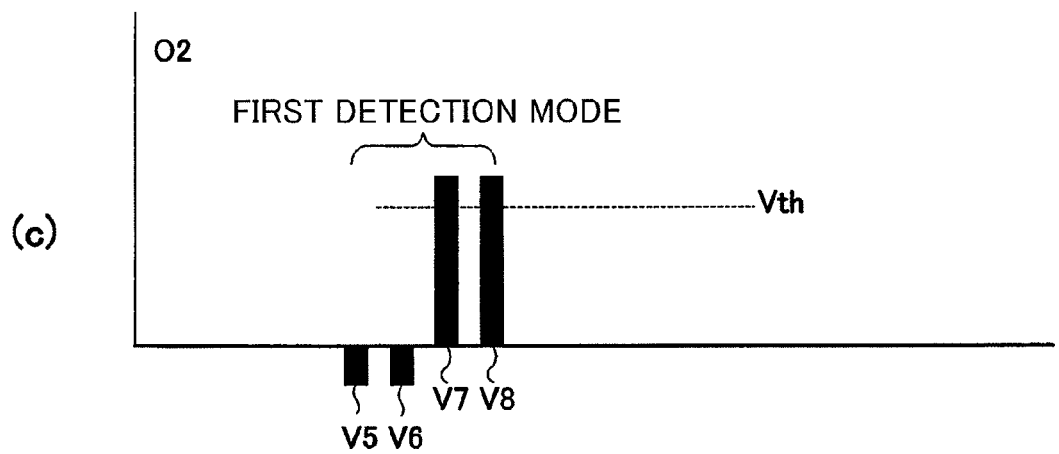

FIG. 25
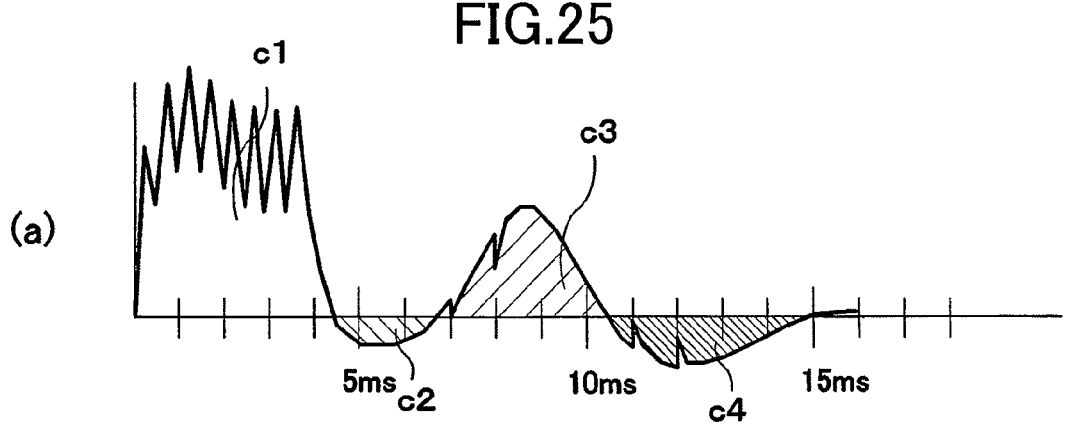
(a)
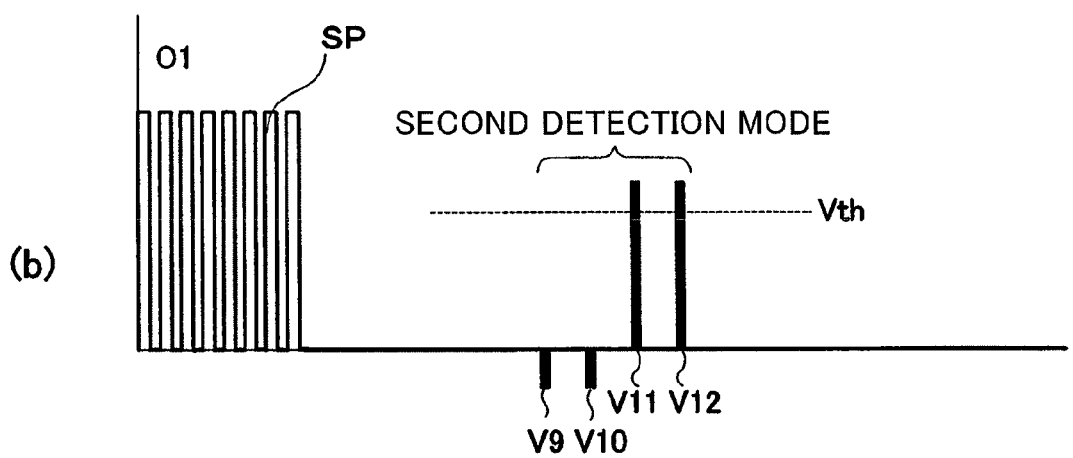
(b)
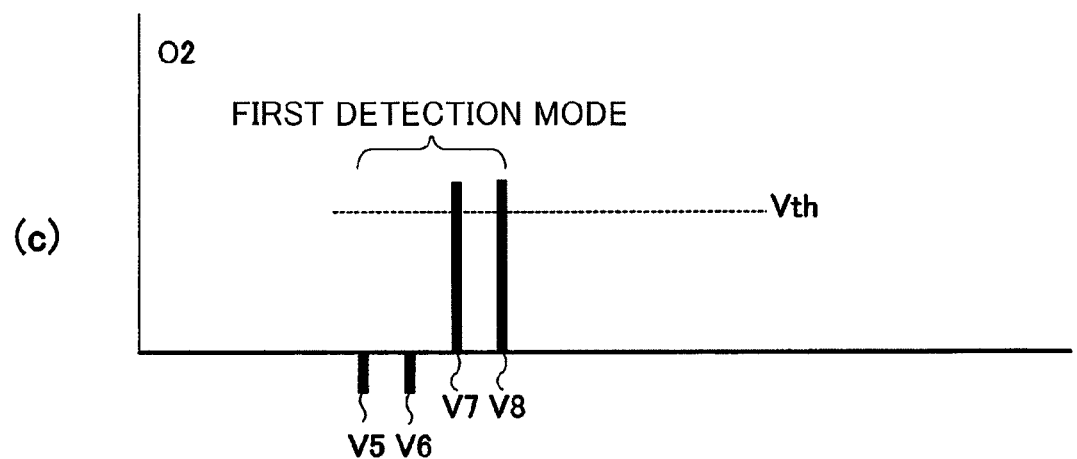
(c)

FIG.26
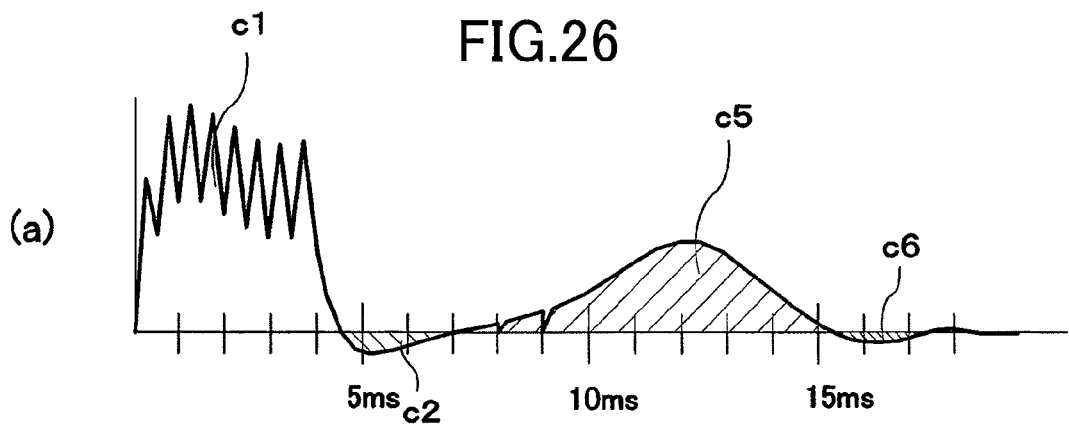
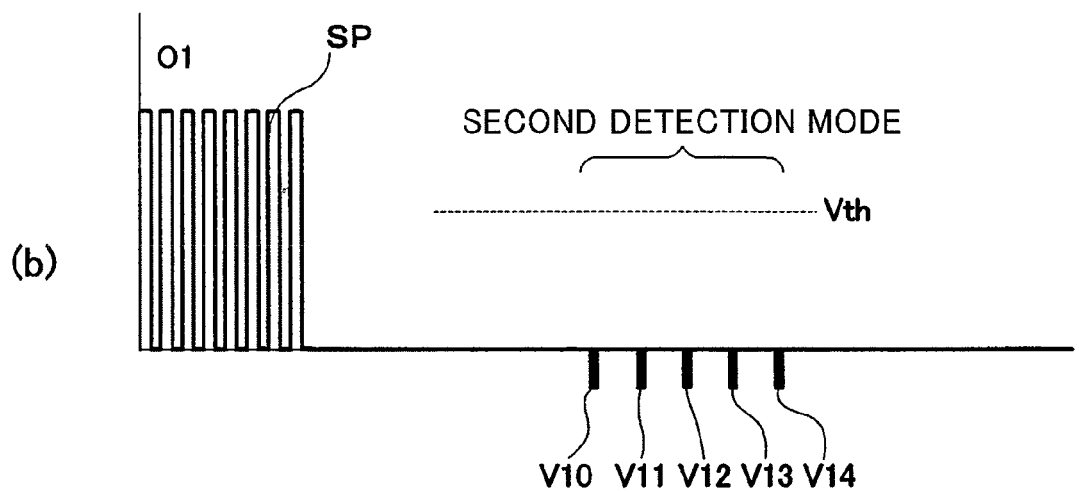
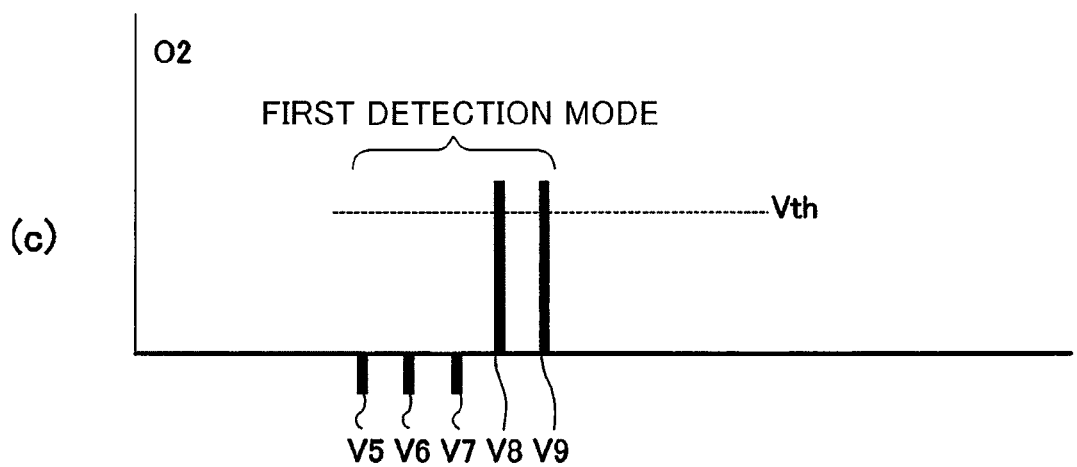

FIG. 27
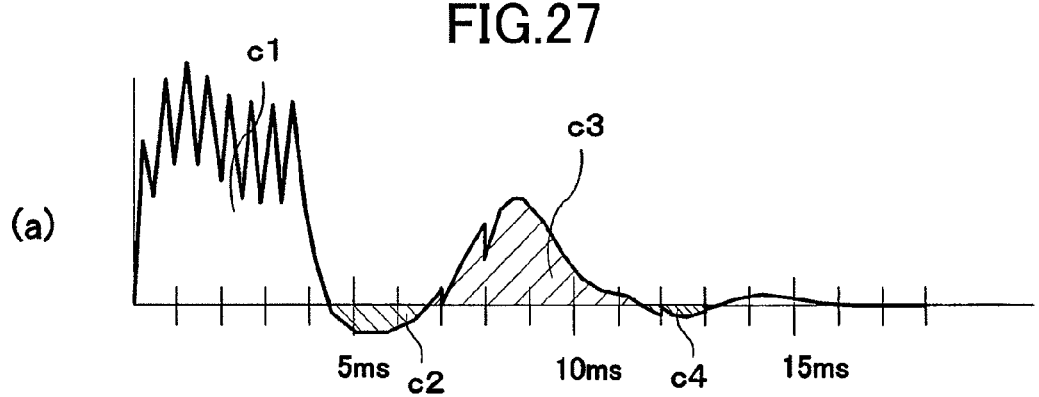
(a)
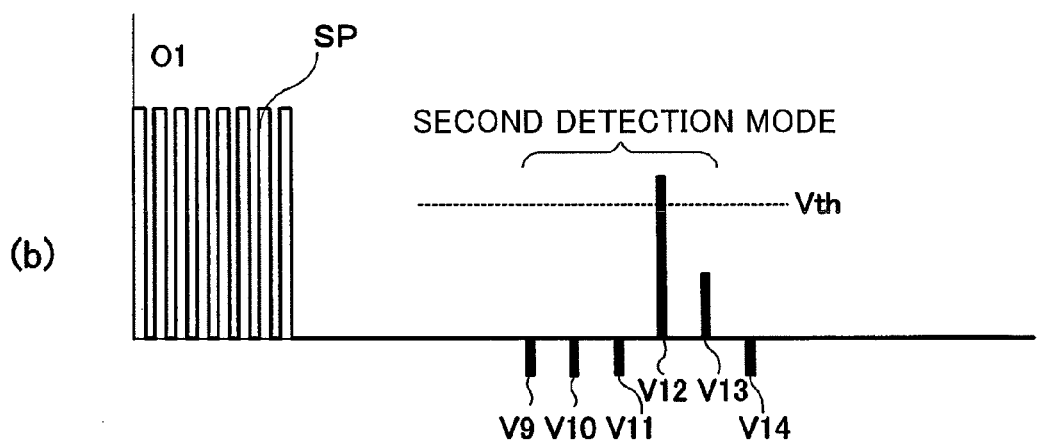
(b)
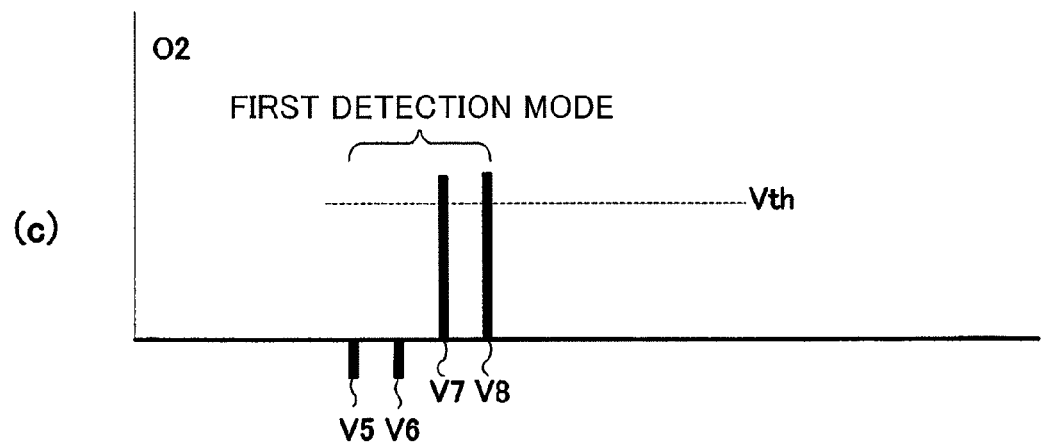
(c)

FIG. 28
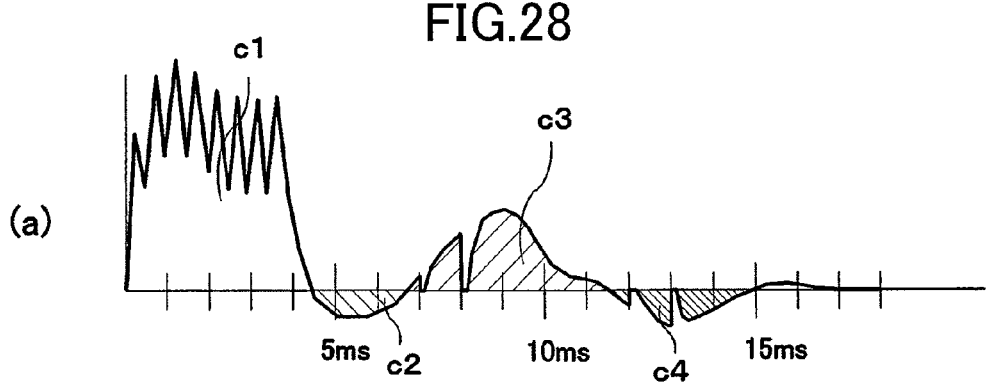
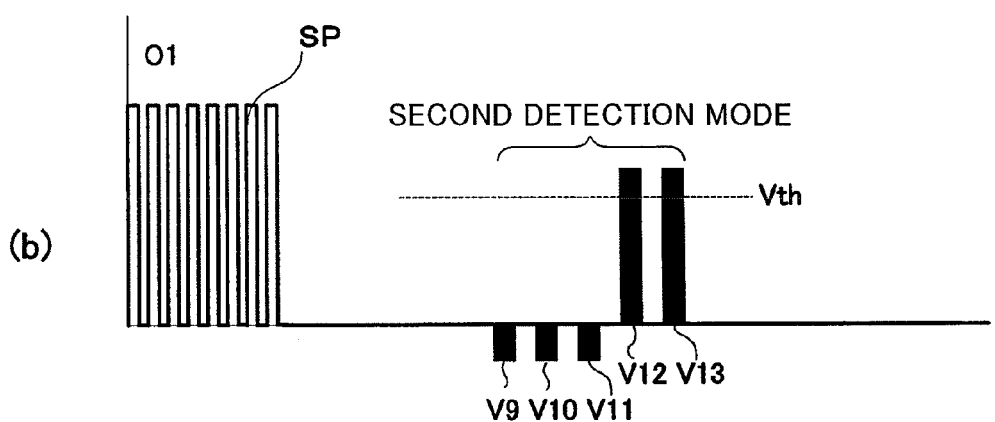
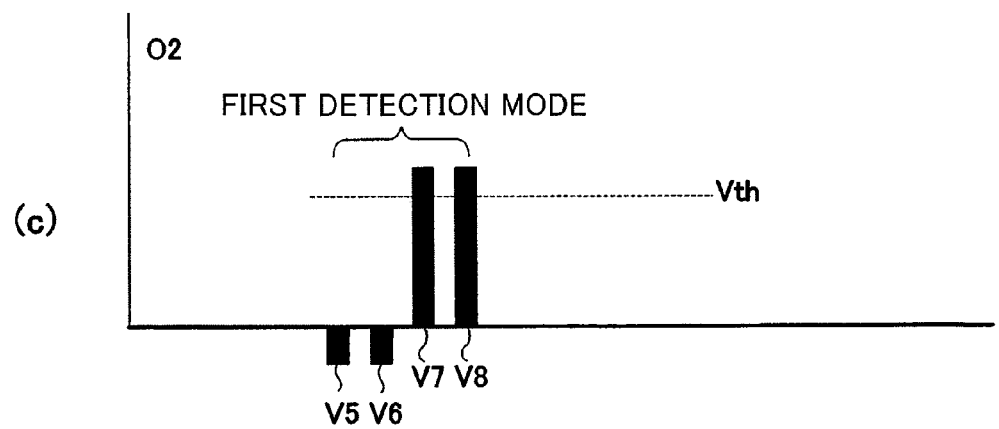

FIG.30
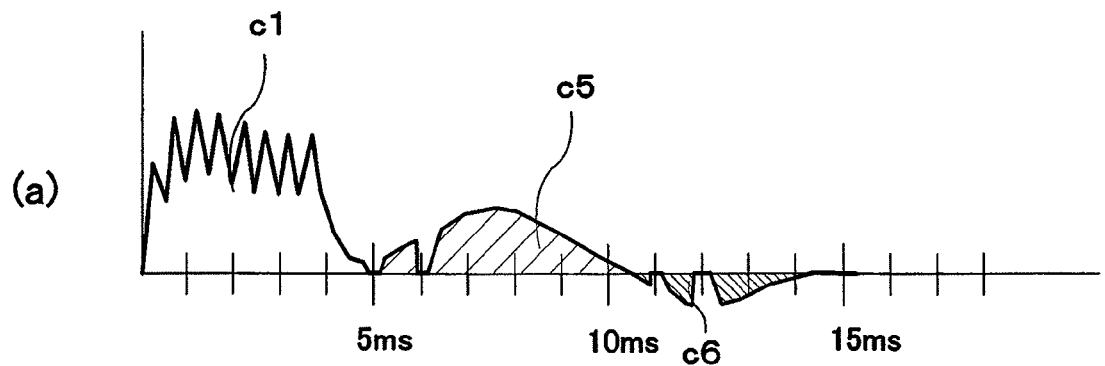
(a)
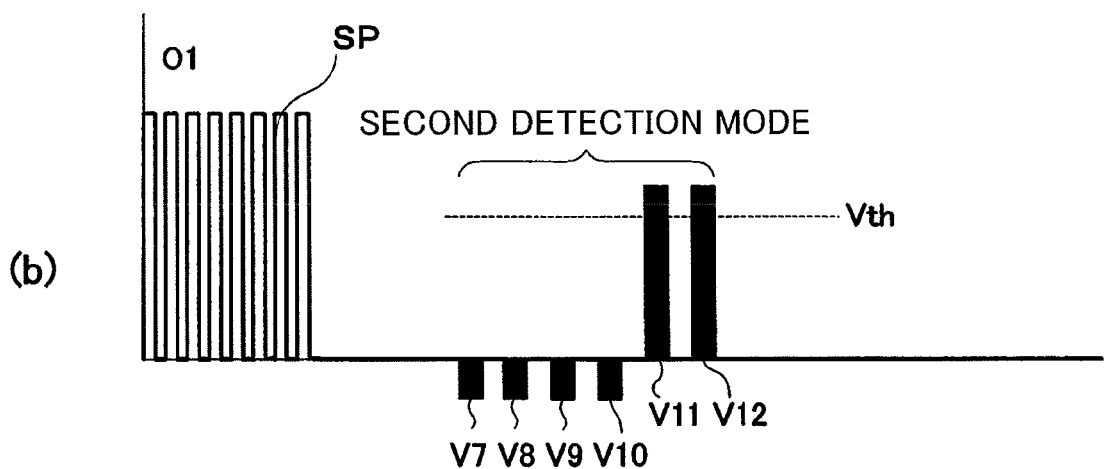
(b)
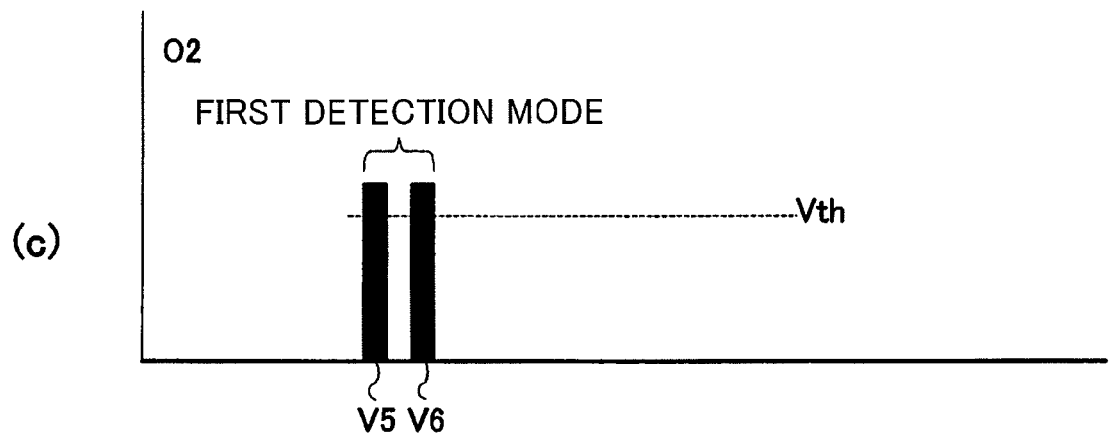
(c)

FIG.33
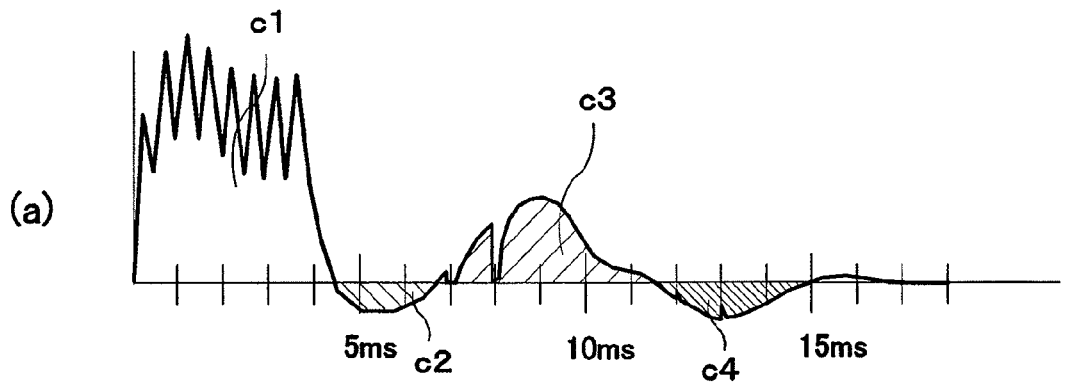
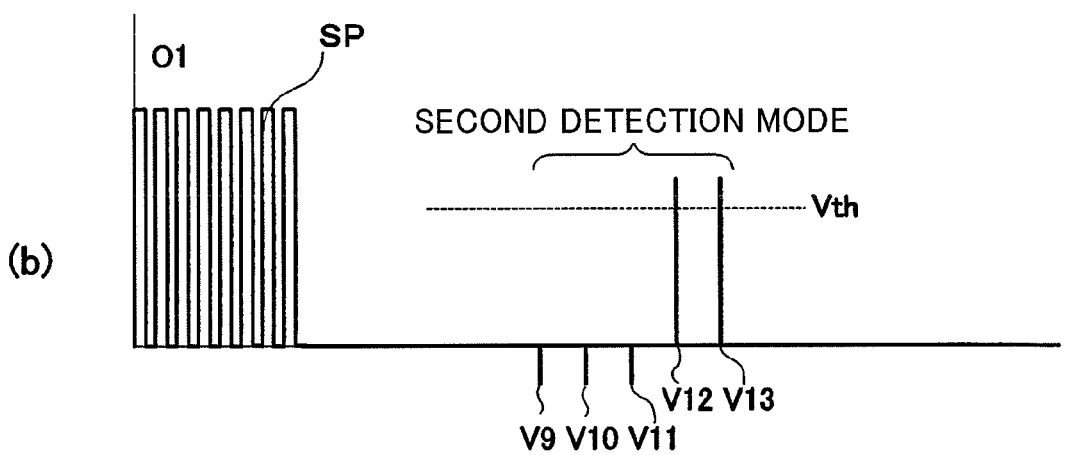
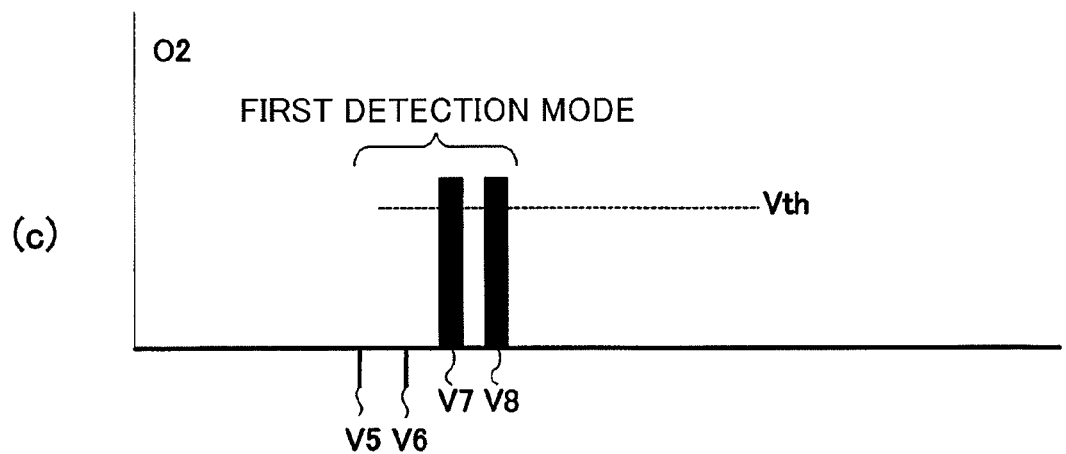

FIG.37
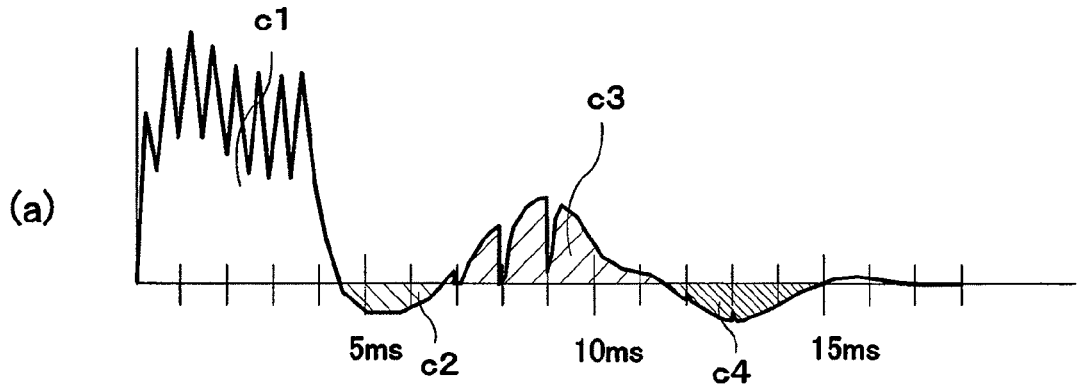
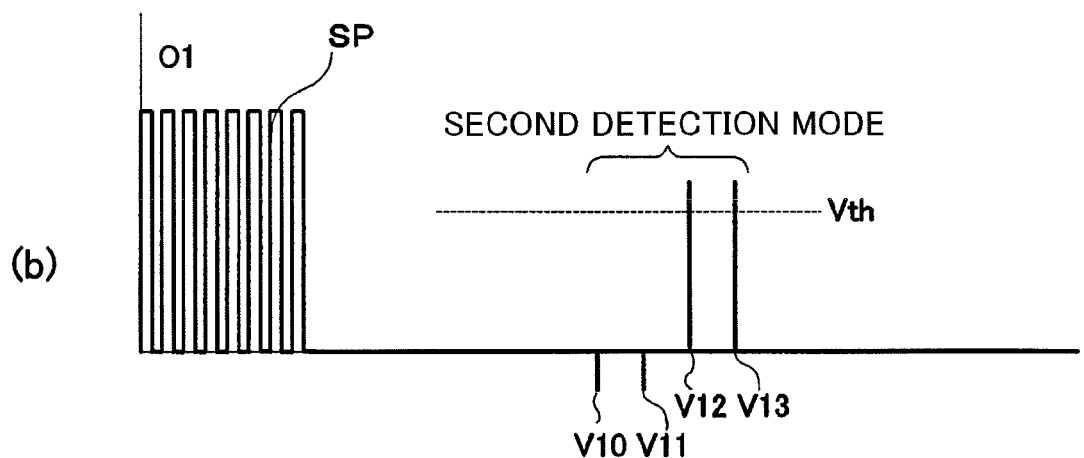
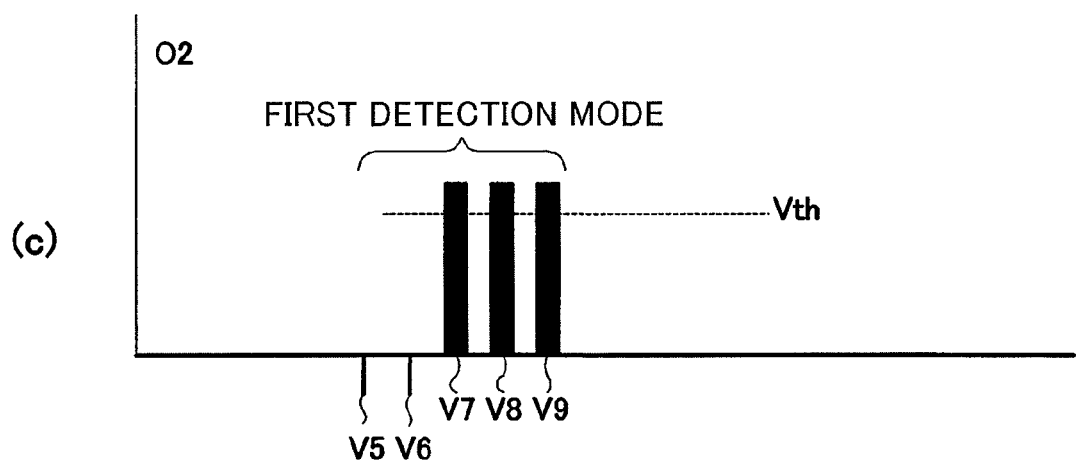

FIG.38
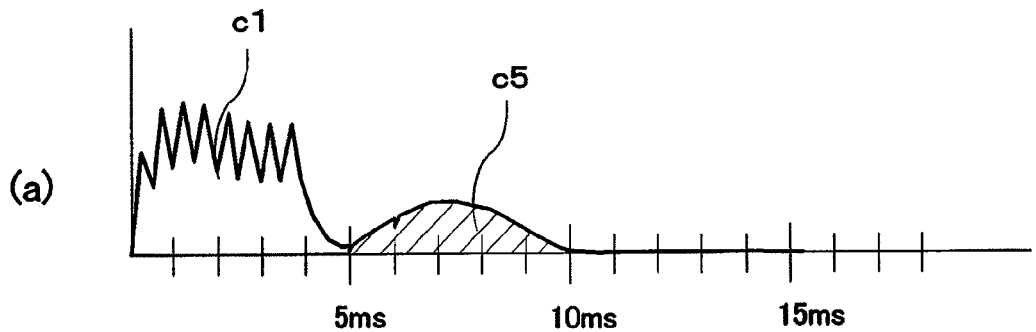
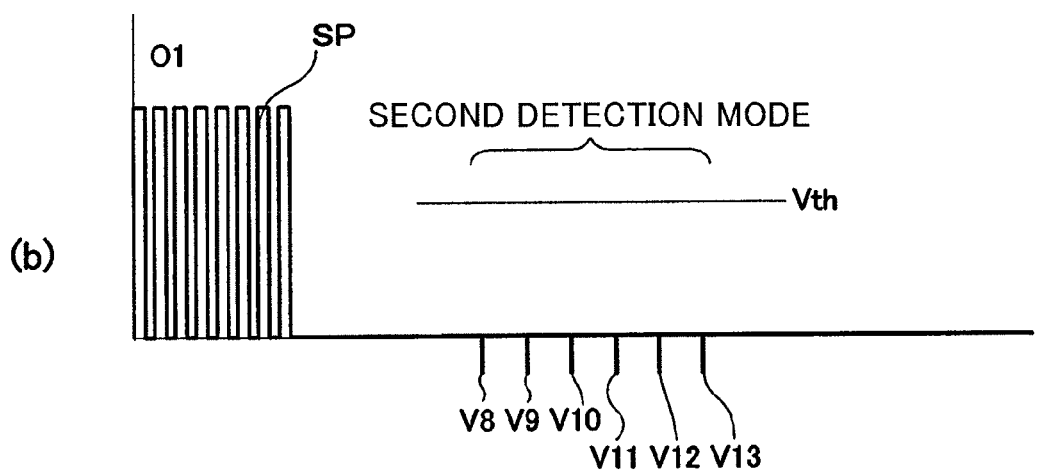
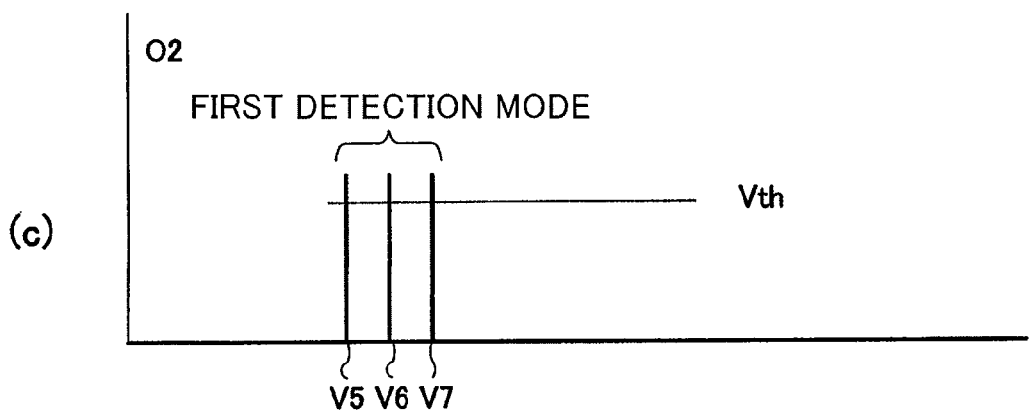

FIG.42
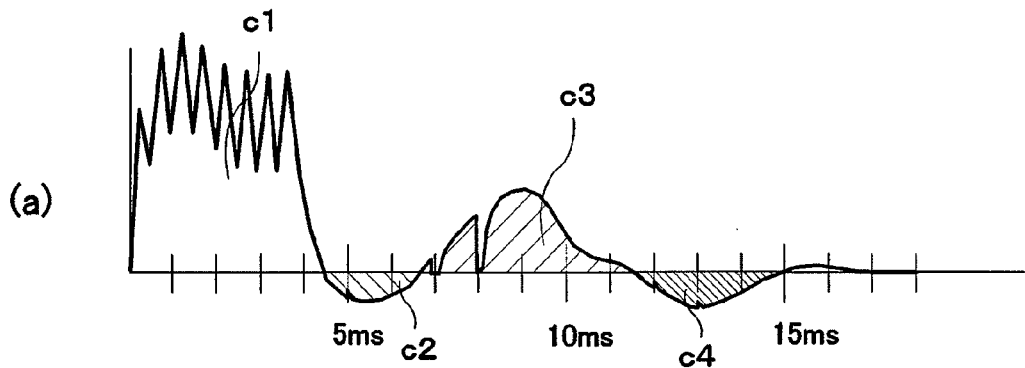
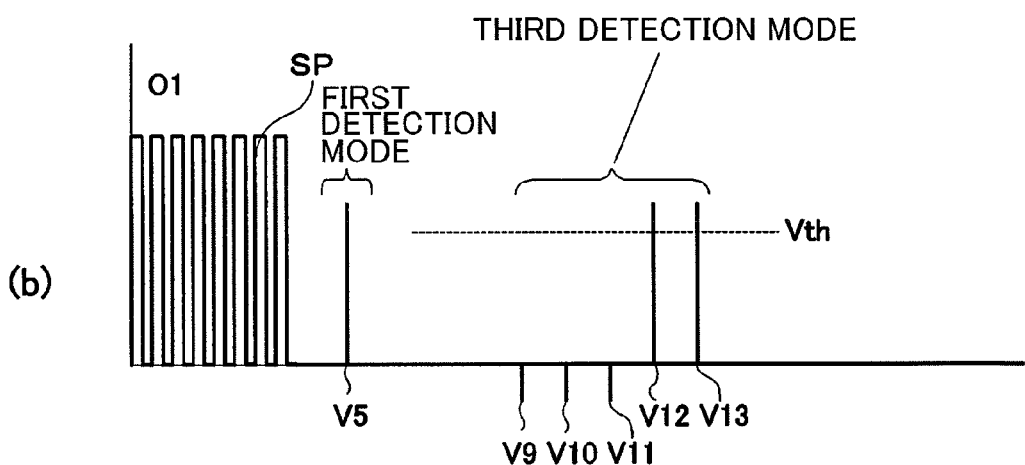
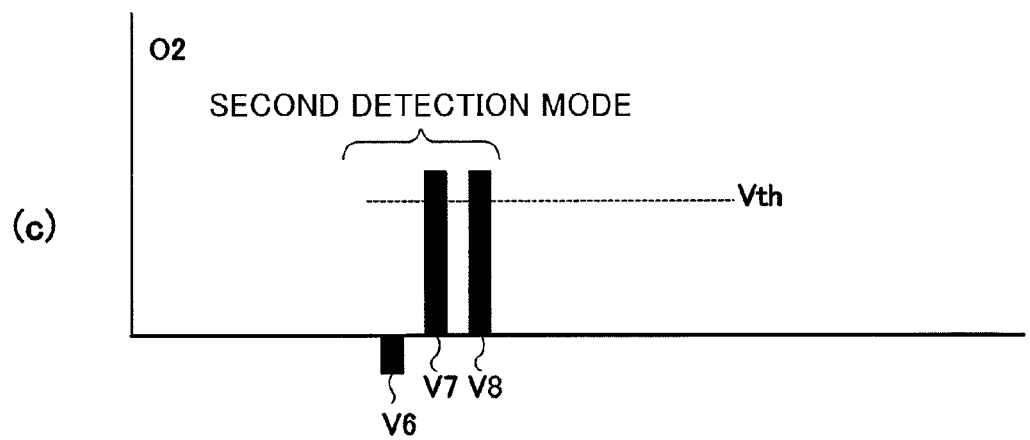

FIG.43
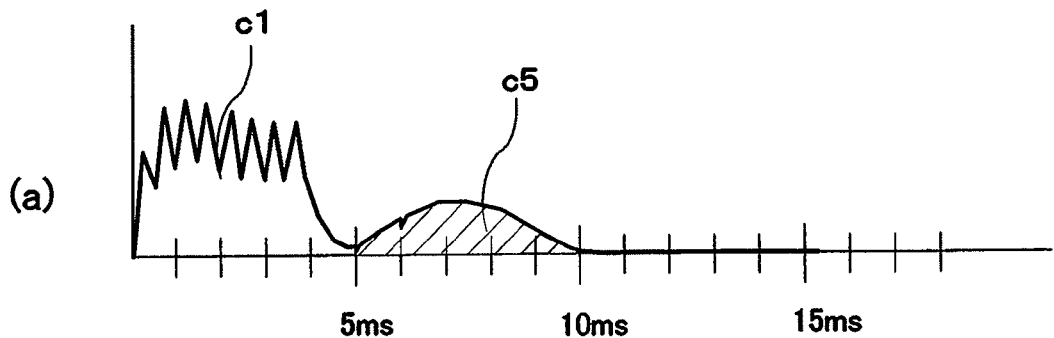
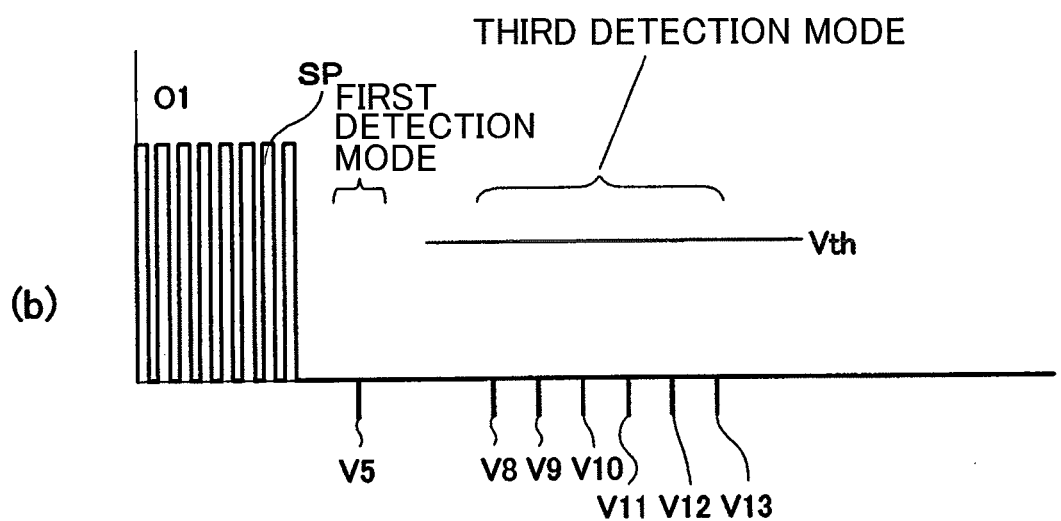
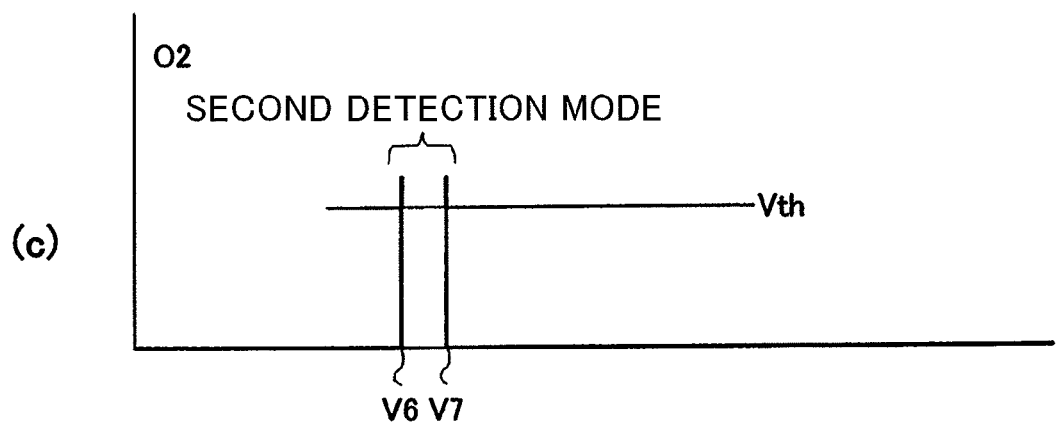

FIG.46
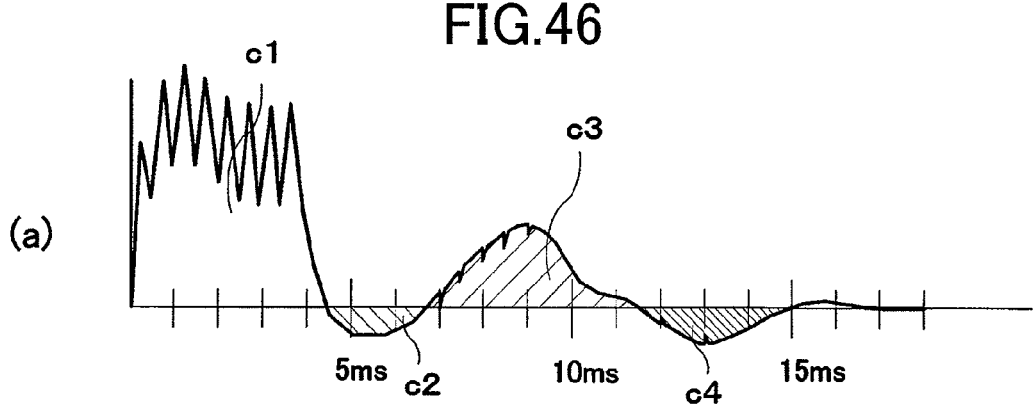
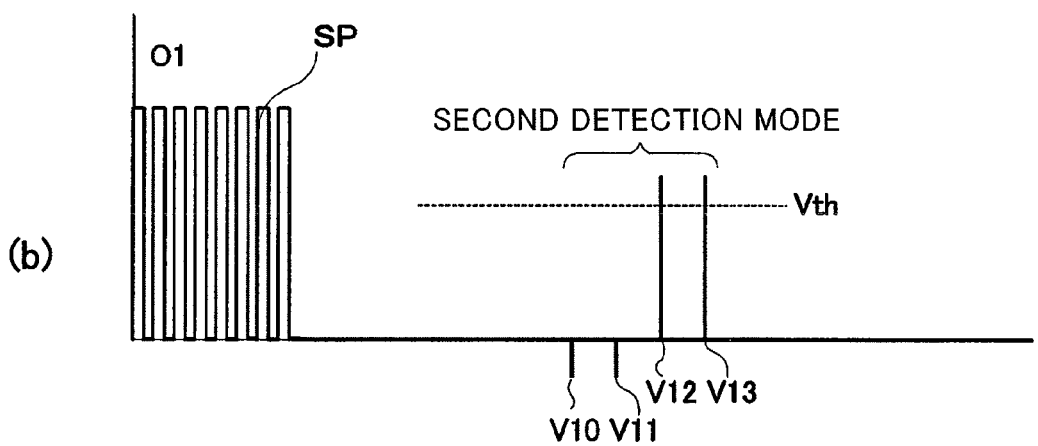
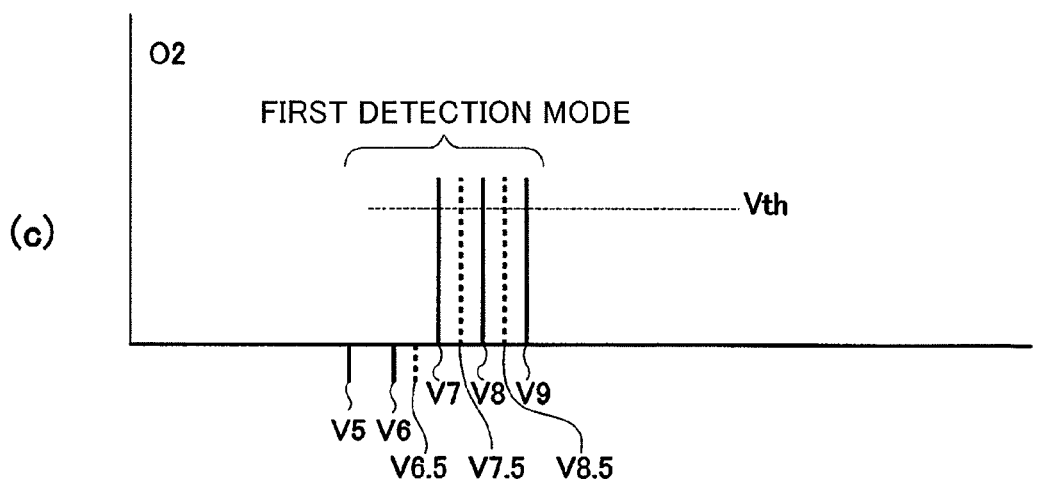

FIG.49
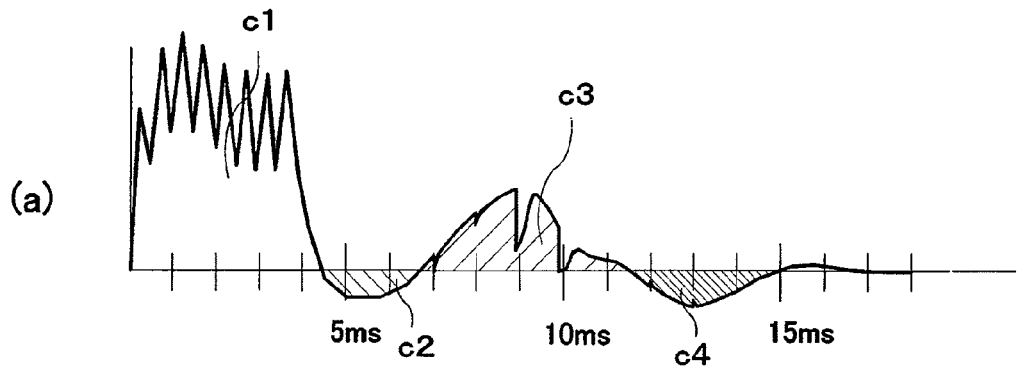
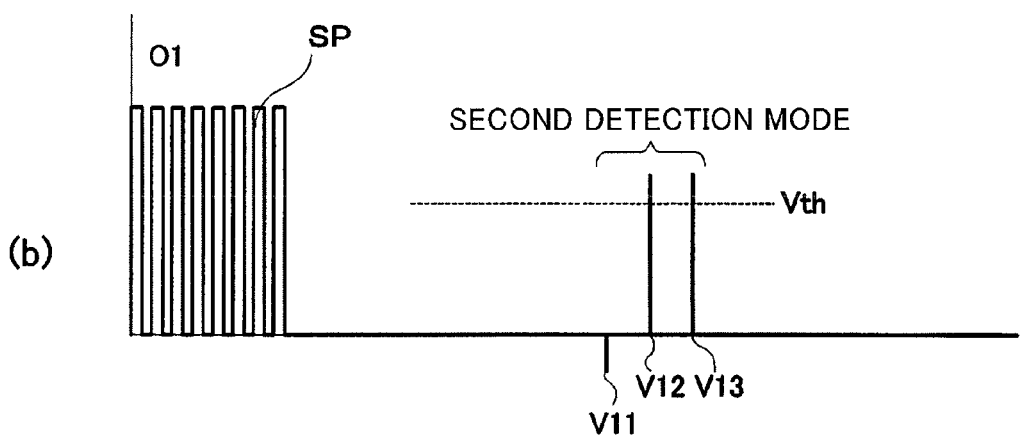
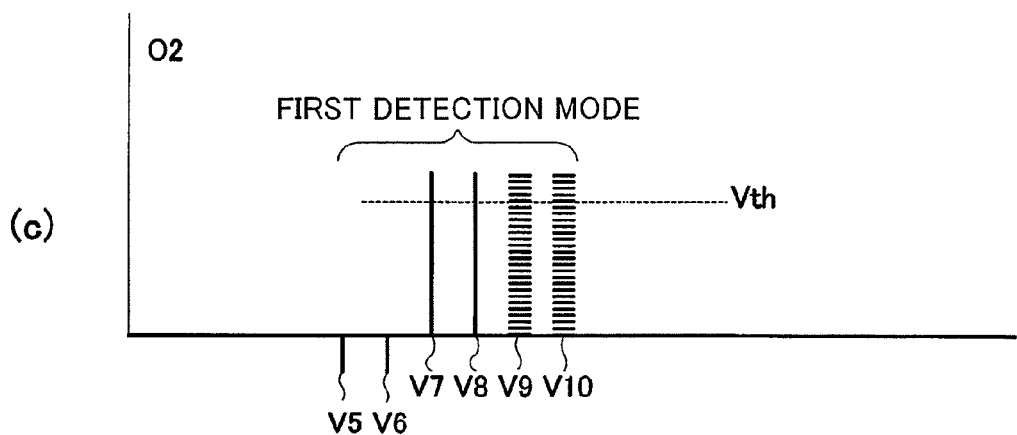

ELECTRONIC WATCH

CROSS REFERENCE TO RELATED APPLICATIONS

This application is a National Stage of International Application No. PCT/JP2010/067566 filed on Oct. 6, 2010, which claims priority from Japanese Patent Application No. 2009-233404, filed on Oct. 7, 2009, the contents of all of which are incorporated herein by reference in their entirety.

TECHNICAL FIELD

The present invention relates to an electronic watch including a stepper motor.

BACKGROUND ART

Conventionally, an electronic watch has adopted, in order to reduce current consumption, a method in which a plurality of normal drive pulses are prepared and a normal drive pulse which enables driving with minimum energy is constantly selected therefrom to drive a motor. This selection method is briefly described. A normal drive pulse is first output and it is subsequently determined whether the motor has rotated. If the motor has not rotated, a correction drive pulse is immediately output to rotate a rotor reliably and, when a subsequent normal drive pulse is output, the normal drive pulse is switched to a normal drive pulse having the next higher-ranked driving power to the previous one and is then output. If the motor has rotated, on the other hand, the same normal drive pulse as the previous one is output when the next normal drive pulse is output. Then, when the same drive pulse is output a predetermined number of times, the drive pulse is switched to a normal drive pulse having the next lower-ranked driving power. The normal drive pulse has heretofore been selected by this method.

Note that the detection of whether the rotor has rotated or not in the conventional method often uses a method in which, after the application of a normal drive pulse is finished, a detection pulse is output to abruptly change the impedance value of a coil of a stepper motor, and an induced voltage generated in the coil is detected at the coil ends, to thereby determine the pattern of free oscillation of the rotor. For example, one of two drive inverters respectively connected to both the ends of the coil is first operated as a first detection mode to output a detection pulse, and when a rotation detection signal is generated, the first detection mode is stopped and the other drive inverter is operated as a second detection mode to output a detection pulse. When another rotation detection signal is generated in the second detection mode, it is determined that the rotation has succeeded.

The second detection mode detects that the rotation has succeeded, that is, the rotor has crossed over a magnetic potential hill. The detection in the first detection mode, on the other hand, is performed before the second detection mode in order to prevent detection of an erroneous detection signal which is generated before the rotor completely crosses over a magnetic potential hill when the rotor is relatively weakly driven. Specifically, the first detection mode prevents a current waveform c2 of FIG. 25, to be described later, from being erroneously detected as a signal exceeding the magnetic potential even though the rotation of the rotor is not finished. It is therefore known that performing the first detection before the second detection mode is a technology effective for performing more accurate rotation detection (see, for example, Patent Literatures 1 and 2).

Hereinafter, the conventional technology is described with reference to the drawings. FIG. 23 is a block diagram illustrating a circuit configuration of a conventional electronic watch. FIG. 24 are waveform diagrams of pulses that are generated by circuits of the conventional electronic watch. FIG. 25 are waveform diagrams of current and voltage that are generated in the coil when the rotor has succeeded in rotating. FIG. 26 are examples of waveform diagrams of current and voltage that are generated in the coil when the rotor has failed to rotate.

In FIG. 23, reference numeral 20 denotes a stepper motor including a coil 9 and a rotor 10; 1, an oscillation circuit; 2, a clock division circuit; and 3, a normal drive pulse generation circuit. As illustrated in FIG. 24(a), the normal drive pulse generation circuit 3 outputs a normal drive pulse SP every 0.5 ms in a width of 4 ms every second, on the second based on a signal of the clock division circuit 2. In this case, when a rotation detection signal of the rotor 10 is not generated and it is determined that the rotation has failed, the normal drive pulse SP is switched to a normal drive pulse SP2 having the next higher-ranked driving power to the previous one, as illustrated in FIG. 24(a), and is then output from the normal drive pulse generation circuit 3. Reference numeral 4 denotes a correction drive pulse generation circuit, which outputs a correction drive pulse FP of 7 ms as illustrated in FIG. 24(d) based on a signal of the clock division circuit 2. The correction drive pulse FP is output after 32 ms has elapsed from the second when the rotation detection signal of the rotor 10 is not generated and it is determined that the rotation has failed.

Reference numeral 5 denotes a first detection pulse generation circuit, which outputs detection pulses B5 to B12 to be used in the first detection mode based on a signal of the clock division circuit 2. As illustrated in FIG. 24(b), the detection pulses B5 to B12 are pulses each having a width of 0.125 ms and are output every 1 ms from 5 ms after the second until 12 ms has elapsed since the second. Reference numeral 6 denotes a second detection pulse generation circuit, which outputs detection pulses F7 to F14 to be used in the second detection mode based on a signal of the clock division circuit 2. As illustrated in FIG. 24(c), the detection pulses F7 to F14 are pulses each having a width of 0.125 ms and are output every 1 ms from 7 ms after the second until 14 ms has elapsed since the second.

Reference numeral 7 denotes a pulse selection circuit, which selects and outputs the signals output from the normal drive pulse generation circuit 3, the correction drive pulse generation circuit 4, the first detection pulse generation circuit 5, and the second detection pulse generation circuit 6 based on determination results of a first detection mode determination circuit 12 and a second detection mode determination circuit 13, to be described later. Reference numeral 8 denotes a driver circuit, which outputs a signal of the pulse selection circuit 7 to the coil 9 to rotationally drive the rotor 10 and also control the rotation detection. The driver circuit 8 outputs the respective pulses alternately from a terminal O1 and a terminal O2 every 1 second. The internal configuration of the driver circuit 8 is the same as in patent literatures to be described later (a drive circuit 17, detection resistors R1 and R2, and MOS transistors Tr1 and Tr2 in FIG. 1 of Patent Literature 1 and FIG. 1 of Patent Literature 2), and detailed description thereof is therefore omitted. Reference numeral 11 denotes a detection circuit, which detects an induced voltage generated in the coil 9. Reference numeral 12 denotes the first detection mode determination circuit for determining the first detection mode based on a detection signal of the detection circuit 11. Reference numeral 13 denotes the second detection mode determination circuit for determining the second detection mode based on a detection signal of the detection circuit 11.

Note that the detection pulses B5 to B12 are output to a terminal on the opposite side of a terminal to which the normal drive pulse SP is output, and hence the detection pulses B5 to B12 abruptly change the impedance of a closed loop including the coil 9 to amplify a counter-electromotive voltage that is generated by free oscillation of the rotor 10 after the application of the normal drive pulse SP. The amplified counter-electromotive voltage is then detected by the detection circuit 11. The detection pulses F7 to F14 are output to a terminal on the same side of the terminal to which the normal drive pulse SP is output, and hence the detection pulses F7 to F14 abruptly change the impedance of the closed loop including the coil 9 to amplify a counter-electromotive voltage that is generated by free oscillation of the rotor 10 after the application of the normal drive pulses SP. The amplified counter-electromotive voltage is then detected by the detection circuit 11.

Subsequently, the operation of the above-mentioned configuration is described. The pulse selection circuit 7 selects, on the second, the normal drive pulse SP output from the normal drive pulse generation circuit 3 and drives the stepper motor 20. After 5 ms from the second, the first detection mode is started. In the first detection mode, the pulse selection circuit 7 selects and outputs the detection pulses B5 to B12 output from the first detection pulse generation circuit 5, and controls the stepper motor 20 so as to change the impedance of the coil 9. The detection circuit 11 then detects induced voltages that are generated in the coil 9 by the detection pulses B5 to B12. The pulse selection circuit 7, on the other hand, instructs the first detection mode determination circuit 12 to start its determination operation. The first detection mode determination circuit 12 determines the presence or absence of the detection signal in the first detection mode based on the number of times the detection signal is input from the detection circuit 11. When the detection signal of the detection circuit 11 has been generated twice, the first detection mode determination circuit 12 determines the detection and immediately stops the detection pulses output from the first detection pulse generation circuit 5 to notify the pulse selection circuit 7 so as to end the operation of the first detection mode. The first detection mode determination circuit 12 further instructs the second detection mode determination circuit 13 to start its operation, to thereby shift to the second detection mode. However, when the detection pulses B5 to B12 have produced no detection signal at all, or only one detection signal, the first detection mode determination circuit 12 determines that the rotation has failed and ends the operation of the first detection mode. Then, without shifting to the second detection mode, the correction drive pulse FP is output, and when the next normal drive pulse is output, the normal drive pulse SP2 having the next higher-ranked driving power to the previous one is output from the normal drive pulse generation circuit 3.

In the second detection mode, the pulse selection circuit 7 selects and outputs the detection pulses F7 to F14 generated by the second detection pulse generation circuit 6, and controls the stepper motor 20. The detection circuit 11 then detects induced voltages that are generated in the coil 9 by the detection pulses F7 to F14. The second detection mode determination circuit 13 receives the detection signal of the detection circuit 11. When the detection signal has been generated twice, the second detection mode determination circuit 13 determines that the rotation has succeeded and immediately stops the detection pulses output from the second detection pulse generation circuit 6 to end the operation of the second detection mode, and further controls the pulse selection circuit 7 so as not to output the correction drive pulse FP. However, the detection of the detection signals generated by the detection pulses F7 to F14 is finished when the detection signal has been detected six times at most. If no detection signal, or only one detection signal, is generated during the detection, it is determined that the rotation has failed and the correction drive pulse FP is output. Then, when the next normal drive pulse is output, the normal drive pulse SP2 having the next higher-ranked driving power to the previous one is output from the normal drive pulse generation circuit 3.

An actual method of detecting the rotation through the above-mentioned operation is described with reference to the waveform diagrams of FIGS. 25 and 24. First, the case where the rotor 10 has rotated normally is described. FIG. 25($a$) is a waveform of a current that is induced in the coil 9 when the rotor 10 rotates. FIG. 25($b$) is a waveform of a voltage generated at one terminal O1 of the coil 9 in the second detection mode. FIG. 25($c$) is a waveform of a voltage generated at another terminal O2 of the coil 9 in the first detection mode. Note that the waveforms generated at the terminals O1 and O2 are alternating pulses whose phases are inverted every 1 second.

First, the normal drive pulse SP illustrated in FIG. 24($a$) is applied to the terminal O1 of the coil 9, and the rotor 10 rotates. The current waveform at this time is a waveform c1 of FIG. 25($a$). After the end of the normal drive pulse SP, the rotor 10 becomes a freely oscillated state, and the current waveform becomes induced current waveforms denoted by c2, c3, and c4. At a time of 5 ms, the first detection mode is started, and the detection pulse B5 illustrated in FIG. 24($b$) is applied to the coil 9. As illustrated in FIG. 25($a$), at 5 ms, the current waveform is in the region of the current waveform c2, in which the current value is negative. Accordingly, as illustrated in FIG. 25($c$), an induced voltage V5 generated by the detection pulse B5 never exceeds a threshold Vth of the detection circuit (hereinafter, simply referred to as threshold Vth). At 7 ms, however, the current waveform is in the region of the current waveform c3, in which the current value is changed to the positive direction. Accordingly, as illustrated in FIG. 25($c$), an induced voltage V7 generated by the detection pulse B7 becomes a detection signal exceeding the threshold Vth. Similarly at 8 ms, the current waveform is also in the region of the current waveform c3, and an induced voltage V8 generated by the detection pulse B8 becomes a detection signal exceeding the threshold Vth. Because the two detection signals of the induced voltages V7 and V8 have exceeded the threshold Vth, the mode is switched to the second detection mode.

In response to the switching to the second detection mode by the induced voltage V8, a next timing detection pulse, namely the detection pulse F9 at the time of 9 ms illustrated in FIG. 24($c$), is applied to the coil 9. As illustrated in FIG. 25($a$), at 9 ms, the current waveform is in the region of the current waveform c3, in which the current value is positive, and hence, as illustrated in FIG. 25($b$), an induced voltage V9 generated by the detection pulse F9 never exceeds the threshold Vth. Further, the current waveform for an induced voltage V10 generated by the detection pulse F10 is also in the region of the current waveform c3, and hence the induced voltage V10 never exceeds the threshold Vth. At 11 ms, however, as illustrated in FIG. 25($a$), the current waveform is in the region of the current waveform c4, in which the current value is changed to the negative direction, and, as illustrated in FIG. 25($b$), induced voltages V11 and V12 generated by the detection pulses F11 and F12 become detection signals exceeding the threshold Vth. Because the two detection signals of the induced voltages V11 and V12 have exceeded the threshold Vth, the second detection mode determination circuit 13 determines that the rotation has succeeded. Then, the correction drive pulse FP is not output, and when the next normal drive pulse is output, the normal drive pulse SP having the same driving power as the previous one is output.

Subsequently, the case where the rotor 10 has failed to rotate is described with reference to the waveform diagrams of FIGS. 26 and 24. FIG. 26(a) is a waveform of a current that is induced in the coil 9 when the rotor 10 has failed to rotate because, for example, the operating voltage of the driver circuit 8 has reduced to lower the driving power of the stepper motor 20. FIG. 26(b) is a waveform of a voltage generated at one terminal O1 of the coil 9 at this time, and FIG. 26(c) is a waveform of a voltage generated at another terminal O2 of the coil 9.

The waveform of the current that is generated in the coil when the rotation has failed is the current waveform as illustrated in FIG. 26(a). That is, up to the current waveform c1, the current exhibits substantially the same current waveform as that in the above-mentioned case where the rotation has succeeded, but subsequently exhibits current waveforms c2, c5, and c6. The waveform of the current that is generated in the coil 9 when the rotation has failed is longer and more gentle, as illustrated by the current waveform c5, than the current waveform in the case where the rotation has succeeded. The same method of detecting the rotation is also applied in the case where the rotation has failed. First, at the time of 5 ms, the first detection mode is started, and the detection pulse B5 is applied to the coil 9. As illustrated in FIG. 26(a), at 5 ms, the current waveform is in the region of the current waveform c2, in which the current value is negative. Accordingly, as illustrated in FIG. 26(c), the induced voltage V5 never exceeds the threshold Vth. At 8 ms, however, the current waveform is in the region of the current waveform c5, in which the current value is changed to the positive direction. Accordingly, as illustrated in FIG. 26(c), the induced voltage V8 becomes a detection signal exceeding the threshold Vth. Similarly at 9 ms, the current waveform is also in the region of the current waveform c5, and the induced voltage V9 becomes a detection signal exceeding the threshold Vth. Because the two detection signals of the induced voltages V8 and V9 have exceeded the threshold Vth, the mode is switched to the second detection mode.

In response to the switching to the second detection mode by the induced voltage V9, a next timing detection pulse, namely the detection pulse F10 at the timing of 10 ms illustrated in FIG. 24(c), is applied to the coil 9. As illustrated in FIG. 26(a), at 10 ms, the current waveform is in the region of the current waveform c5, in which the current value is positive. Accordingly, as illustrated in FIG. 26(b), the induced voltage V10 never exceeds the threshold Vth. Further, the current waveform for the induced voltages V10 to V14 generated by the detection pulses F10 to F14 is also in the region of the current waveform c5. It follows that no detection signal exceeding the threshold is detected within detection periods from the induced voltage V10 to the induced voltage V14. The second detection mode determination circuit 13 therefore determines that the rotation has failed and terminates the determination, with the result that the pulse selection circuit 7 selects the correction drive pulse FP to drive the stepper motor 20 so that the rotor 10 is reliably rotated. In this manner, the detection of whether the rotor has rotated or not is performed and, if the rotation has failed, the correction drive pulse FP can be output as appropriate so that the normal drive pulse SP2 having the next higher-ranked driving power to the previous one can be output when a next normal drive pulse is output.

As described above, in the case where the stepper motor 20 does not rotate normally, the correction drive pulse having sufficiently large effective electric power is output so as to reliably rotate the stepper motor 20 and increase the effective electric power of the normal drive pulse. Thus, the stepper motor 20 can be driven with the lowest electric power possible.

However, the above-mentioned technology can sometimes not perform detection well because of current waveform disturbance in the case where an indicating hand having a large moment of inertia is used. This problem is described with reference to waveform diagrams of FIGS. 27 and 24. FIG. 27 are waveform diagrams of current and voltage that are generated when the rotor 10 rotates in the case where an indicating hand having a large moment of inertia is attached to the conventional electronic watch. FIG. 27(a) is a waveform of a current that is induced in the coil 9 when the indicating hand having a large moment of inertia is attached. FIG. 27(b) is a waveform of a voltage generated at one terminal O1 of the coil 9 at this time, and FIG. 27(c) is a waveform of a voltage generated at another terminal O2 of the coil 9.

In the case where an indicating hand having a large moment of inertia is attached to a general drive circuit, the current waveform is as illustrated in FIG. 27(a). That is, the waveform profile exhibits induced current waveforms c2, c3, and c4 followed by a current waveform c1. Compared with the current waveform illustrated in FIG. 25(a), the period of the current waveform c3 is long and the current waveform c4 is flattened. This is because the free oscillation of the rotor 10 is restricted by the moment of inertia of the indicating hand. Hereinafter, the detection operation in this case is described. First, at 5 ms, the first detection mode is started, and the detection pulse B5 is applied to the coil 9. As illustrated in FIG. 27(a), at 6 ms, the current waveform is in the region of the current waveform c2, in which the current value is negative. Accordingly, as illustrated in FIG. 27(c), the induced voltage V6 never exceeds the threshold Vth. At 7 ms, however, the current waveform is in the region of the current waveform c3, in which the current value is changed to the positive direction. Accordingly, as illustrated in FIG. 27(c), the induced voltage V7 becomes a detection signal exceeding the threshold Vth. Similarly at 8 ms, the current waveform is also in the region of the current waveform c3, and the induced voltage V8 becomes a detection signal exceeding the threshold Vth. Because the two detection signals of the induced voltages V7 and V8 have exceeded the threshold Vth, the mode is switched to the second detection mode.

In response to the switching to the second detection mode by the induced voltage V8, the next timing detection pulse, namely the detection pulse F9 at the time of 9 ms, is applied to the coil 9. As illustrated in FIG. 27(a), at 9 ms, the current waveform is in the region of the current waveform c3, in which the current value is positive. Accordingly, as illustrated in FIG. 27(b), the induced voltage V9 never exceeds the threshold Vth. Similarly, the current waveform for the induced voltages V10 and V11 is also in the region of the current waveform c3, and hence the induced voltages V10 and V11 never exceed the threshold Vth. At 12 ms, the current waveform is in the region of the current waveform c4, in which the current value is changed to the negative direction. Accordingly, as illustrated in FIG. 27(b), an induced voltage V12 generated by the detection pulse F12 becomes a detection signal exceeding the threshold Vth. At 13 ms, however, the current waveform is in the region of the current waveform c4, in which the current value is negative, but because the current waveform is disturbed by the influence of the indicating hand having a large moment of inertia, an induced voltage exceeding the threshold Vth cannot be obtained from an induced voltage V13 generated by the detection pulse F13. Further, an induced voltage V14 generated by the detection pulse F14 is outside the region of the current waveform c4 and hence never exceeds the threshold Vth. It follows that a detection signal exceeding the threshold is not detected twice within six detection periods from the induced voltage V9 to the induced voltage V14. Therefore, the second detection mode determination circuit 13 determines that the rotation has failed, and the pulse selection circuit 7 selects and outputs the correction drive pulse FP. In other words, this leads to a phenomenon that, even though the rotation has succeeded, the correction drive pulse FP is output due to such erroneous determination, and when the next normal drive pulse is output, the normal drive pulse SP2 having the next higher-ranked driving power to the previous one is output from the normal drive pulse generation circuit 3, with the result that unnecessary current consumption is increased. Thus, the battery life is significantly reduced.

Let us consider countermeasures of increasing the detection pulse width in order to solve the above-mentioned problem. The detection pulse described above serves to detect the rotation of the rotor 10 and also suppress the electromagnetic brake of the rotor. That is, when the detection pulse is output, the detection pulse abruptly changes the impedance value of the coil of the stepper motor and therefore sets the state of the closed loop including the coil 9 to the high impedance state.

Note that, in addition to the case where the terminals O1 and O2 are opened so that the closed loop may have high impedance, it is also conceivable to connect the detection resistors R1 and R2 to the opened terminals O1 and O2 as disclosed in page 2 of Patent Literature 2. The resistance values of the detection resistors R1 and R2 (at the level of 100 kΩ) are larger than the resistance value of the coil (several kΩ), and hence the same effects can be obtained as in the case of setting to high impedance. Herein, both the states are referred to as high impedance.

At the moment when the high impedance state is established, an induced voltage that is generated in the coil by free oscillation of the rotor 10 is detected, and the obtained detection signal is used to detect the rotation of the rotor 10. If the high impedance state is continued, there is no chance to generate such induced electromotive force as to generate a magnetic field in the direction of preventing the change of magnetic flux generated in the coil 9 by the free oscillation of the rotor 10, namely electromagnetic brake. It is therefore possible to permit rapid reduction in speed of the free oscillation of the rotor 10 to some extent.

Now, the case where the detection pulse width is increased is described with reference to waveform diagrams of FIGS. 28 and 29. FIG. 28 are waveform diagrams of current and voltage that are generated when the rotor 10 rotates in the case where the detection pulse width is changed from 0.125 ms to 0.25 ms and an indicating hand having a large moment of inertia is attached to the conventional electronic watch. FIG. 28(a) is a waveform of a current that is induced in the coil 9 when the indicating hand having a large moment of inertia is attached. FIG. 28(b) is a waveform of a voltage generated at one terminal O1 of the coil 9 at this time, and FIG. 28(c) is a waveform of a voltage generated at another terminal O2 of the coil 9.

In the case where an indicating hand having a large moment of inertia is attached to a general drive circuit and further the detection pulse width is changed from 0.125 ms to 0.25 ms, the current waveform is as illustrated in FIG. 28(a). That is, the waveform profile exhibits induced current waveforms c2, c3, and c4 followed by a current waveform c1. Compared with the current waveform illustrated in FIG. 27(a), the electromagnetic brake is suppressed to increase the free oscillation of the rotor 10 and the current waveform c4 expands. Hereinafter, the detection operation in this case is described. First, at the time of 5 ms, the first detection mode is started, and the detection pulse B5 is applied to the coil 9. As illustrated in FIG. 28(a), at 6 ms, the current waveform is in the region of the current waveform c2, in which the current value is negative. Accordingly, as illustrated in FIG. 27(c), the induced voltage V6 never exceeds the threshold Vth. At 7 ms, however, the current waveform is in the region of the current waveform c3, in which the current value is changed to the positive direction. Accordingly, as illustrated in FIG. 28(c), the induced voltage V7 becomes a detection signal exceeding the threshold Vth. Similarly at 8 ms, the current waveform is also in the region of the current waveform c3, and the induced voltage V8 becomes a detection signal exceeding the threshold Vth. Because the two detection signals of the induced voltages V7 and V8 have exceeded the threshold Vth, the mode is switched to the second detection mode.

In response to the switching to the second detection mode by the induced voltage V8, the next timing detection pulse, namely the detection pulse F9 at the time of 9 ms, is applied to the coil 9. As illustrated in FIG. 28(a), at 9 ms, the current waveform is in the region of the current waveform c3, in which the current value is positive. Accordingly, as illustrated in FIG. 28(b), the induced voltage V9 never exceeds the threshold Vth. Similarly, the current waveform for the induced voltages V10 and V11 is also in the region of the current waveform c3, and hence the induced voltages V10 and V11 never exceed the threshold Vth. At 12 ms, however, the current waveform is in the region of the current waveform c4, in which the current value is changed to the negative direction, and hence, as illustrated in FIG. 28(b), induced voltages V12 and V13 generated by the detection pulses F12 and F13 become detection signals exceeding the threshold Vth. Because the two detection signals of the induced voltages V12 and V13 have exceeded the threshold Vth, the second detection mode determination circuit 13 determines that the rotation has succeeded. Then, the correction drive pulse FP is not output, and when the next normal drive pulse is output, the normal drive pulse SP having the same driving power as the previous one is output. In other words, a phenomenon where unnecessary current consumption is increased never occurs, nor is the battery life significantly reduced.

Patent Literature 3 describes that the width of a detection pulse is variable and the width of the detection pulse concerned is adjusted in accordance with indicating hands having different moments of inertia in the manner described above, to thereby change the amount of braking.

PRIOR ART DOCUMENT

Patent Document

Patent Document 1: JP 7-120567 A (paragraphs 0018 to 0024 and FIG. 6)
Patent Document 2: JP 8-33457 B (page 3, column 6, line 26 to page 4, column 7, line 39, and FIGS. 4 to 6)
Patent Document 3: JP 4165092 B (paragraph 0063)

DISCLOSURE OF THE INVENTION

Problems to be Solved by the Invention

However, the above-mentioned countermeasures are insufficient because another problem occurs, as follows. This problem is described with reference to waveform diagrams of FIGS. 30 and 29. FIG. 30 are waveform diagrams in the case where the detection pulse width is increased to 0.25 ms and the rotor 10 has failed to rotate because the driving power of the stepper motor 20 has been weakened more due to abrupt application of a load such as a calendar, compared to the case of FIG. 26. FIG. 30(*a*) is a waveform of a current that is induced in the coil 9 when the rotor 10 has failed to rotate. FIG. 30(*b*) is a waveform of a voltage generated at one terminal O1 of the coil 9 at this time and FIG. 30(*c*) is a waveform of a voltage generated at another terminal O2 of the coil 9.

The waveform of a current that is generated in the coil in the case where the detection pulse width is increased to 0.25 ms and the rotor 10 has failed to rotate because the driving power has been weakened more due to abrupt application of a load such as a calendar is as illustrated in FIG. 30(*a*). That is, the current exhibits current waveforms c5 and c6 followed by a current waveform c1. Compared with the current waveform of FIG. 26(*a*), the current waveform c2 does not appear, the current waveform c5 appears subsequent to the current waveform c1, the current waveform c5 ends earlier, and then the current waveform c6 appears. Hereinafter, the detection operation in this case is described. First, at 5 ms, the first detection mode is started, and the detection pulse B5 is applied to the coil 9. As illustrated in FIG. 30(*a*), at 5 ms, the current waveform is in the region of the current waveform c5, in which the current value is positive, and hence, as illustrated in FIG. 30(*c*), the induced voltage V5 becomes a detection signal exceeding the threshold Vth. Further, at 6 ms, the current waveform is also in the region of the current waveform c5, and the induced voltage V6 becomes a detection signal exceeding the threshold Vth. Because the two detection signals of the induced voltages V5 and V6 have exceeded the threshold Vth, the mode shifts to the second detection mode.

In response to the shift to the second detection mode by the induced voltage V6, the next timing detection pulse, namely the detection pulse F7 at the time of 7 ms, is applied to the coil 9. As illustrated in FIG. 30(*a*), at 7 ms, the current waveform is in the region of the current waveform c5, in which the current value is positive, and hence, as illustrated in FIG. 30(*b*), the induced voltage V7 never exceeds the threshold Vth. Further, the current waveform for the induced voltages V8 to V10 is also in the region of the current waveform c5, and the induced voltages V8 to V10 never exceed the threshold Vth. However, at 11 ms, which corresponds to the fifth detection in the second detection mode, the current waveform is in the region of the current waveform c6 as illustrated in FIG. 30(*a*), in which the current value is changed to the negative direction. Accordingly, as illustrated in FIG. 30(*b*), the induced voltage V11 becomes a detection signal exceeding the threshold Vth. In this case, the second detection mode determination circuit 13 erroneously determines that the rotation has succeeded even though the rotation has actually failed, and the pulse selection circuit 7 does not select and output the correction drive pulse FP, with the result that the rotor 10 does not rotate. If the detection pulse width is simply increased as described above, the free oscillation of the rotor 10 when the rotor 10 is not rotating cannot be suppressed, thus causing a fatal problem to an electronic watch in that the stepper motor stops due to erroneous determination and a time delay occurs.

It is an object of the present invention to solve the above-mentioned drawbacks and provide an electronic watch including rotation detecting means capable of supporting an indicating hand having a larger moment of inertia than usual and adapting to the case where driving power of a stepper motor has reduced.

Note that the above description has exemplified the configuration in which, in the first detection mode and the second detection mode, the terminals O1 and O2 of the coil 9 to which the detection pulse is to be applied are different depending on the detection mode so that the polarity of the threshold Vth for obtaining a detection signal by an obtained induced voltage becomes equal between the detection modes. The present invention, however, is not limited thereto. It should be understood that the terminal of the coil to which the detection pulse is applied may be shared in the respective detection modes by changing the polarity and the value of the threshold Vth between the detection modes.

Means for Solving the Problems

In order to achieve the above-mentioned object, the present invention adopts the following structures. That is, claim 1 defines a structure in which an electronic watch includes: a stepper motor including a rotor and a coil; a motor driver for driving the stepper motor; a reference signal generation circuit for outputting various kinds of timing signals; a pulse shaping circuit for generating various kinds of pulse signals for driving the stepper motor, in response to the various kinds of timing signals output from the reference signal generation circuit; a pulse selection circuit for selecting various kinds of pulses supplied from the pulse shaping circuit and outputting the selected pulses to the motor driver; and a rotation detection circuit for detecting whether the rotor has rotated or not based on counter-electromotive force resulting from free oscillation of the rotor, the pulse shaping circuit includes: a normal drive pulse generation circuit for outputting a normal drive pulse at a time of driving the stepper motor; a detection pulse generation circuit for outputting, at a predetermined time after the normal drive pulse is output, a detection pulse for causing the rotation detection circuit to perform rotation detection; and a correction drive pulse generation circuit for outputting a correction drive pulse when the rotation detection circuit detects that the rotor has not rotated, the electronic watch further includes detection pulse change factor detecting means for detecting a factor of changing a pulse width or a pulse frequency of the detection pulse, and outputting a detection signal, the detection pulse generation circuit is capable of changing the pulse width or the pulse frequency of the detection pulse, and the detection pulse generation circuit changes the pulse width or the pulse frequency of the detection pulse to be output, in accordance with the detection signal of the detection pulse change factor detecting means.

Further, according to claim 2, in the above-mentioned structure, the motor driver includes drive terminals for outputting the various kinds of pulses in order to drive the stepper motor, the rotation detection circuit receives a signal from the drive terminal as an input, and the counter-electromotive force becomes detectable when the drive terminals are set to have high impedance by the detection pulse.

Further, according to claim 3, in the above-mentioned structure, the detection pulse change factor detecting means includes an elapsed time counter for measuring an elapsed time from an output time of the normal drive pulse and outputting of a detection signal after a predetermined period has elapsed.

Further, according to claim 4, in the above-mentioned structure, the detection pulse change factor detecting means includes a rotation detecting circuit, and the detection pulse generation circuit selects the pulse width or the pulse frequency of the detection pulse depending on a detection state of the rotation detecting means.

Further, according to claim 5, in the above-mentioned structure, the electronic watch further includes a power supply and a power supply voltage detection circuit for detecting an output voltage of the power supply, and the detection pulse change factor detecting means includes the power supply voltage detection circuit.

Further, according to claim 6, in the above-mentioned structure, the normal drive pulse generation circuit is capable of outputting a plurality of kinds of the normal drive pulses, the control circuit includes normal drive pulse width selecting means for outputting a normal drive pulse width selection signal for selecting a normal drive pulse having an appropriate pulse width, the detection pulse change factor detecting means includes the normal drive pulse width selecting means, and the detection pulse generation circuit changes the pulse width of the detection pulse in response to the normal drive pulse width selection signal.

Further, according to claim 7, in the above-mentioned structure, the detection pulse generation circuit is capable of generating a first detection pulse and a second detection pulse, the first detection pulse having a pulse width which is changed in accordance with the detection signal from the elapsed time counter, the second detection pulse having a fixed pulse width.

Further, according to claim 8, in the above-mentioned structure, the rotation detecting means outputs a detection signal in accordance with a detection state from when the normal drive pulse is output to a predetermined time, and the detection pulse generation circuit is capable of generating a first detection pulse and a second detection pulse, the first detection pulse having a pulse width which is changed in accordance with the detection signal from the rotation detecting means, the second detection pulse having a fixed pulse width.

Further, according to claim 9, in the above-mentioned structure, the rotation detecting means outputs a detection signal based on the second detection pulse.

Further, according to claim 10, in the above-mentioned structure, the rotation detecting means outputs a detection signal in accordance with a detection state from when the normal drive pulse is output to a predetermined time, and the detection pulse generation circuit is capable of generating a first detection pulse and a second detection pulse, the first detection pulse having a pulse frequency which is changed in accordance with the detection signal from the rotation detecting means, the second detection pulse having a fixed pulse frequency.

Further, according to claim 11, in the above-mentioned structure, after rotation detection made by the first detection pulse is finished, the detection pulse generation circuit further outputs the first detection pulse having the pulse width changed in accordance with the detection signal from the rotation detecting means.

Further, according to claim 12, in the above-mentioned structure, the first detection pulse is used in a first detection mode performed after the normal drive pulse is output, and the second detection pulse is used in a second detection mode performed after the first detection mode.

Further, according to claim 13, in the above-mentioned structure, the first detection pulse is changed in pulse width based on a detection result of a first detection mode performed after the normal drive pulse is output, and is used in a second detection mode performed after the first detection mode.

Further, according to 14, in the above-mentioned structure, the detection pulse generation circuit is capable of generating a dummy pulse which sets the drive terminals to have high impedance but is not used for detection, and the detection pulse generation circuit determines presence or absence of an output of the dummy pulse based on a detection result of the detection pulse change factor detecting means.

Effect of the Invention

As described above, according to the present invention, a plurality of periods having different widths of detection pulses are provided, and hence the electromagnetic brake can be changed and appropriately controlled in each period. With this, only a single detection step is necessary for increasing the detection pulse width to weaken the electromagnetic brake so that the current waveform is easily produced when counter-electromotive force needs to be detected more easily and for reducing the detection pulse width to enhance the electromagnetic brake so that the current waveform is less produced when the counter-electromotive force needs to be less detected in order to prevent erroneous detection. Therefore, there is an effect that, even in the case where an indicating hand having a large moment of inertia is used, for which it has heretofore been difficult to detect the rotation accurately with the conventional technology, it can be more accurately determined whether the motor has rotated or not than in the conventional case. Further, accurate rotation detection can be performed through only the adjustment of the width of the detection pulses which serve to detect the rotation and suppress the electromagnetic brake. Therefore, the present invention can be easily embedded in a conventional product without a large change in circuit configuration.

In addition, such use of an indicating hand having a large moment of inertia is also effective for an assembled watch, and also increases the degree of freedom of indicating hands available to customers in selling watch movements. Thus, the present invention is a very effective technology in view of design as well.

BRIEF DESCRIPTION OF THE DRAWINGS

FIG. 6 are waveform diagrams of current and voltage that are generated in a coil when a rotor has succeeded in rotating in the case where an indicating hand having a large moment of inertia is attached to the electronic watch according to the first embodiment of the present invention.

FIG. 7 are waveform diagrams of current and voltage that are generated in the coil when the rotor has failed to rotate in the case where the indicating hand having a large moment of inertia is attached to the electronic watch according to the first embodiment of the present invention.

FIG. 11 are waveform diagrams of current and voltage that are generated in a coil when a rotor has succeeded in rotating in the case where an indicating hand having a large moment of inertia is attached to the electronic watch according to the second embodiment of the present invention.

FIG. 12 are waveform diagrams of current and voltage that are generated in the coil when the rotor has failed to rotate in the case where the indicating hand having a large moment of inertia is attached to the electronic watch according to the second, fifth, and ninth embodiments of the present invention.

FIG. 16 are waveform diagrams of current and voltage that are generated in a coil when a rotor has failed to rotate in the case where an indicating hand having a large moment of inertia is attached to the electronic watch according to the third and fourth embodiments of the present invention.

FIG. 21 are waveform diagrams of current and voltage that are generated in the coil when the rotor has succeeded in rotating in the case where the indicating hand having a large moment of inertia is attached to the electronic watch according to the fourth embodiment of the present invention.

FIG. 22 are waveform diagrams of current and voltage that are generated in the coil when the rotor has succeeded in rotating in the case where the indicating hand having a large moment of inertia is attached to the electronic watch according to the fourth embodiment of the present invention.

FIG. 25 are waveform diagrams of current and voltage that are generated in a coil when a rotor of the conventional electronic watch has succeeded in rotating.

FIG. 26 are waveform diagrams of current and voltage that are generated in the coil when the rotor of the conventional electronic watch has failed to rotate.

FIG. 27 are waveform diagrams of current and voltage that are generated in the coil when the rotor has succeeded in rotating in the case where an indicating hand having a large moment of inertia is attached to the conventional electronic watch.

FIG. 28 are waveform diagrams of current and voltage that are generated in the coil when the rotor has succeeded in rotating in the case where the indicating hand having a large moment of inertia is attached to the conventional electronic watch and the electronic watch according to the third embodiment of the present invention.

FIG. 30 are waveform diagrams of current and voltage that are generated in the coil when the rotor has failed to rotate in the case where the indicating hand having a large moment of inertia is attached to the conventional electronic watch.

FIG. 33 are waveform diagrams of current and voltage that are generated in a coil when a rotor has succeeded in rotating in the case where an indicating hand having a large moment of inertia is attached to the electronic watch according to the fifth embodiment of the present invention.

FIG. 37 are waveform diagrams of current and voltage that are generated in a coil when a rotor has succeeded in rotating in the case where an indicating hand having a large moment of inertia is attached to the electronic watch according to the sixth embodiment of the present invention.

FIG. 38 are waveform diagrams of current and voltage that are generated in the coil when the rotor has failed to rotate in the case where the indicating hand having a large moment of inertia is attached to the electronic watch according to the sixth and eighth embodiments of the present invention.

FIG. 42 are waveform diagrams of current and voltage that are generated in a coil when a rotor has succeeded in rotating in the case where an indicating hand having a large moment of inertia is attached to the electronic watch according to the seventh embodiment of the present invention.

FIG. 43 are waveform diagrams of current and voltage that are generated in the coil when the rotor has failed to rotate in the case where the indicating hand having a large moment of inertia is attached to the electronic watch according to the seventh embodiment of the present invention.

FIG. 46 are waveform diagrams of current and voltage that are generated in a coil when a rotor has succeeded in rotating in the case where an indicating hand having a large moment of inertia is attached to the electronic watch according to the eighth embodiment of the present invention.

FIG. 49 are waveform diagrams of current and voltage that are generated in a coil when a rotor has succeeded in rotating in the case where an indicating hand having a large moment of inertia is attached to the electronic watch according to the ninth embodiment of the present invention.

MODE FOR CARRYING OUT THE INVENTION

Basic Concept

Hereinafter, the basic concept of the present invention is described in detail with reference to the drawings.

Figure 1:
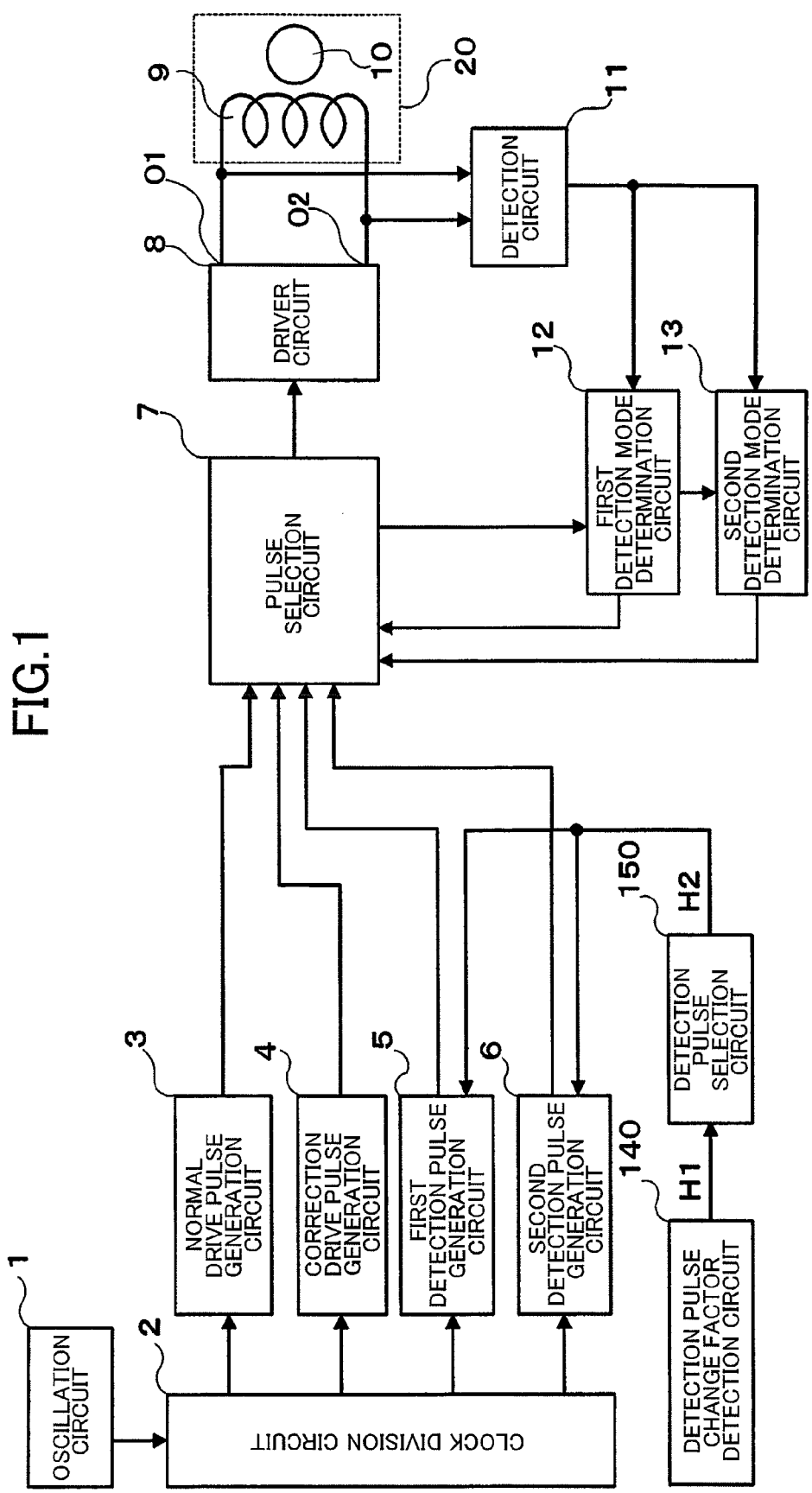
FIG. 1 is a block diagram illustrating a circuit configuration of the basic concept of the present invention.
Figure 2:
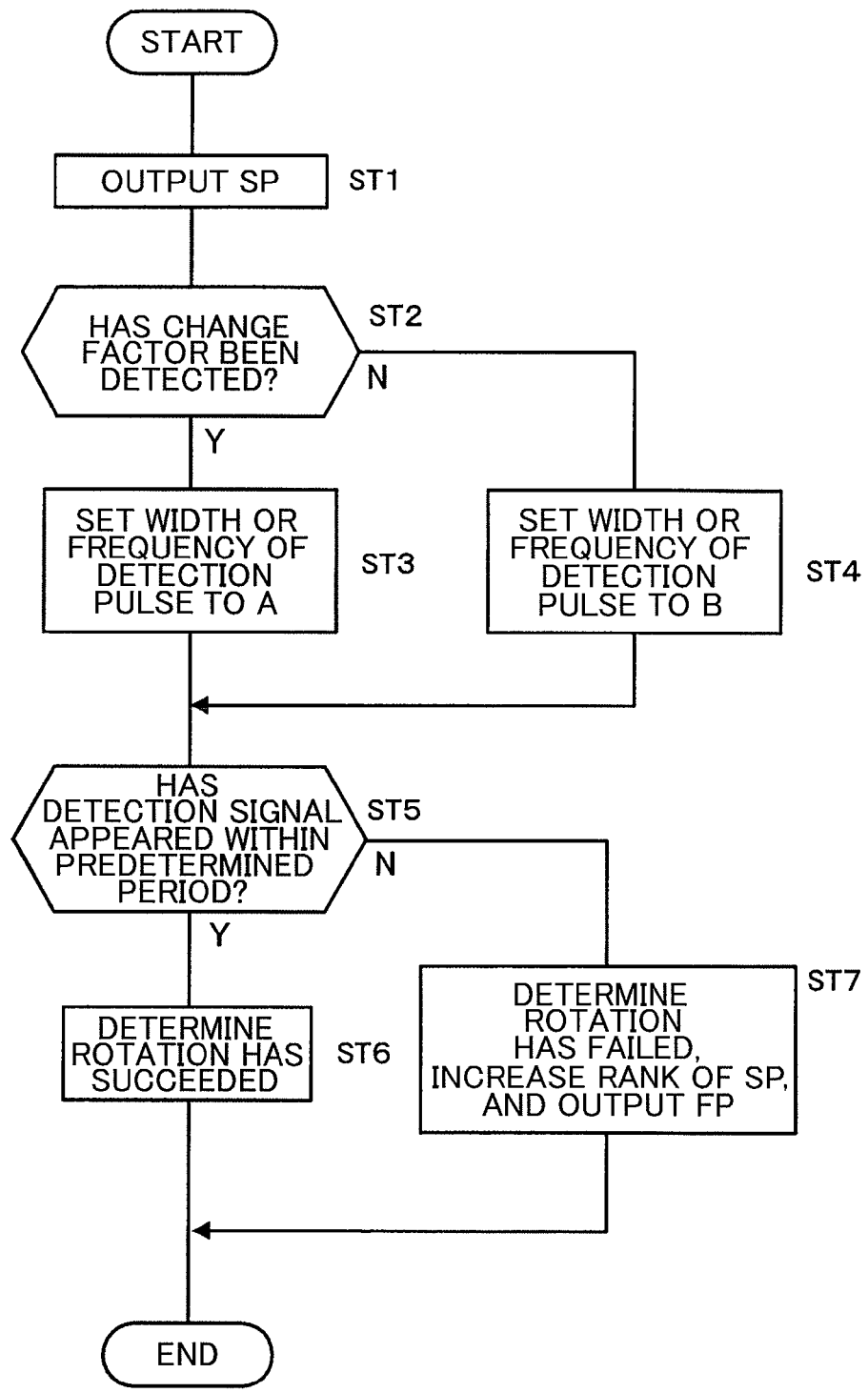
FIG. 2 is a flowchart of the basic concept of the present invention.

FIG. 1 is a block diagram illustrating a circuit configuration of the basic concept of the present invention. FIG. 2 is a flowchart of the basic concept of the present invention. Note that the same components as those described in the conventional example are denoted by the same numerals and further description is omitted.

The differences from the conventional technology are as follows, and the other components are substantially identical with those in the conventional technology.

(1) A first detection pulse generation circuit 5 and a second detection pulse generation circuit 6 are each capable of generating a plurality of kinds of detection pulses having different pulse widths.

(2) The present invention includes a detection pulse change factor detection circuit 140 for detecting a factor of changing the width of a detection pulse and outputting a change factor detection signal H1, and a detection pulse selection circuit 150 for instructing each of the first detection pulse generation circuit 5 and the second detection pulse generation circuit 6 about an optimum pulse width in response to the change factor detection signal H1.

In order to realize an optimum electromagnetic brake, the detection pulse change factor detection circuit 140 detects the factor of changing the detection pulse width and outputs the result to the detection pulse selection circuit 150 as the change factor detection signal H1. Based on the change factor detection signal H1, the detection pulse selection circuit 150 selects, at the time of each detection, an optimum detection pulse width that enables an optimum electromagnetic brake with which accurate rotation detection can be performed, and the detection pulse selection circuit 150 instructs each of the first detection pulse generation circuit 5 and the second detection pulse generation circuit 6 about the optimum detection pulse width.

The operation of the basic concept is described with reference to the flowchart.

FIG. 2 is a flowchart illustrating a method of detecting the rotation of a rotor 10 in an electronic watch according to the basic concept, and illustrates the operation performed every second, on the second.

A normal drive pulse SP is output at the time of the second (Step ST1), and the rotation detection is started after a predetermined period has elapsed since that second. At this time, it is judged whether a predetermined detection pulse change factor has been detected (Step ST2). When the detection pulse change factor has been detected (ST2: Y), the width or frequency of a detection pulse is set to A (Step ST3) and otherwise (ST2: N) set to B (Step ST4).

It is then determined whether a detection signal has been detected within a predetermined period (Step ST5). When a detection signal has been detected within the predetermined period (ST5: Y), it is determined that the rotation has succeeded. Then, a correction drive pulse FP is not output, and when the next normal drive pulse is output, a normal drive pulse SP having the same driving power as the previous one is output (Step ST6). When a detection signal has not been detected within the predetermined period (ST5: N), it is determined that the rotation has failed, and then the correction drive pulse FP is output, and at the same time, a normal drive pulse having the next higher-ranked driving power is output (Step ST7). This step completes the operation for the second concerned, and the operation is restarted from the beginning after waiting for the next second.

Hereinafter, the present invention is described in detail by way of exemplary embodiments.

Note that for simple description, the following embodiments use one or two change conditions of the detection pulse width and use two kinds of detection pulse widths, 0.0625 ms and 0.25 ms. The present invention, however, should not be limited thereto.

Three or more multiple change conditions may be set. This case provides three or more sections in which the detection pulse is to be changed, and the width of the detection pulse may be varied in all the sections. Of course, the detection pulse width is not limited to the above-mentioned numerical values, either.

First Embodiment

Change Depending on Time

Hereinafter, a first embodiment of the present invention is described in detail with reference to the drawings. The first embodiment is an example in which the detection pulse width is different depending on a detection period.

During a first detection mode period after the output of a normal drive pulse, the rotor has momentum and a counter-electromotive current is accordingly large. During a second detection mode period following the first detection mode, the counter-electromotive current is smaller than that in the first detection mode period.

In light of this, in a time period corresponding to the first detection mode period having a large counter-electromotive current, the width of the detection pulse is reduced to enhance an electromagnetic brake so as to suppress the counter-electromotive current, and in the second detection mode period having a small counter-electromotive current, the width of the detection pulse is increased to weaken the electromagnetic brake so as to promote the counter-electromotive current, to thereby perform more accurate rotation detection.

Figure 3:
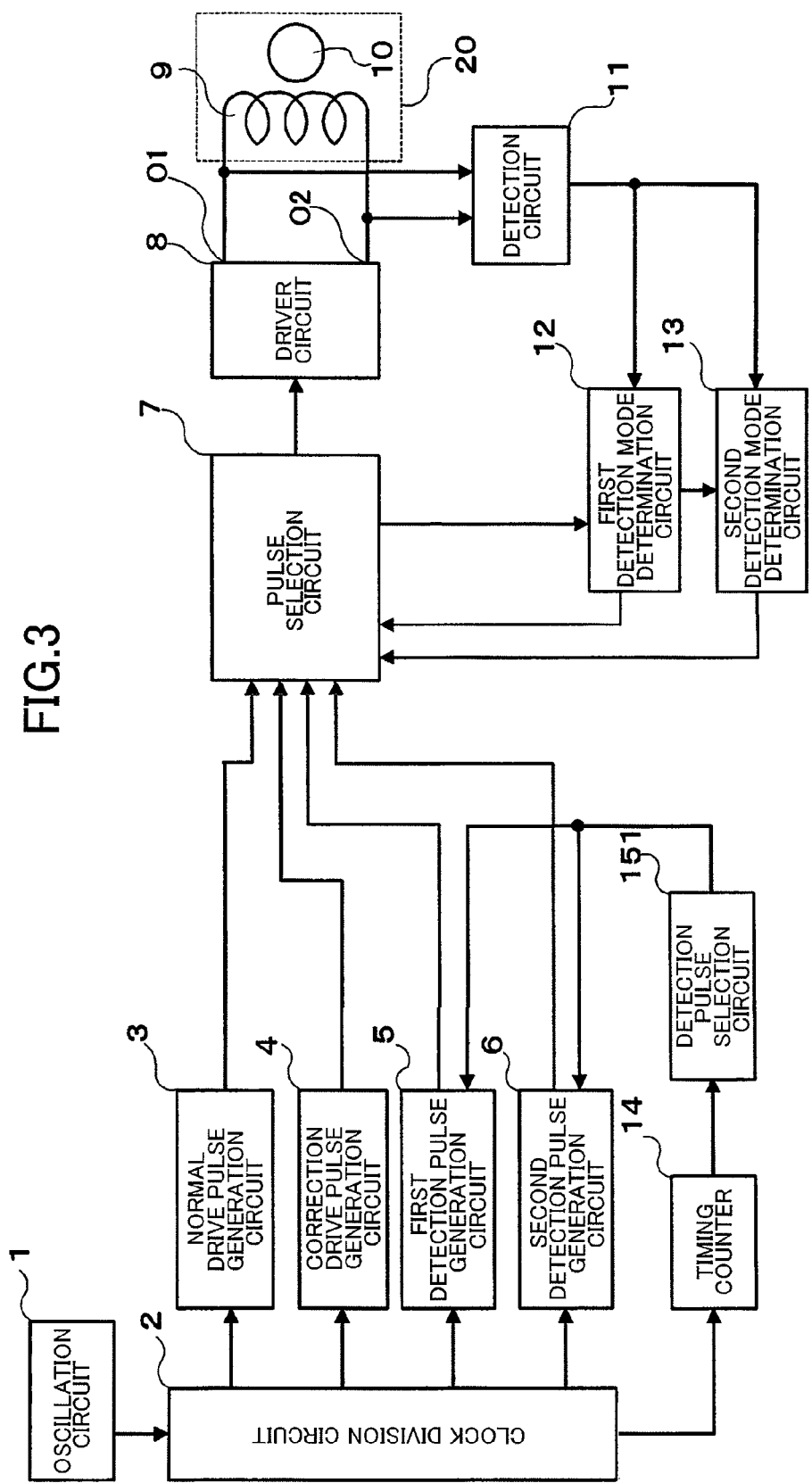
FIG. 3 is a block diagram illustrating a circuit configuration according to a first embodiment of the present invention.
Figure 4:
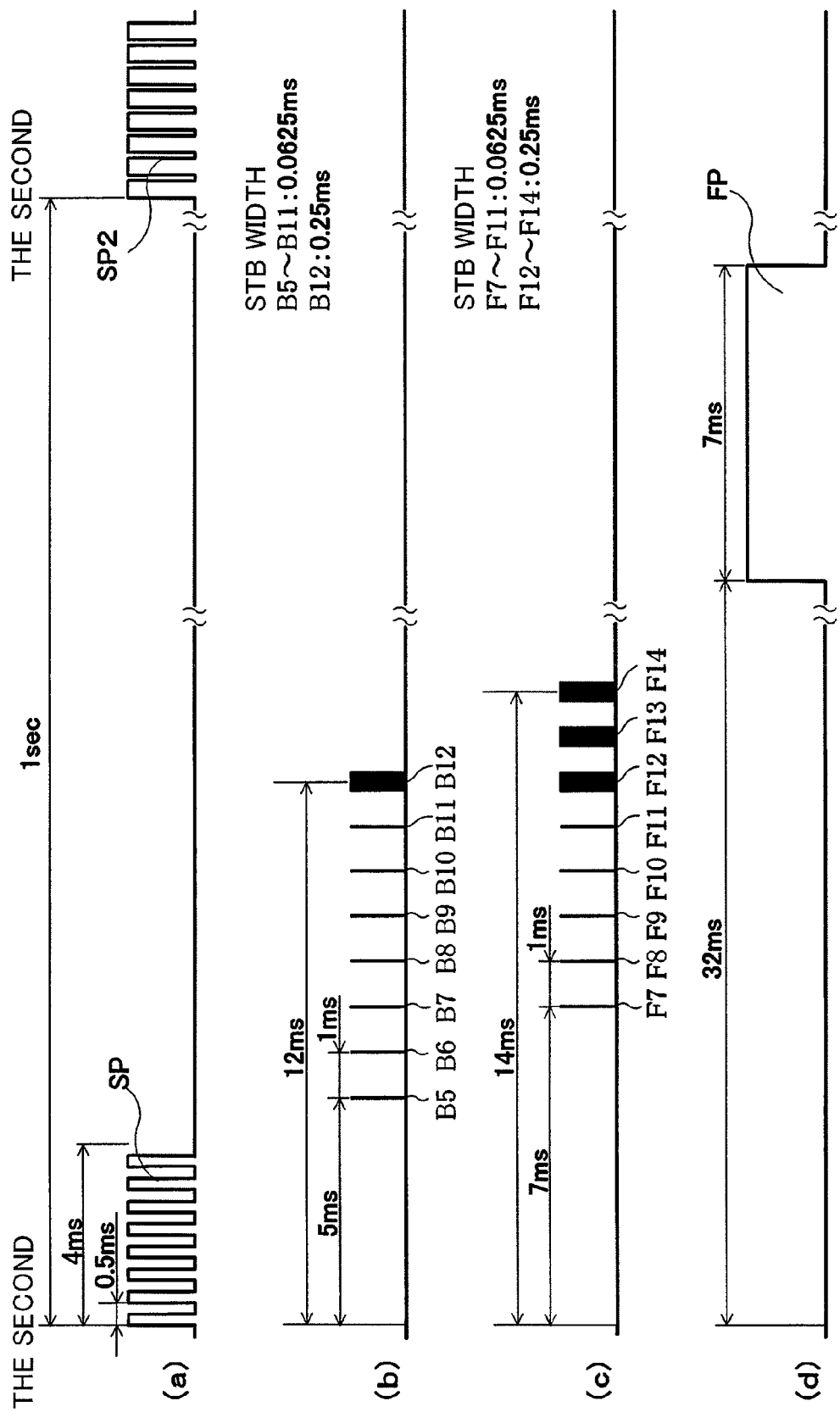
FIG. 4 are waveform diagrams of pulses that are generated by circuits of an electronic watch according to the first embodiment of the present invention.
Figure 5:
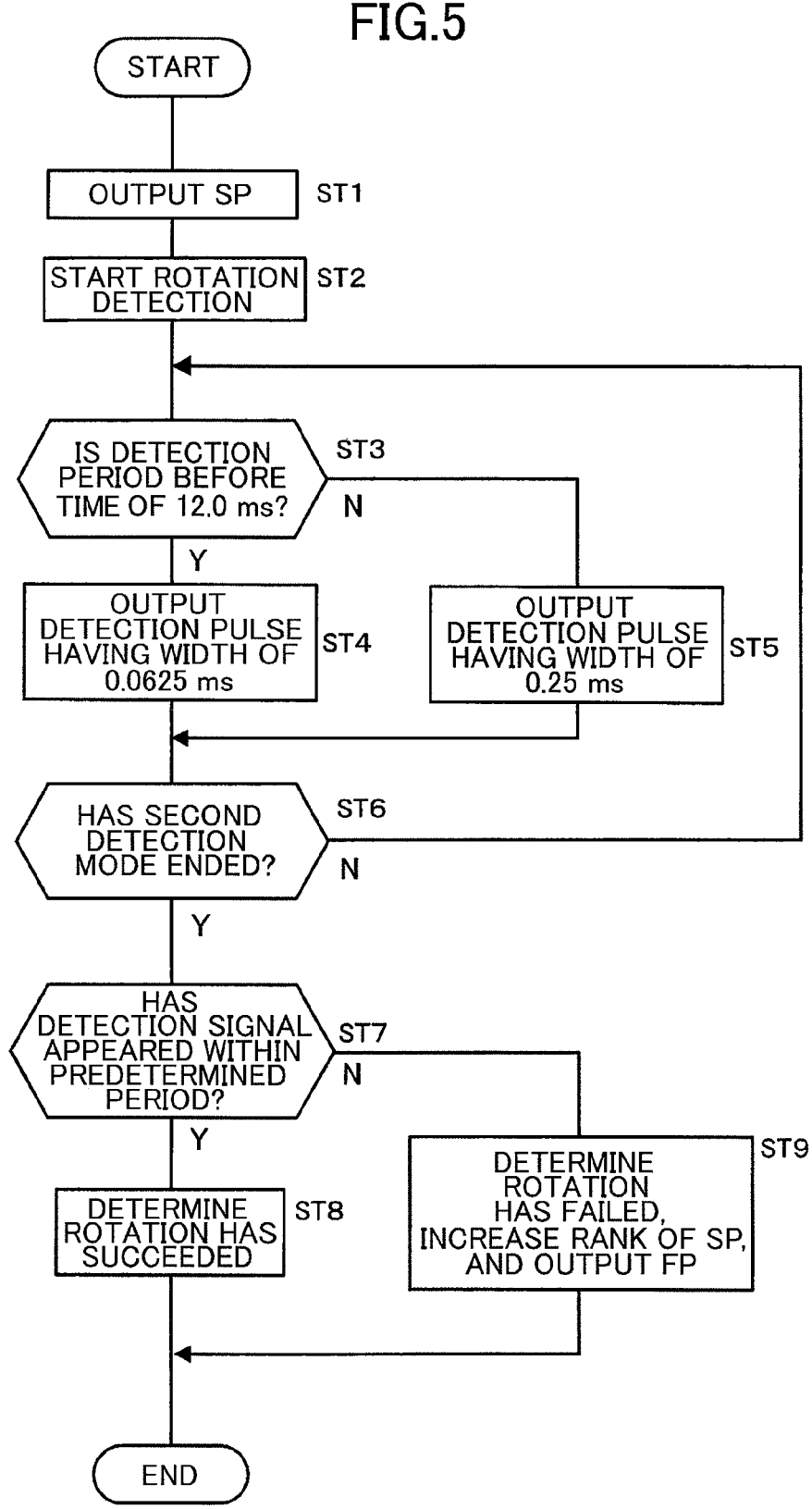
FIG. 5 is a flowchart of the electronic watch according to the first embodiment of the present invention.

FIG. 3 is a block diagram illustrating a circuit configuration of an electronic watch according to the first embodiment of the present invention. FIG. 4 are waveform diagrams of pulses that are generated by circuits of the electronic watch according to the first embodiment of the present invention. FIG. 5 is a flowchart of the electronic watch according to the first embodiment of the present invention. FIG. 6 are waveform diagrams of current and voltage that are generated in a coil in the case where an indicating hand having a large moment of inertia is attached to the electronic watch according to the first embodiment of the present invention. FIG. 7 are waveform diagrams of current and voltage that are generated in the case where the rotor 10 has failed to rotate because driving power of a stepper motor 20 has been weakened due to abrupt application of load such as calendar from the state of FIG. 6 of the electronic watch according to the first embodiment of the present invention. Note that the same components as those described in the conventional example are denoted by the same numerals and further description is omitted.

In FIG. 3, reference numeral 20 denotes the stepper motor including a coil 9 and the rotor 10; 1, an oscillation circuit; 2, a clock division circuit; 3, a normal drive pulse generation circuit; and 4, a correction drive pulse generation circuit, which are the same as those in the conventional technology.

Reference numeral 5 denotes a first detection pulse generation circuit, which outputs detection pulses B5 to B12 to be used in the first detection mode based on a signal of the clock division circuit 2. As illustrated in FIG. 4(b), the first detection pulse generation circuit 5 is configured so that the detection pulses B5 to B11 are output as pulses each having a width of 0.0625 ms every 1 ms from 5 ms after the second until 11 ms after the second, and the detection pulse B12 is output as a pulse having a width of 0.25 ms after 12 ms has elapsed from the second.

Reference numeral 6 denotes a second detection pulse generation circuit, which outputs detection pulses F7 to F14 to be used in the second detection mode based on a signal of the clock division circuit 2. As illustrated in FIG. 4(c), the second detection pulse generation circuit 6 is configured so that the detection pulses F7 to F11 are output as pulses each having a width of 0.0625 ms every 1 ms from 7 ms after the second until 11 ms after the second, and the detection pulses F12 to F14 are output as pulses each having a width of 0.25 ms every 1 ms from 12 ms after the second until 14 ms has elapsed from the.

Reference numeral 7 denotes a pulse selection circuit; 8, a driver circuit; 9, the coil; 10, the rotor; 11, a detection circuit; 12, a first detection mode determination circuit for determining the first detection mode based on a detection signal of the detection circuit 11; and 13, a second detection mode determination circuit for determining the second detection mode based on a detection signal of the detection circuit 11, which are the same as those in the conventional technology.

Reference numeral 14 denotes a timing counter, which counts time elapsed from the output of SP. In this embodiment, the timing counter 14 corresponds to the detection pulse change factor detection circuit 140.

Reference numeral 151 denotes a detection pulse selection circuit, which selects the detection pulses having different pulse widths generated by the first detection pulse generation circuit 5 and the second detection pulse generation circuit 6 based on a count signal of the timing counter 14, and controls the first detection pulse generation circuit 5 and the second detection pulse generation circuit 6 so as to output the selected detection pulses. That is, the detection pulse selection circuit 151 is detection pulse control means for controlling the first detection pulse generation circuit 5 and the second detection pulse generation circuit 6 so that the width of the detection pulse can be changed in a rotation detection period.

Both the first detection pulse generation circuit 5 and the second detection pulse generation circuit 6 are capable of outputting the pulse having a width of 0.0625 ms and the pulse having a width of 0.25 ms, and are configured to select and output the pulse having a width of 0.0625 ms before the count signal of the timing counter 14 is input (before the time of 11 ms) and the pulse having a width of 0.25 ms after the count signal of the timing counter 14 is input (after the time of 11 ms).

Subsequently, the operation of the above-mentioned configuration is described. The pulse selection circuit 7 selects, at the time of the second, the normal drive pulse SP output from the normal drive pulse generation circuit 3 and drives the stepper motor 20. After 5 ms from the second, the first detection mode is started. In the first detection mode, the pulse selection circuit 7 outputs the detection pulses B5 to B12, which are output from the first detection pulse generation circuit 5, based on the signal of the detection pulse selection circuit 151, and controls the stepper motor 20 so as to change the impedance of the coil 9. The detection circuit 11 then detects induced voltages that are generated in the coil 9 by the detection pulses B5 to B12, and outputs a detection signal when detecting an induced voltage exceeding a threshold Vth. The pulse selection circuit 7, on the other hand, instructs the first detection mode determination circuit 12 to start its determination operation. The first detection mode determination circuit 12 determines the presence or absence of the detection signal in the first detection mode based on the input of the detection signal from the detection circuit 11. When the detection signal has been generated from the detection circuit 11 twice, the first detection mode determination circuit 12 determines the detection and immediately stops the detection pulses output from the first detection pulse generation circuit 5 to notify the pulse selection circuit 7 so as to end the operation of the first detection mode and not generate the correction drive pulse FP. The first detection mode determination circuit 12 further instructs the second detection mode determination circuit 13 to start its operation, to thereby shift to the second detection mode. However, when the detection pulses B6 to B12 have produced no detection signal at all, or only one detection signal, the first detection mode determination circuit 12 determines that the rotation has failed and ends the operation of the first detection mode. Then, without shifting to the second detection mode, the correction drive pulse FP is output, and when the next normal drive pulse is output, a normal drive pulse SP2 having the next higher-ranked driving power to the previous one is output from the normal drive pulse generation circuit 3.

After the shift to the second detection mode, the pulse selection circuit 7 outputs the detection pulses F7 to F14, which are output from the second detection pulse generation circuit 6, based on the signal of the detection pulse selection circuit 151, and controls the stepper motor 20. The detection circuit 11 then detects induced voltages that are generated in the coil 9 by the detection pulses, and outputs a detection signal when detecting an induced voltage exceeding the threshold Vth. The second detection mode determination circuit 13 receives the detection signal of the detection circuit 11. When the detection signal has been generated twice, the second detection mode determination circuit 13 determines that the rotation has succeeded and immediately stops the detection pulses output from the second detection pulse generation circuit 6 to end the operation of the second detection mode, and further controls the pulse selection circuit 7 so as not to output the correction drive pulse FP. However, the detection of the detection signal generated by the detection pulses F7 to F14 is finished when the detection signal has been detected six times at most. If no detection signal or only one detection signal has been generated during the detection, it is determined that the rotation has failed and the correction drive pulse FP is output.

As described above, the elapsed period from the output of the normal drive pulse involves two rotation detection periods having different detection pulse widths. That is, in the first rotation detection period, the detection pulse width is reduced to 0.0625 ms so that the electromagnetic brake is generated to suppress free oscillation of the rotor 10, and in the second rotation detection period, the detection pulse width is increased to 0.25 ms so that the electromagnetic brake is suppressed to increase the free oscillation of the rotor 10.

An actual method of detecting the rotation through the above-mentioned operation is described with reference to waveform diagrams of FIGS. 6 and 4. First, the case where an indicating hand having a large moment of inertia is attached is described. FIG. 6(a) is, similarly to FIG. 27(a) in the conventional example, a waveform of a current that is induced in the coil 9 when the indicating hand having a large moment of inertia is attached. FIG. 6(b) is a waveform of a voltage generated at one terminal O1 of the coil 9 at this time and FIG. 6(c) is a waveform of a voltage generated at another terminal O2 of the coil 9.

First, the normal drive pulse SP illustrated in FIG. 4(a) is applied to the terminal O1 of the coil 9, and the rotor 10 rotates to generate a current waveform c1 illustrated in FIG. 6(a). After the end of the normal drive pulse SP, the rotor 10 enters a freely oscillating state, and the current waveform becomes current waveforms denoted by c2, c3, and c4. At the time of 5 ms, the first detection mode is started, and the detection pulse B5 illustrated in FIG. 4(b) is applied to the coil 9. As illustrated in FIG. 6(a), at 5 ms, the current waveform is in the region of the current waveform c2, in which the current value is negative. Accordingly, as illustrated in FIG. 6(c), an induced voltage V5 generated by the detection pulse B5 never exceeds the threshold Vth. At 7 ms, however, the current waveform is in the region of the current waveform c3, in which the current value is changed to the positive direction. Accordingly, as illustrated in FIG. 6(c), an induced voltage V7 generated by the detection pulse B7 becomes a detection signal exceeding the threshold Vth. Similarly at 8 ms, the current waveform is also in the region of the current waveform c3, and an induced voltage V8 generated by the detection pulse B8 becomes a detection signal exceeding the threshold Vth. Because the two detection signals of the induced voltages V7 and V8 have exceeded the threshold Vth, the mode is switched to the second detection mode.

In response to the switching to the second detection mode by the induced voltage V8 generated by the detection pulse B8, a next timing detection pulse, namely the detection pulse F9 at the time of 9 ms, is applied to the coil 9. As illustrated in FIG. 6(a), at 9 ms, the current waveform is in the region of the current waveform c3, in which the current value is positive. Accordingly, as illustrated in FIG. 6(b), an induced voltage V9 never exceeds the threshold Vth. Similarly, the current waveform for induced voltages V10 and V11 is also in the region of the current waveform c3, and the induced voltages V10 and V11 never exceed the threshold Vth. At 12 ms, however, the detection pulse width is changed to be larger from 0.0625 ms to 0.25 ms, and hence the electromagnetic brake is suppressed and the free oscillation of the rotor 10 becomes less likely to attenuate. Because the free oscillation is less likely to attenuate, the current waveform is in the region of the current waveform c4, in which the current value is changed to the negative direction. Accordingly, as illustrated in FIG. 6(b), an induced voltage V12 becomes a detection signal exceeding the threshold Vth. An induced voltage V13 generated by the detection pulse F13 also becomes a detection signal exceeding the threshold Vth. Because the two detection signals of the induced voltages V12 and V13 have exceeded the threshold Vth, the second detection mode determination circuit 13 normally determines that the rotation has succeeded. Then, the correction drive pulse FP is not output, and when the next normal drive pulse is output, the normal drive pulse SP having the same driving power as the previous one is output.

Subsequently, the case where the rotor 10 has failed to rotate due to abrupt application of load such as a calendar is described with reference to waveform diagrams of FIGS. 7 and 4. FIG. 7(a) is, similarly to FIG. 30(a) in the conventional example, a waveform of a current that is induced in the coil 9 when the rotor 10 has failed to rotate. FIG. 7(b) is a waveform of a voltage generated at one terminal O1 of the coil 9 at this time and FIG. 7(c) is a waveform of a voltage generated at another terminal O2 of the coil 9.

First, at the time of 5 ms, the first detection mode is started, and the detection pulse B5 is applied to the coil 9. As illustrated in FIG. 7(a), the current waveform is in the region of a current waveform c5, in which the current value is positive. Accordingly, as illustrated in FIG. 7(c), the induced voltage V5 becomes a detection signal exceeding the threshold Vth. Also at 6 ms, the current waveform is in the region of the current waveform c5, and the induced voltage V6 becomes a detection signal exceeding the threshold Vth. Because the two detection signals of the induced voltages V5 and V6 have exceeded the threshold Vth, the mode shifts to the second detection mode.

In response to the shift to the second detection mode by the induced voltage V6, the next timing detection pulse, namely the detection pulse F7 at the time of 7 ms, is applied to the coil 9. As illustrated in FIG. 7(a), at 7 ms, the current waveform is in the region of the current waveform c5, in which the current value is positive, and hence, as illustrated in FIG. 7(b), the induced voltage V7 never exceeds the threshold Vth. The current waveform for the induced voltages V8 to V11 is also in the region of the current waveform c5, and the induced voltages V8 to V11 never exceed the threshold Vth. At 12 ms, which corresponds to the sixth detection in the second detection mode, the detection pulse width is changed from 0.0625 ms to 0.25 ms. However, because the rotor 10 has already completely stopped, even the increase of the detection pulse width produces no factor of generating free oscillation of the rotor. Thus, the induced voltage V12 generated by the detection pulse F12 never exceeds the threshold Vth. The second detection mode is terminated after this sixth detection. Accordingly, the second detection mode determination circuit 13 normally determines that the rotation has failed. Then, the correction drive pulse FP is output, and when the next normal drive pulse is output, the normal drive pulse SP2 having the next higher-ranked driving power to the previous one is output from the normal drive pulse generation circuit 3. Therefore, the clock never stops.

As described above, in the first embodiment, in the rotation detection periods, two periods, namely the period in which the detection pulse width is small and the period in which the detection pulse width is large, are provided to control the free oscillation of the rotor, and hence it can be normally determined whether the rotor has rotated or not.

The above-mentioned operation is described with reference to a flowchart. FIG. 5 is a flowchart illustrating the method of detecting the rotation of the rotor 10 in the electronic watch according to the first embodiment, and illustrates the operation performed every second, on the second. The normal drive pulse SP is output at the time of the second (Step ST1), and the rotation detection is started after 5 ms has elapsed since the second (Step ST2). It is determined whether the detection period is before the time of 12.0 ms (Step ST3). When the detection period is before the time of 12.0 ms, the detection pulse having a width of 0.0625 ms is output (Step ST4). When the detection period is after the time of 12.0 ms inclusive, the detection pulse having a width of 0.25 ms is output (Step ST5). The process from ST3 to ST5 is repeated until the second detection mode ends (Step ST6). It is then determined whether a detection signal has been detected within a predetermined period (Step ST7). When a detection signal has been detected within the predetermined period, it is determined that the rotation has succeeded. Then, the correction drive pulse FP is not output, and when the next normal drive pulse is output, the normal drive pulse SP having the same driving power as the previous one is output (Step ST8). When a detection signal has not been detected within the predetermined period, it is determined that the rotation has failed, and then the correction drive pulse FP is output and, at the same time, a normal drive pulse having the next higher-ranked driving power is output (Step ST9). This step completes the operation for the second concerned, and the operation is restarted from the beginning after waiting for the next second.

Note that the above description is illustrative of this embodiment, which may be modified as follows, for example.

(1) In this embodiment, the width of the detection pulse is changed in two sections before and after the time of 11 ms, but the width of the detection pulse may be changed in three or more separate time periods. The pulse width may be changed in each section, or the same pulse width may be used in some sections. This configuration enables finer electromagnetic brake control, thus enabling more accurate rotation detection.

(2) The respective numerical values, such as the detection pulse width (0.0625 ms, 0.25 ms) and the timing count value (11 ms), are not limited to the above-mentioned numerical values and should be optimized depending on the motor or the indicator (such as an indicating hand and a date dial) to be attached.

(3) The pulse width control in the time period may be realized by, instead of the control made by the timing counter 14, a method of producing detection pulses in the form illustrated in FIGS. 4(*b*) and 4(*c*). In this case, the timing counter 14 is unnecessary and the circuit can be reduced in size. Note that, for example, in the case where the motor is changed to another one and the time period of changing the detection pulse width is to be changed, the first detection pulse generation circuit 5 and the second detection pulse generation circuit 6 need to be changed accordingly and the design load increases. Therefore, in view of the application to various models, the example of this embodiment using the timing counter 14 is more preferred.

Second Embodiment

Change Depending on Detection Situation of First Detection Mode

Next, a second embodiment of the present invention is described in detail with reference to the drawings. The second embodiment is an example in which the detection pulse width in the second detection mode is changed depending on the detection condition in the first detection mode.

The detection condition in the first detection mode often differs between when the rotation has succeeded and when the rotation has failed. This embodiment utilizes this, and when the probability of success of the rotation is high, the width of the detection pulse in the second detection mode is increased to weaken an electromagnetic brake so that counter-electromotive force is more easily detected, while when the probability that the motor does not rotate is high, on the other hand, the width of the detection pulse in the second detection mode is reduced to enhance the electromagnetic brake so that the counter-electromotive force is less easily detected, to thereby prevent erroneous detection.

Figure 8:
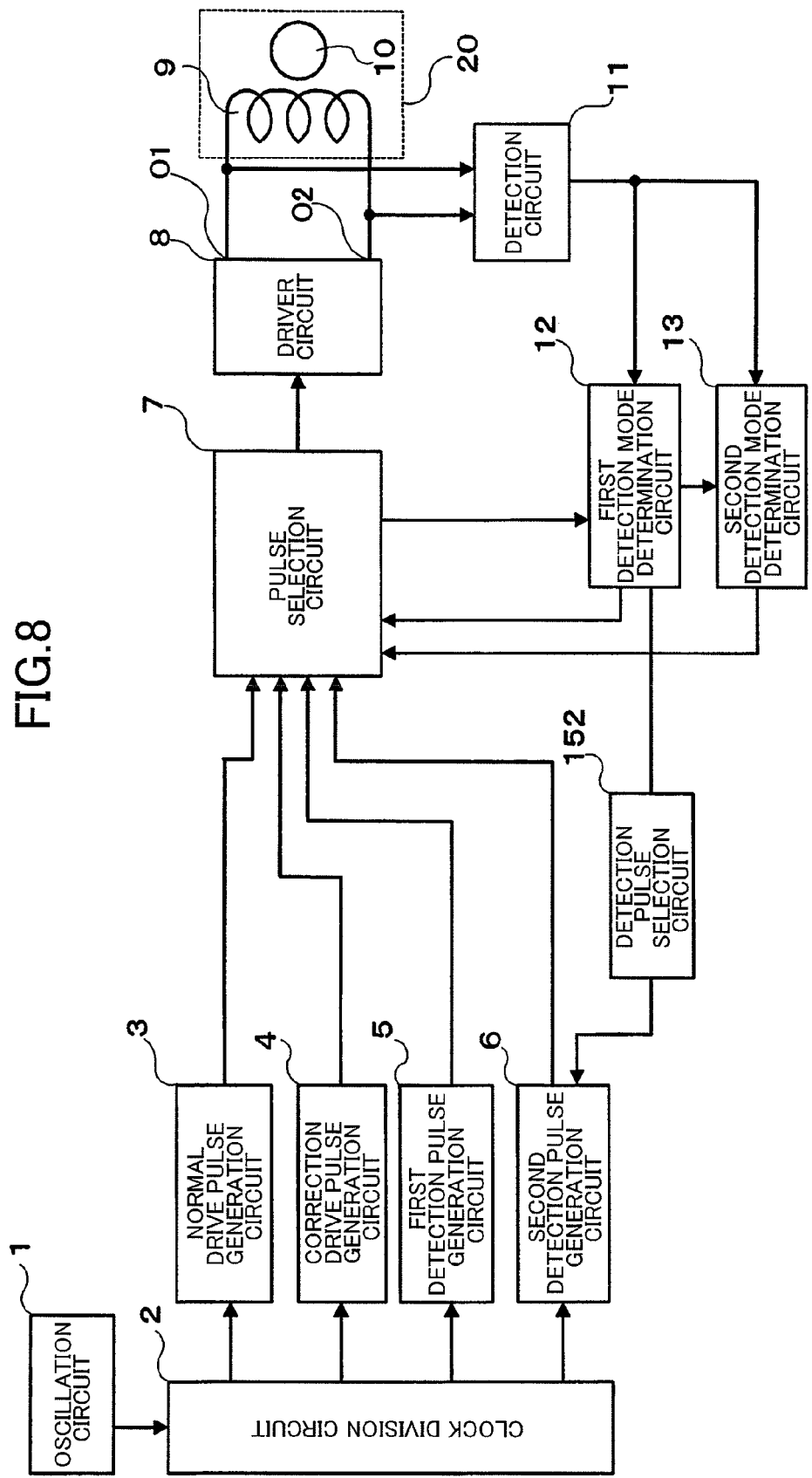
FIG. 8 is a block diagram illustrating a circuit configuration according to a second embodiment of the present invention.
Figure 9:
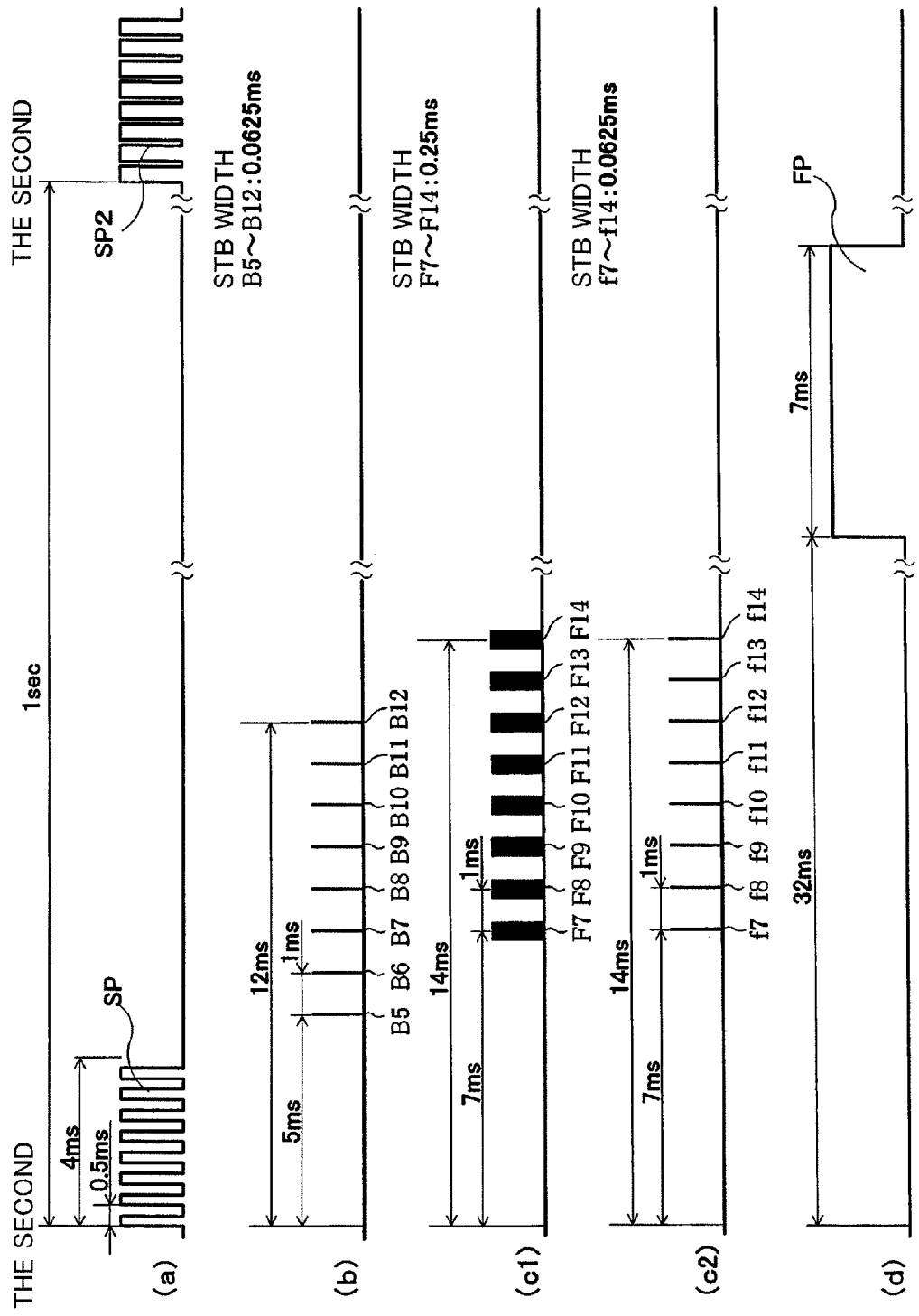
FIG. 9 are waveform diagrams of pulses that are generated by circuits of an electronic watch according to the second embodiment of the present invention.
Figure 10:
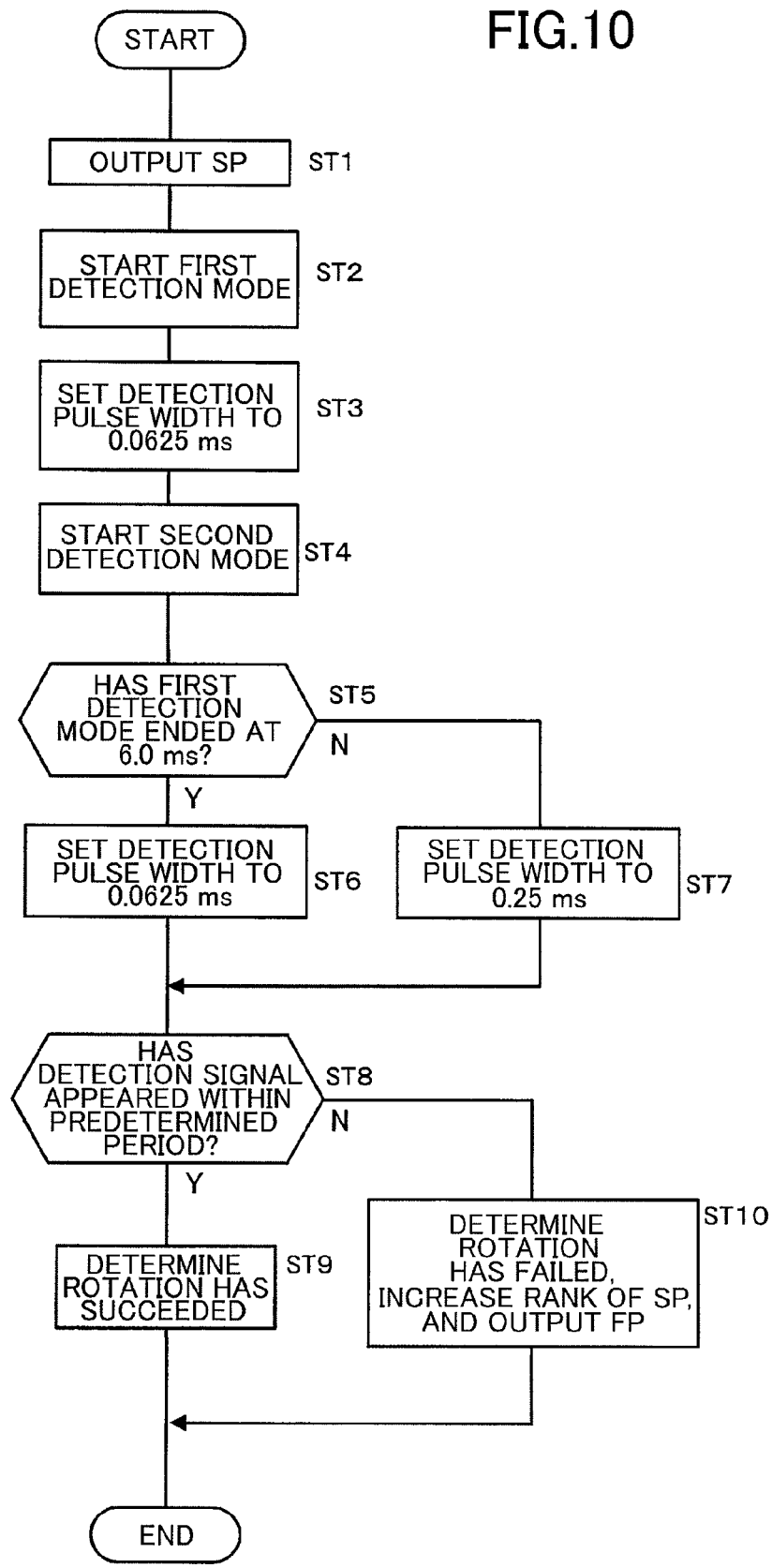
FIG. 10 is a flowchart of the electronic watch according to the second embodiment of the present invention.

FIG. 8 is a block diagram illustrating a circuit configuration of an electronic watch according to the second embodiment. FIG. 9 are waveform diagrams of pulses that are generated by circuits of the electronic watch according to the second embodiment. FIG. 10 is a flowchart of the electronic watch according to the second embodiment. FIG. 11 are waveform diagrams of current and voltage that are generated in a coil in the case where an indicating hand having a large moment of inertia is attached to the electronic watch according to the second embodiment of the present invention. FIG. 12 are waveform diagrams of current and voltage that are generated in the case where a rotor 10 has failed to rotate because driving power of a stepper motor 20 has been weakened due to abrupt application of a load such as a calendar from the state of FIG. 11 of the electronic watch according to the second embodiment of the present invention. Note that the same components as those described in the conventional example and the first embodiment are denoted by the same numerals and further description is omitted.

In FIG. 8, reference numeral 20 denotes the stepper motor including a coil 9 and the rotor 10; 1, an oscillation circuit; 2, a clock division circuit; 3, a normal drive pulse generation circuit; 4, a correction drive pulse generation circuit; and 5, a first detection pulse generation circuit, which outputs detection pulses B5 to B12 for the first detection mode based on a signal of the clock division circuit 2. As illustrated in FIG. 9(*b*), the detection pulses B5 to B12 are pulses each having a width of 0.0625 ms and are output every 1 ms from when 5 ms has elapse from the second until 12 ms has elapsed from the second since. Reference numeral 6 denotes a second detection pulse generation circuit, which outputs detection pulses F7 to F14 or detection pulses f7 to f14 to be used in the second detection mode based on a signal of the clock division circuit 2 and a signal of a detection pulse selection circuit 152 to be described later. The detection pulses F7 to F14 are pulses each having a width of 0.25 ms as illustrated in FIG. 9(*c*1), and the detection pulses f7 to f14 are pulses each having a width of 0.0625 ms as illustrated in FIG. 9(*c*2). The detection pulses F7 to F14 and f7 to f14 are output every 1 ms from 7 ms after the second until 14 ms has elapsed from the second.

Reference numeral 7 denotes a pulse selection circuit; 8, a driver circuit; 9, the coil; 10, the rotor; 11, a detection circuit; 12, a first detection mode determination circuit for determining the first detection mode based on a detection signal of the detection circuit 11; 13, a second detection mode determination circuit for determining the second detection mode based on a detection signal of the detection circuit 11; and 152, the detection pulse selection circuit, which selects the detection pulses having different pulse widths generated by the second detection pulse generation circuit 6 based on a determination result of the first detection mode determination circuit 12, and controls the second detection pulse generation circuit 6 so as to output the selected detection pulses. That is, the detection pulse selection circuit 152 is detection pulse control means for controlling the second detection pulse generation circuit 6 so that the width of the detection pulse can be changed depending on the determination result of the first detection mode determination circuit 12. In other words, in this embodiment, the first detection mode determination circuit 12 also serves as the detection pulse change factor detection circuit 140.

Subsequently, the operation of the above-mentioned configuration is described. The pulse selection circuit 7 selects, at the timing of the second, a normal drive pulse SP output from the normal drive pulse generation circuit 3 and drives the stepper motor 20. After 5 ms from the second, the first detection mode is started. In the first detection mode, the pulse selection circuit 7 outputs the detection pulses B5 to B12, which are output from the first detection pulse generation circuit 5, and controls the stepper motor 20 so as to change the impedance of the coil 9. The detection circuit 11 then detects induced voltages that are generated in the coil 9 by the detection pulses B5 to B12, and outputs a detection signal when detecting an induced voltage exceeding a threshold Vth. The pulse selection circuit 7, on the other hand, instructs the first detection mode determination circuit 12 to start its determination operation. The first detection mode determination circuit 12 determines the presence or absence of the detection signal in the first detection mode based on the input of the detection signal from the detection circuit 11. When the detection signal has been generated from the detection circuit 11 twice, the first detection mode determination circuit 12 determines the detection and immediately stops the detection pulses output from the first detection pulse generation circuit 5 to notify the pulse selection circuit 7 so as to end the operation of the first detection mode and not to generate a correction drive pulse FP. The first detection mode determination circuit 12 further instructs the second detection mode determination circuit 13 to start its operation, to thereby shift to the second detection mode. However, when the detection pulses B5 to B12 have produced no detection signal at all, or only one detection signal, the first detection mode determination circuit 12 determines that the rotation has failed and ends the operation of the first detection mode. Then, without shifting to the second detection mode, the correction drive pulse FP is output, and when the next normal drive pulse is output, a normal drive pulse SP2 having the next higher-ranked driving power to the previous one is output from the normal drive pulse generation circuit 3.

Note that the determination method in the second detection mode differs depending on the detection result in the first detection mode. In the case where two detection signals have been generated in succession by the detection pulse B5 and the detection pulse B6, the detection pulse selection circuit 152 causes the second detection pulse generation circuit 6 to select and output the detection pulses f7 to f14. In the case where the second detection signal has been generated by a detection pulse after the detection pulse B7, on the other hand, the detection pulse selection circuit 152 causes the second detection pulse generation circuit 6 to select and output the detection pulses F7 to F14. The detection pulse selection circuit 152 is changing means for changing the detection pulse width in the second detection mode based on the detection result in the first detection mode.

First, the case where two detection signals have been generated in succession by the detection pulse B5 and the detection pulse B6 and the mode shifts to the second detection mode is described. The pulse selection circuit 7 selects and outputs the detection pulses f7 to f14, which are selected by the detection pulse selection circuit 152 and output from the second detection pulse generation circuit 6, and controls the stepper motor 20. The detection circuit 11 then detects induced voltages that are generated in the coil 9 by f7 to f14. The second detection mode determination circuit 13 receives the detection signal of the detection circuit 11. When the detection signal has been generated twice, the second detection mode determination circuit 13 determines that the rotation has succeeded and immediately stops the detection pulses output from the second detection pulse generation circuit 6 to end the operation of the second detection mode, and further controls the pulse selection circuit 7 so as not to output the correction drive pulse FP. However, the detection of the detection signal generated by the detection pulses f7 to f14 is finished when the detection signal has been detected six times at most, that is, after the detection by the detection pulse 12. If no detection signal, or only one detection signal, has been generated during the detection, it is determined that the rotation has failed and the correction drive pulse FP is output.

Then, when the next normal drive pulse is output, the normal drive pulse SP2 having the next higher-ranked driving power to the previous one is output from the normal drive pulse generation circuit 3.

Next, the case where the second detection signal is not generated by the pulse B6, that is, the case where the second detection signal has been generated after the detection pulse B7 and the mode shifts to the second detection mode, is described. The pulse selection circuit 7 selects and outputs the detection pulses F7 to F14, which are selected by the detection pulse selection circuit 152 and output from the second detection pulse generation circuit 6, and controls the stepper motor 20. The detection circuit 11 then detects induced voltages that are generated in the coil 9 by F7 to F14. Similarly to the above, when the detection signal has been generated twice, the second detection mode determination circuit 13 determines that the rotation has succeeded and immediately stops the detection pulses output from the second detection pulse generation circuit 6 to end the operation of the second detection mode, and further controls the pulse selection circuit 7 so as not to output the correction drive pulse FP. When no detection signal, or only one detection signal, has been generated, on the other hand, it is determined that the rotation has failed and the correction drive pulse FP is output. Then, when the next normal drive pulse is output, the normal drive pulse SP2 having the next higher-ranked driving power to the previous one is output from the normal drive pulse generation circuit 3.

As described above, in the second embodiment, the second detection pulse generation circuit includes a two-system pulse generation circuit for the detection pulse widths of 0.0625 ms and 0.25 ms, and the detection pulses are selected by the detection pulse selection circuit 152 and then output. That is, in the case of the determination result that the first detection mode has ended at an early time of 6 ms, the detection in the second detection mode is performed with the detection pulse having a smaller width of 0.0625 ms, and hence an electromagnetic brake can easily be generated to suppress free oscillation of the rotor 10. On the other hand, in the case of the determination result that the second detection mode has ended at a late time after 7 ms, the detection in the second detection mode is performed with the detection pulse with a larger width of 0.25 ms, and hence the electromagnetic brake can be suppressed so that the free oscillation of the rotor 10 is less likely to attenuate.

An actual method of detecting the rotation through the above-mentioned operation is described with reference to waveform diagrams of FIGS. 11 and 9. First, the case where an indicating hand having a large moment of inertia is attached is described. FIG. 11(*a*) is, similarly to FIG. 27(*a*) in the conventional example, a waveform of a current that is induced in the coil 9 when the indicating hand having a large moment of inertia is attached. FIG. 11(*b*) is a waveform of a voltage generated at one terminal O1 of the coil 9 at this time, and FIG. 11(*c*) is a waveform of a voltage generated at another terminal O2 of the coil 9.

First, the normal drive pulse SP illustrated in FIG. 11(*b*) is applied to the terminal O1 of the coil 9, and the rotor 10 rotates to generate a current waveform c1 illustrated in FIG. 11(*a*). After the end of the normal drive pulse SP, the rotor 10 enters a freely oscillated state, and the current waveform becomes current waveforms denoted by c2, c3, and c4. At the time of 5 ms, the first detection mode is started, and the detection pulse B5 illustrated in FIG. 9(*b*) is applied to the coil 9. As illustrated in FIG. 11(*a*), at 5 ms, the current waveform is in the region of the current waveform c2, in which the current value is negative. Accordingly, as illustrated in FIG.

11(c), an induced voltage V5 generated by the detection pulse B5 never exceeds the threshold Vth. At 7 ms, however, the current waveform is in the region of the current waveform c3, in which the current value is changed to the positive direction. Accordingly, as illustrated in FIG. 11(c), an induced voltage V7 generated by the detection pulse B7 becomes a detection signal exceeding the threshold Vth. Similarly at 8 ms, the current waveform is also in the region of the current waveform c3, and an induced voltage V8 generated by the detection pulse B8 becomes a detection signal exceeding the threshold Vth. Because the two detection signals of the induced voltages V7 and V8 have exceeded the threshold Vth, the mode is switched to the second detection mode.

In response to the switching to the second detection mode by the induced voltage V8 generated by the detection pulse B8, which is generated after 7 ms, the detection pulse selection circuit 152 selects the detection pulses F7 to F14 each having a detection pulse width of 0.25 ms output from the second detection pulse generation circuit 6, and outputs the selected detection pulses to the pulse selection circuit 7. The electromagnetic brake therefore has its action suppressed so that the free oscillation of the rotor 10 is less likely to attenuate. Then, a detection pulse at the next time of 8 ms, namely the detection pulse F9 at the time of 9 ms illustrated in FIG. 9(c1), is applied to the coil 9. As illustrated in FIG. 11(a), at 9 ms, the current waveform is in the region of the current waveform c3, in which the current value is positive. Accordingly, as illustrated in FIG. 11(b), an induced voltage V9 generated by the detection pulse F9 never exceeds the threshold Vth. Similarly, the current waveform for induced voltages V10 and V11 generated by the detection pulses F10 and F11 is also in the region of the current waveform c3, and the induced voltages V10 and V11 never exceed the threshold Vth. At 12 ms, however, because the free oscillation of the rotor 10 is less likely to attenuate, the current waveform is in the region of the current waveform c4 as illustrated in FIG. 11(a), in which the current value is changed to the negative direction. Accordingly, as illustrated in FIG. 11(c), an induced voltage V12 that is generated by the detection pulse F12 becomes a detection signal exceeding the threshold Vth. Similarly at 13 ms, the current waveform is in the region of the current waveform c4, and an induced voltage V13 generated by the detection pulse F13 becomes a detection signal exceeding the threshold Vth. Because the two detection signals of the induced voltages V12 and V13 have exceeded the threshold Vth, the second detection mode determination circuit 13 normally determines that the rotation has succeeded. Then, the correction drive pulse FP is not output, and when the next normal drive pulse is output, the normal drive pulse SP having the same driving power as the previous one is output.

Subsequently, the case where the rotor 10 has failed to rotate due to abrupt application of load such as a calendar is described with reference to waveform diagrams of FIGS. 12 and 9. FIG. 12(a) is, similarly to FIG. 30(a) in the conventional example, a waveform of a current that is induced in the coil 9 when the rotor 10 has failed to rotate. FIG. 12(b) is a waveform of a voltage generated at one terminal O1 of the coil 9 at this time and FIG. 12(c) is a waveform of a voltage generated at another terminal O2 of the coil 9.

First, at the time of 5 ms, the first detection mode is started, and the detection pulse B5 is applied to the coil 9. As illustrated in FIG. 12(a), the current waveform is in the region of a current waveform c5, in which the current value is positive. Accordingly, as illustrated in FIG. 12(c), the induced voltage V5 becomes a detection signal exceeding the threshold Vth. Also at 6 ms, the current waveform is in the region of the current waveform c5, and the induced voltage V6 becomes a detection signal exceeding the threshold Vth. Because the two detection signals of the induced voltages V5 and V6 have exceeded the threshold Vth, the mode shifts to the second detection mode.

In response to the shift to the second detection mode by the induced voltages V5 and V6, which are generated by the detection pulses B5 and B6 generated at 5 ms and 6 ms, respectively, the detection pulse selection circuit 152 selects the detection pulses f7 to f14 each having a detection pulse width of 0.0625 ms output from the second detection pulse generation circuit 6, and outputs the selected detection pulses to the pulse selection circuit 7. The electromagnetic brake is thus easily generated to act so that the amplitude of free oscillation of the rotor 10 is reduced. Then, a detection pulse at the next time of 6 ms, namely the detection pulse f7 at the time of 7 ms illustrated in FIG. 9(c2), is applied to the coil 9. As illustrated in FIG. 12(a), at 7 ms, the current waveform is in the region of the current waveform c5, in which the current value is positive, and hence, as illustrated in FIG. 12(b), the induced voltage V7 never exceeds the threshold Vth. Further, the current waveform for the induced voltages V8 to V11 is also in the region of the current waveform c5, and the induced voltages V8 to V11 never exceed the threshold Vth. At 12 ms, which corresponds to the sixth detection in the second detection mode, the induced voltage V12 generated by the detection pulse F12 never exceeds the threshold Vth, either. The second detection mode is terminated after this sixth detection. Accordingly, the second detection mode determination circuit 13 normally determines that the rotation has failed. Then, the correction drive pulse FP is output, and when the next normal drive pulse is output, the normal drive pulse SP2 having the next higher-ranked driving power to the previous one is output from the normal drive pulse generation circuit 3. Therefore, the clock never stops.

As described above, the second detection pulse generation circuit 6 includes a two-system pulse generation circuit for the detection pulse having a width of 0.25 ms and the detection pulse having a width of 0.0625 ms, and the detection pulses are selected by the detection pulse selection circuit 152 and then output. That is, in the case of the determination result that the first detection mode has ended at an early timing of 6 ms, the detection is performed with a smaller detection pulse width so as to increase the period in which the electromagnetic brake is generated, and in the case of the determination result that the first detection mode has ended at a late timing after 7 ms, the detection is performed with a larger detection pulse width so as to reduce the period in which the electromagnetic brake is generated, thereby varying the pattern of rotation detection.

The above-mentioned operation is described with reference to a flowchart. FIG. 10 is a flowchart illustrating the method of detecting the rotation of the rotor 10 in the electronic watch according to the second embodiment, and illustrates the operation performed every second, on the second. The normal drive pulse SP is output at the time of the second (Step ST1), and the rotation detection is started after 5 ms has elapsed since the second (Step ST2). In the first detection mode, the detection pulse is output, with its width set to 0.0625 ms (Step ST3). After the end of the first detection mode, the second detection mode is started (Step ST4). In this case, depending on whether or not the first detection mode has ended at the time of 6.0 ms from the second, the setting of the detection pulse width in the second detection mode is different (Step ST5). When the first detection mode has ended at the time of 6.0 ms, in order to increase the period in which the electromagnetic brake is generated in the second detection mode, the detection pulse is output, with its width set to 0.0625 ms (Step ST6). When the first detection mode has ended after the time of 7.0 ms, in order to reduce the period in which the electromagnetic brake is generated in the second detection mode, the detection pulse is output, with its width set to 0.25 ms (Step ST7). It is then determined whether a detection signal has been detected within a predetermined period (Step ST8). When a detection signal has been detected within the predetermined period, it is determined that the rotation has succeeded. Then, the correction drive pulse FP is not output, and, when the next normal drive pulse is output, the normal drive pulse SP having the same driving power as the previous one is output (Step ST9). When a detection signal has not been detected within the predetermined period, it is determined that the rotation has failed, and then the correction drive pulse FP is output, and at the same time, a normal drive pulse having the next higher-ranked driving power is output (Step ST10). This step completes the operation for the second concerned, and the operation is restarted from the beginning after waiting for the next second.

It should be understood that the detection position of the first detection pulse, which is the condition of changing the detection pulse width, is not limited to the above-mentioned numerical value, and should be optimized depending on the motor or the indicator (such as an indicating hand and date dial) to be attached.

Third Embodiment

Change Depending on Power Supply Voltage

Next, a third embodiment of the present invention is described in detail with reference to the drawings. The third embodiment is an example in which the detection pulse width is changed based on an output voltage of a power supply.

Motor driving requires high electric power (current), and hence the motor is driven directly by a power supply. Accordingly, in the case of using a charging power supply having large power supply fluctuations, driving performance of the drive pulse fluctuates. When the power supply voltage is low and the driving performance is low, a lower counter-electromotive current is produced. In this situation, if the detection pulse width is increased to weaken the electromagnetic brake, it may be determined that the motor has rotated even though the motor has not actually rotated. This embodiment is a technology for preventing such erroneous detection.

Figure 13:
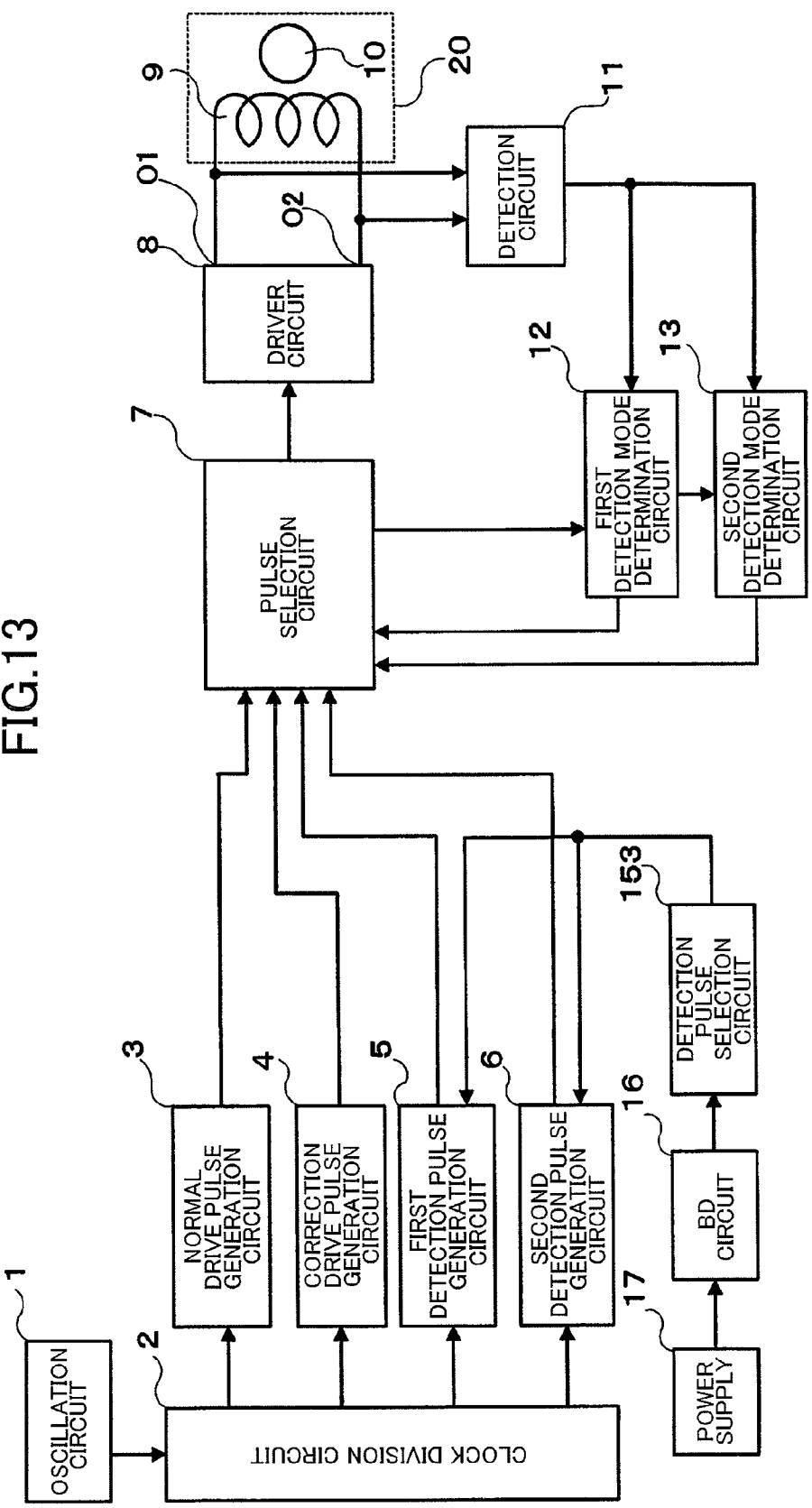
FIG. 13 is a block diagram illustrating a circuit configuration according to a third embodiment of the present invention.
Figure 14:
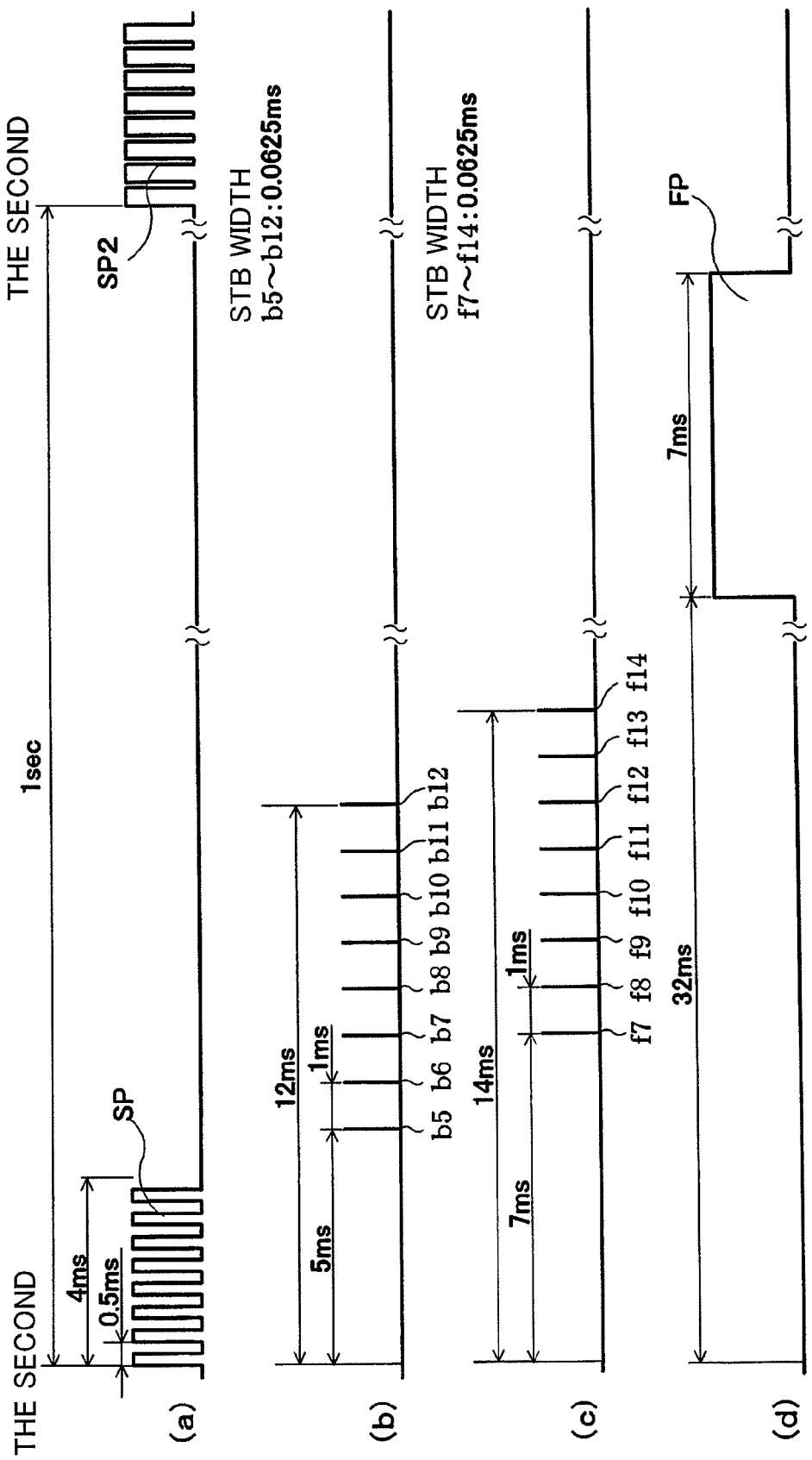
FIG. 14 are waveform diagrams of pulses that are generated by circuits of an electronic watch according to the third and fourth embodiments of the present invention.
Figure 15:
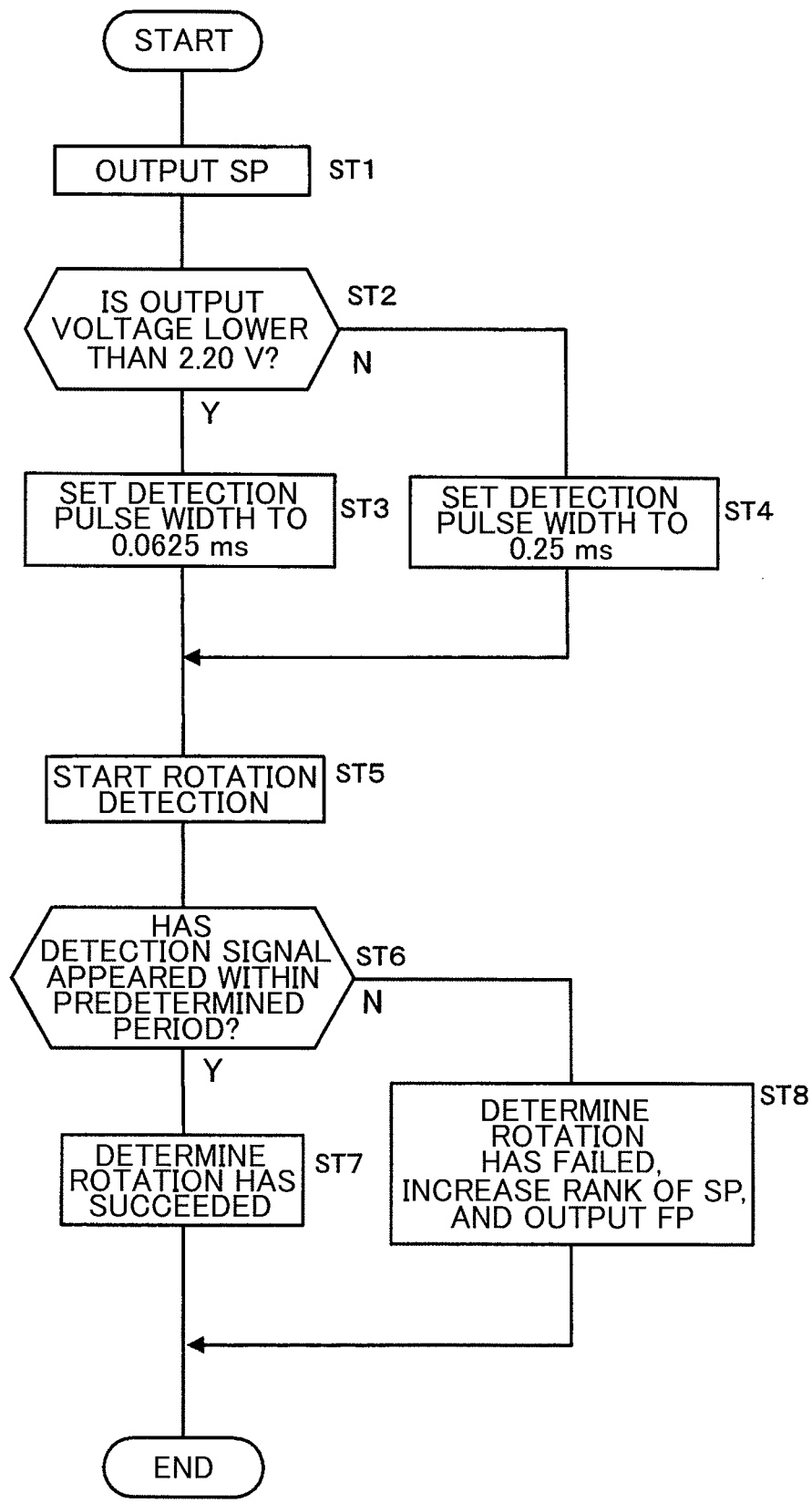
FIG. 15 is a flowchart of the electronic watch according to the third embodiment of the present invention.
Figure 29:
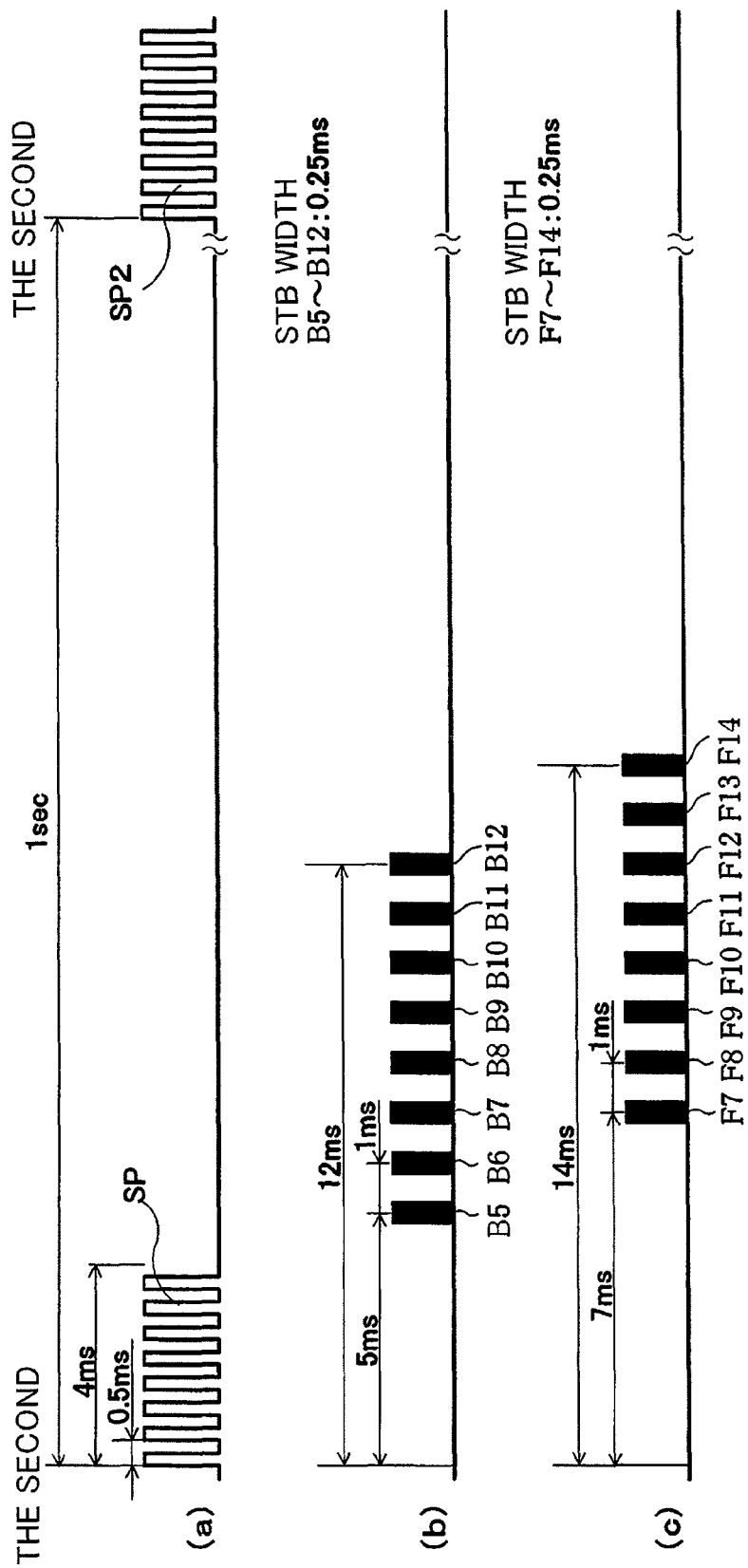
FIG. 29 are waveform diagrams of pulses that are generated by the circuits of the conventional electronic watch and the electronic watch according to the third embodiment of the present invention.

FIG. 13 is a block diagram illustrating a circuit configuration of an electronic watch according to the third embodiment. FIG. 29 (the same figures as in the conventional example) and FIG. 14 are waveform diagrams of pulses that are generated by circuits of the electronic watch according to the third embodiment. FIG. 15 is a flowchart of the electronic watch according to the third embodiment. FIG. 28 (the same figures as in the conventional example) are waveform diagrams of current and voltage that are generated in the coil in the case where an indicating hand having a large moment of inertia is attached to the electronic watch according to the third embodiment and the output voltage of the power supply is 2.35 V. FIG. 16 are waveform diagrams of current and voltage that are generated in the coil in the case where the rotor 10 has failed to rotate because the output voltage of the power supply has become 2.15 V from the state of FIG. 28 to weaken driving power of a stepper motor 20. Note that the same components as those described in the conventional example and the first and second embodiments are denoted by the same numerals and further description is omitted.

In FIG. 13, reference numeral 20 denotes the stepper motor including a coil 9 and the rotor 10; 1, an oscillation circuit; 2, a clock division circuit; 3, a normal drive pulse generation circuit; 4, a correction drive pulse generation circuit; and 5, a first detection pulse generation circuit, which outputs detection pulses B5 to B12 or detection pulses b5 to b12 for performing the first detection mode based on a signal of the clock division circuit 2 and a signal of a detection pulse selection circuit 153 to be described later. As illustrated in FIG. 29(*b*), the detection pulses B5 to B12 are pulses each having a width of 0.25 ms, whereas the detection pulses b5 to b12 are pulses each having a width of 0.0625 ms and are output every 1 ms from 5 ms after the second until 12 ms has elapsed from the second. Reference numeral 6 denotes a second detection pulse generation circuit, which outputs detection pulses F7 to F14 or detection pulses f7 to f14 to be used in the second detection mode based on a signal of the clock division circuit 2 and a signal of the detection pulse selection circuit 153 to be described later. The detection pulses F7 to F14 are pulses each having a width of 0.25 ms as illustrated in FIG. 29(*c*), and the detection pulses f7 to f14 are pulses each having a width of 0.0625 ms as illustrated in FIG. 14(*c*). The detection pulses F7 to F14 and f7 to f14 are output every 1 ms from 7 ms after the second until 14 ms has elapsed from the second.

Reference numeral 7 denotes a pulse selection circuit; 8, a driver circuit; 9, the coil; 10, the rotor; 11, a detection circuit; 12, a first detection mode determination circuit for determining the first detection mode based on a detection signal of the detection circuit 11; 13, a second detection mode determination circuit for determining the second detection mode based on a detection signal of the detection circuit 11; 16, a power supply voltage detection (hereinafter, referred to as BD) circuit, which detects an output voltage of a power supply 17; and 153, the detection pulse selection circuit, which selects the detection pulses having different pulse widths generated by the first detection pulse generation circuit 5 and the second detection pulse generation circuit 6 based on an output result of the BD circuit 16, and controls the first detection pulse generation circuit 5 and the second detection pulse generation circuit 6 so as to output the selected detection pulses. That is, the detection pulse selection circuit 153 is detection pulse control means for controlling the first detection pulse generation circuit 5 and the second detection pulse generation circuit 6 so that the width of the detection pulse can be changed depending on the output result of the BD circuit 16.

In this embodiment, the BD circuit 16 corresponds to the detection pulse change factor detection circuit 140.

Subsequently, the operation of the above-mentioned configuration is described. The pulse selection circuit 7 selects, at the time of the second, a normal drive pulse SP output from the normal drive pulse generation circuit 3 and drives the stepper motor 20. After 5 ms from the second, the first detection mode is started. In the first detection mode, the pulse selection circuit 7 outputs the detection pulses, which are output from the first detection pulse generation circuit 5, and controls the stepper motor 20 so as to change the impedance of the coil 9. Note that depending on the output result of the BD circuit 16, different detection pulses are output from the first detection pulse generation circuit 5. When the BD circuit 16 detects that the output voltage of the power supply 17 is 2.20 V or higher, the detection pulse selection circuit 153 controls the first detection pulse generation circuit 5 so as to output the detection pulses B5 to B12. When the BD circuit 16 detects that the output voltage of the power supply 17 is lower than 2.20 V, on the other hand, the detection pulse selection circuit 153 controls the first detection pulse generation circuit 5 so as to output the detection pulses b5 to b12. The detection circuit 11 then detects induced voltages that are generated in the coil 9 by the detection pulses B5 to B12 or b5 to b12, and outputs a detection signal when detecting an induced voltage exceeding a threshold Vth. The pulse selection circuit 7, on the other hand, instructs the first detection mode determination circuit 12 to start its determination operation. The first detection mode determination circuit 12 determines the presence or absence of the detection signal in the first detection mode based on the input of the detection signal from the detection circuit 11. When the detection signal has been generated from the detection circuit 11 twice, the first detection mode determination circuit 12 determines the detection and immediately stops the detection pulses output from the first detection pulse generation circuit 5 to notify the pulse selection circuit 7 so as to end the operation of the first detection mode and not to generate a correction drive pulse FP. The first detection mode determination circuit 12 further instructs the second detection mode determination circuit 13 to start its operation, to thereby shift to the second detection mode. However, when the detection pulses B5 to B12 or b5 to b12 have produced no detection signal at all, or only one detection signal, the first detection mode determination circuit 12 determines that the rotation has failed and ends the operation of the first detection mode. Then, without shifting to the second detection mode, the correction drive pulse FP is output, and when the next normal drive pulse is output, a normal drive pulse SP2 having the next higher-ranked driving power to the previous one is output from the normal drive pulse generation circuit 3.

After the shift to the second detection mode, the pulse selection circuit 7 outputs the detection pulses output from the second detection pulse generation circuit 6, and controls the stepper motor 20. Note that, similarly to the first detection mode, depending on the output result of the BD circuit 16, different detection pulses are output from the second detection pulse generation circuit 6. When the BD circuit 16 detects that the output voltage of the power supply 17 is 2.20 V or higher, the detection pulse selection circuit 153 controls the second detection pulse generation circuit 6 so as to output the detection pulses F7 to F14. When the BD circuit 16 detects that the output voltage of the power supply 17 is lower than 2.20 V, the detection pulse selection circuit 153 controls the second detection pulse generation circuit 6 so as to output the detection pulses f7 to f14. The detection circuit 11 then detects induced voltages that are generated in the coil 9 by the detection pulses, and outputs a detection signal when detecting an induced voltage exceeding the threshold Vth. The second detection mode determination circuit 13 receives the detection signal of the detection circuit 11. When the detection signal has been generated twice, the second detection mode determination circuit 13 determines that the rotation has succeeded and immediately stops the detection pulses output from the second detection pulse generation circuit 6 to end the operation of the second detection mode, and further controls the pulse selection circuit 7 so as not to output the correction drive pulse FP. However, the detection of the detection signal generated by the detection pulses F7 to F14 or f7 to f14 is finished when the detection signal has been detected six times at most. If no detection signal or only one detection signal has been generated during the detection, it is determined that the rotation has failed and the correction drive pulse FP is output.

As described above, in the third embodiment, the first detection pulse generation circuit 5 and the second detection pulse generation circuit 6 each include a two-system pulse generation circuit for the detection pulse widths of 0.0625 ms and 0.25 ms, and the detection pulses are selected by the detection pulse selection circuit 153 and then output. That is, in the case where the output voltage of the power supply is 2.20 V or higher and the driving power of the stepper motor 20 is high, the detection is performed with the detection pulse having a larger width of 0.25 ms, and hence an electromagnetic brake is suppressed so that the free oscillation of the rotor 10 is less likely to attenuate. In the case where the output voltage of the power supply is lower than 2.20 V and the driving power of the stepper motor 20 is low, the detection is performed with the detection pulse having a smaller width of 0.0625 ms, and hence the electromagnetic brake is easily generated to suppress the free oscillation of the rotor 10.

An actual method of detecting the rotation through the above-mentioned operation is described. First, the case where an indicating hand having a large moment of inertia is attached and the output voltage of the power supply is 2.35 V is described. Waveform diagrams in this case are the same as the waveform diagrams of FIGS. 28 and 29 of the conventional example, and the same rotation detection is performed after the BD circuit detects the output voltage of the power supply. That is, when the BD circuit detects 2.35 V, which means the output voltage is 2.20 V or higher, the detection pulse selection circuit 153 selects the detection pulses B5 to B12 each having a detection pulse width of 0.25 ms so that the free oscillation of the rotor 10 is less likely to attenuate. Then, in the first detection mode, at 7 ms and 8 ms, the current waveform is in the region of the current waveform c3 as illustrated in FIG. 28(a), and the induced voltages V7 and V8 generated by the detection pulses B7 and B8 become detection signals exceeding the threshold Vth. Because the two detection signals of the induced voltages V7 and V8 have exceeded the threshold Vth, the mode is switched to the second detection mode. Similarly in the second detection mode, because the BD circuit has detected 2.35 V, the detection pulse selection circuit 153 selects the detection pulses F7 to F14 each having a detection pulse width of 0.25 ms so that the free oscillation of the rotor 10 is less likely to attenuate. As illustrated in FIG. 28(a), at 12 ms and 13 ms, the current waveform is in the region of the current waveform c4, in which the current value is changed to the negative direction. Because the two detection signals of the induced voltages V12 and V13 generated by the detection pulses F12 and F13 have exceeded the threshold Vth, the second detection mode determination circuit 13 normally determines that the rotation has succeeded and controls the pulse selection circuit 7 so as not to output the correction drive pulse FP. Then, when a next normal drive pulse is output, the normal drive pulse SP having the same driving power as the previous one is output.

Subsequently, the case where the rotor 10 has failed to rotate because the output voltage has reduced to 2.15 V due to degradation or voltage drop of the battery as power supply is described with reference to the waveform diagrams of FIGS. 16 and 14. FIG. 16(a) is, similarly to FIG. 30(a) in the conventional example, a waveform of a current that is induced in the coil 9 when the rotor 10 has failed to rotate. FIG. 16(b) is a waveform of a voltage generated at one terminal O1 of the coil 9 at this time and FIG. 16(c) is a waveform of a voltage generated at another terminal O2 of the coil 9.

First, in the first detection mode, when the BD circuit detects 2.15 V, which means the output voltage is lower than 2.20 V, the detection pulse selection circuit 153 selects the detection pulses b5 to b12 each having a detection pulse width of 0.0625 ms in order to suppress the free oscillation of the rotor 10. After the selection of the detection pulses, the first detection mode is started at the time of 5 ms, and the detection pulse b5 is applied to the coil 9. As illustrated in FIG. 16(a), at 7 ms, the current waveform is in the region of the current waveform c5, in which the current value is positive. Accordingly, as illustrated in FIG. 16(c), the induced voltage V7 becomes a detection signal exceeding the threshold Vth. Also at 8 ms, the current waveform is in the region of the current waveform c5, and the induced voltage V8 becomes a detection signal exceeding the threshold Vth. Because the two detection signals of the induced voltages V7 and V8 have exceeded the threshold Vth, the mode shifts to the second detection mode. After the shift to the second detection mode by the induced voltage V8, because the BD circuit has detected 2.15 V and the output voltage is accordingly lower than 2.20 V, the detection pulse selection circuit 153 selects the detection pulses f7 to f14 each having a detection pulse width of 0.0625 ms in order to suppress the free oscillation of the rotor 10. After the selection of the detection pulses, the detection pulse f9 is applied to the coil 9 at the time of 9 ms. As illustrated in FIG. 16(a), at 9 ms, the current waveform is in the region of the current waveform c5, in which the current value is positive, and hence, as illustrated in FIG. 16(b), the induced voltage V9 never exceeds the threshold Vth. Further, the current waveform for the induced voltages V10 to V13 is also in the region of the current waveform c5, and the induced voltages V10 to V13 never exceed the threshold Vth. Even at 14 ms, which corresponds to the sixth detection in the second detection mode, the induced voltage V14 generated by the detection pulse F14 never exceeds the threshold Vth. The second detection mode is terminated after this sixth detection. Accordingly, the second detection mode determination circuit 13 normally determines that the rotation has failed. Then, the correction drive pulse FP is output, and when a next normal drive pulse is output, the normal drive pulse SP2 having the next higher-ranked driving power to the previous one is output from the normal drive pulse generation circuit 3. Therefore, the clock never stops.

If the detection pulse width in the second detection mode is not switched depending on the output voltage but selected similarly to the case where the output voltage is 2.20 V or higher, specifically if the detection pulse selection circuit 153 selects the detection pulses F7 to F14 having a detection pulse width of 0.25 ms, the current after 10 ms exhibits a waveform as indicated by the broken line in FIG. 16(a). That is, the waveform profile represented by induced current waveforms c2, c5, and c6 appears subsequent to the current waveform c1. This is because the increased pulse widths of the detection pulses F13 and F14 relax the electromagnetic brake, with the result that, compared to the case of a narrower pulse width, the free oscillation of the rotor 10 cannot be suppressed and the counter-electromotive current is easily produced.

In this case, at the times of 13 ms and 14 ms in the second detection mode, the current waveform for the induced voltages V13 and V14 generated by the detection pulses F13 and F14 is in the region of the current waveform c6 as illustrated in FIG. 16(a), in which the current value is negative. Accordingly, as illustrated in FIG. 16(b), the induced voltages V13 and V14 become detection signals exceeding the threshold Vth. In this case, the second detection mode determination circuit 13 erroneously determines that the rotation has succeeded even though the rotation has actually failed, and the pulse selection circuit 7 does not select and output the correction drive pulse FP, with the result that the rotor 10 does not rotate. If the detection pulse width is simply increased as described above, the free oscillation of the rotor 10 when the rotor 10 is not rotating cannot be suppressed, thus causing a fatal problem to an electronic watch in that the stepper motor stops due to erroneous determination and a time delay occurs.

As described above, in the third embodiment, the detection pulse width is switched depending on the output voltage of the power supply. Accordingly, when the output voltage of the power supply is high and the driving power of the stepper motor 20 is sufficiently high, there is no unnecessary increase in current consumption even if an indicating hand having a large moment of inertia is attached. At the same time, even when the rotor 10 has failed to rotate because the output voltage of the power supply has reduced to lower the driving power of the stepper motor 20, it can be determined normally that the rotation has failed.

The above-mentioned operation is described with reference to a flowchart. FIG. 15 is a flowchart illustrating the method of detecting the rotation of the rotor 10 in the electronic watch according to the third embodiment, and illustrates the operation performed every second, on the second. The normal drive pulse SP is output at the timing of the second (Step ST1), and it is determined whether the output voltage of the power supply is lower than 2.20 V (Step ST2). When the output voltage of the power supply is lower than 2.20 V, the detection pulse width is set to 0.0625 ms in order to increase the period in which the electromagnetic brake is generated in the first detection mode and the second detection mode (Step ST3). When the output voltage of the power supply is 2.20 V or higher, the detection pulse width is set to 0.25 ms in order to reduce the period in which the electromagnetic brake is generated in the first detection mode and the second detection mode (Step ST4). The rotation detection is then started after 5 ms from the second (Step ST5). It is determined whether a detection signal has been detected within a predetermined period (Step ST6). When a detection signal has been detected within the predetermined period, it is determined that the rotation has succeeded. Then, the correction drive pulse FP is not output, and when the next normal drive pulse is output, the normal drive pulse SP having the same driving power as the previous one is output (Step ST7). When a detection signal has not been detected within the predetermined period, it is determined that the rotation has failed, and then the correction drive pulse FP is output, and at the same time, a normal drive pulse having the next higher-ranked driving power is output (Step ST8). This step completes the operation for the second concerned, and the operation is restarted from the beginning after waiting for the next second.

Note that the above description is illustrative of this embodiment, which may be modified as follows, for example.

(1) In the above description, the determination voltage is a single level of 2.20 V, but a plurality of levels may be set so that the detection pulse width is changed in three or more multiple voltage sections.

(2) It should be understood that the numerical value of the determination voltage level is not limited to 2.20 V and should be optimized depending on the motor or the indicator (such as an indicating hand and date dial) to be attached, or the type of power supply. The same applies to the number of voltage levels.

Fourth Embodiment

Change in Consideration of Both Power Supply Voltage and Drive Pulse Width

Next, a fourth embodiment of the present invention is described. The fourth embodiment is an example in which the detection pulse width is changed depending on an output voltage of power supply and a plurality of normal drive pulses having different driving powers prepared in advance. In recent years, in order to reduce power consumption or deal with fluctuations in power supply voltage that occur when a charging battery is used as power supply, there has been adopted a method in which a plurality of normal drive pulses having different driving powers are prepared and a normal drive pulse which enables driving with minimum energy is constantly selected therefrom to drive a motor. In this case, a normal drive pulse having the lowest driving power is usually set to an upper limit voltage in the voltage range of the power supply. Accordingly, in the case where the output voltage of the power supply lowers, if the normal drive pulse having the lowest driving power is selected, the motor cannot be rotated because the selected normal drive pulse has low driving power, and hence a correction drive pulse having sufficiently high driving power is immediately output to rotate the motor reliably. The third embodiment has exemplified the change of the detection pulse width based on the output voltage of the power supply, in which, when the output voltage is low, the detection pulse width is reduced to generate the electromagnetic brake so that it may be normally determined that the motor has not rotated. However, if all the normal drive pulses are set to have a small detection pulse width, when an indicating hand having a large moment of inertia is attached, the free oscillation is suppressed by the electromagnetic brake and hence it is impossible to respond to current waveform disturbance. Accordingly, even if there is a normal drive pulse which enables driving with minimum energy, it is erroneously determined that the rotation has failed and the correction drive pulse having large current consumption is output. Therefore, in order to perform accurate rotation detection and also reduce power consumption even when the power supply voltage fluctuates as in the case of a charging battery, the respective detection pulse widths need to be set depending on the normal drive pulses having different driving powers. Hereinafter, the detailed description is given with reference to the drawings.

Figure 17:
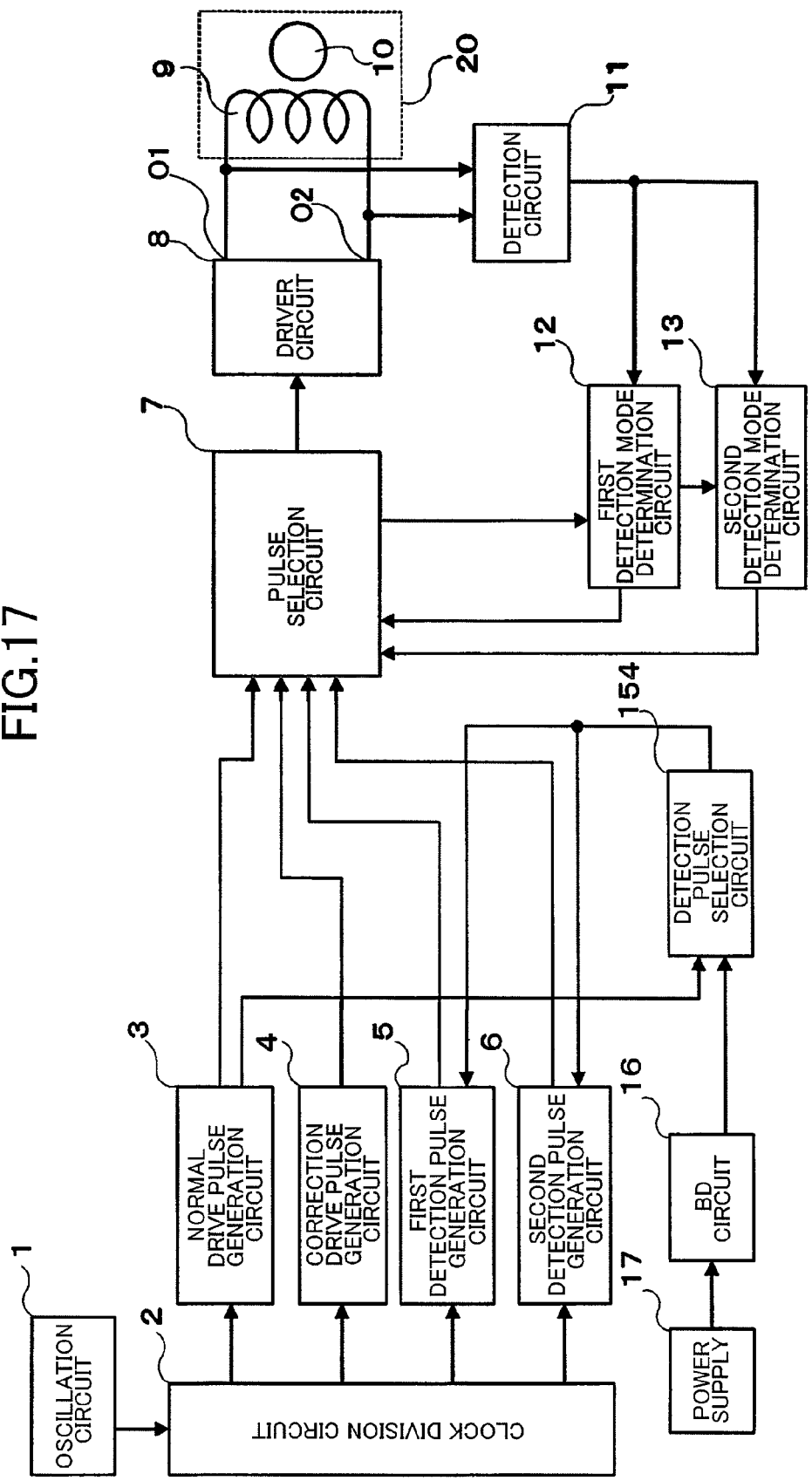
FIG. 17 is a block diagram illustrating a circuit configuration according to the fourth embodiment of the present invention.
Figure 18:
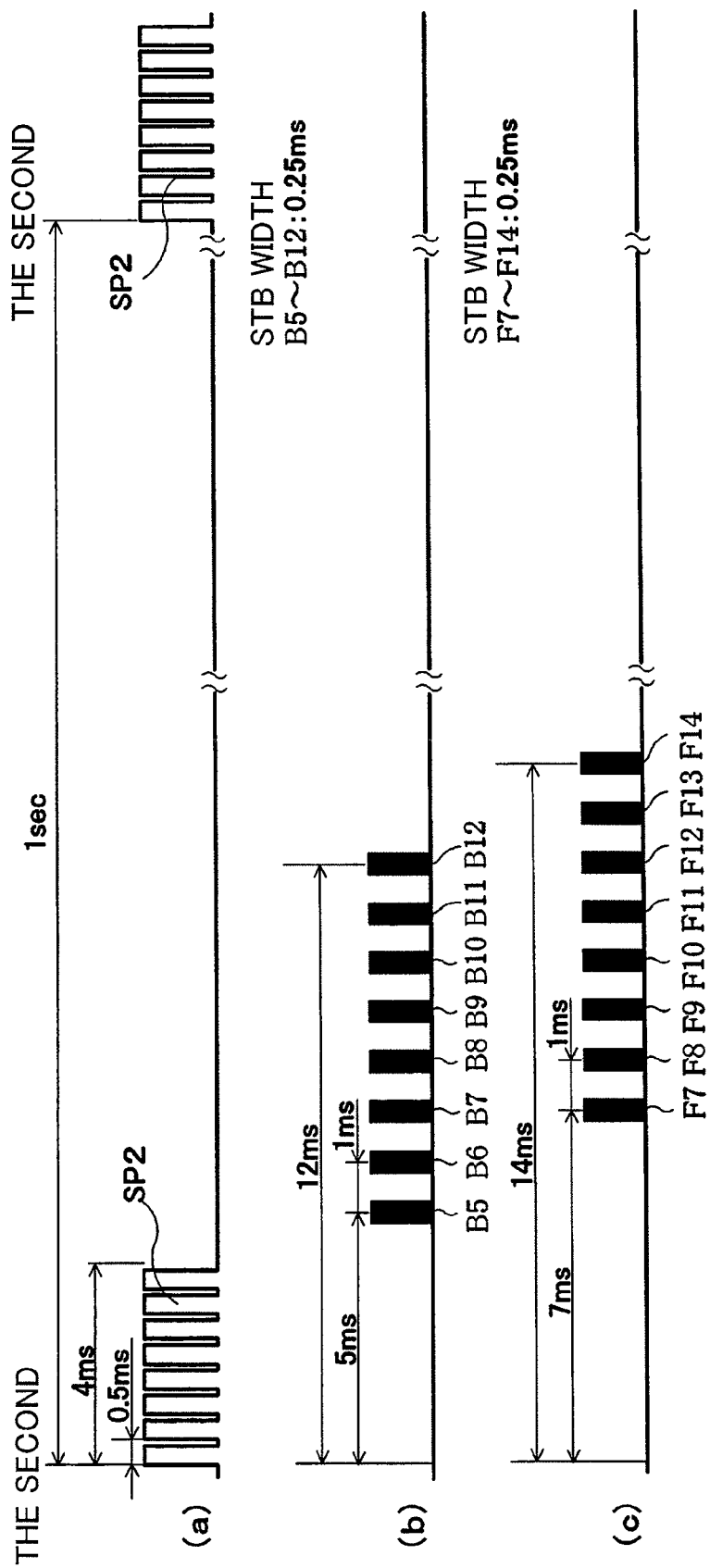
FIG. 18 are waveform diagrams of pulses that are generated by circuits of the electronic watch according to the fourth embodiment of the present invention.
Figure 19:
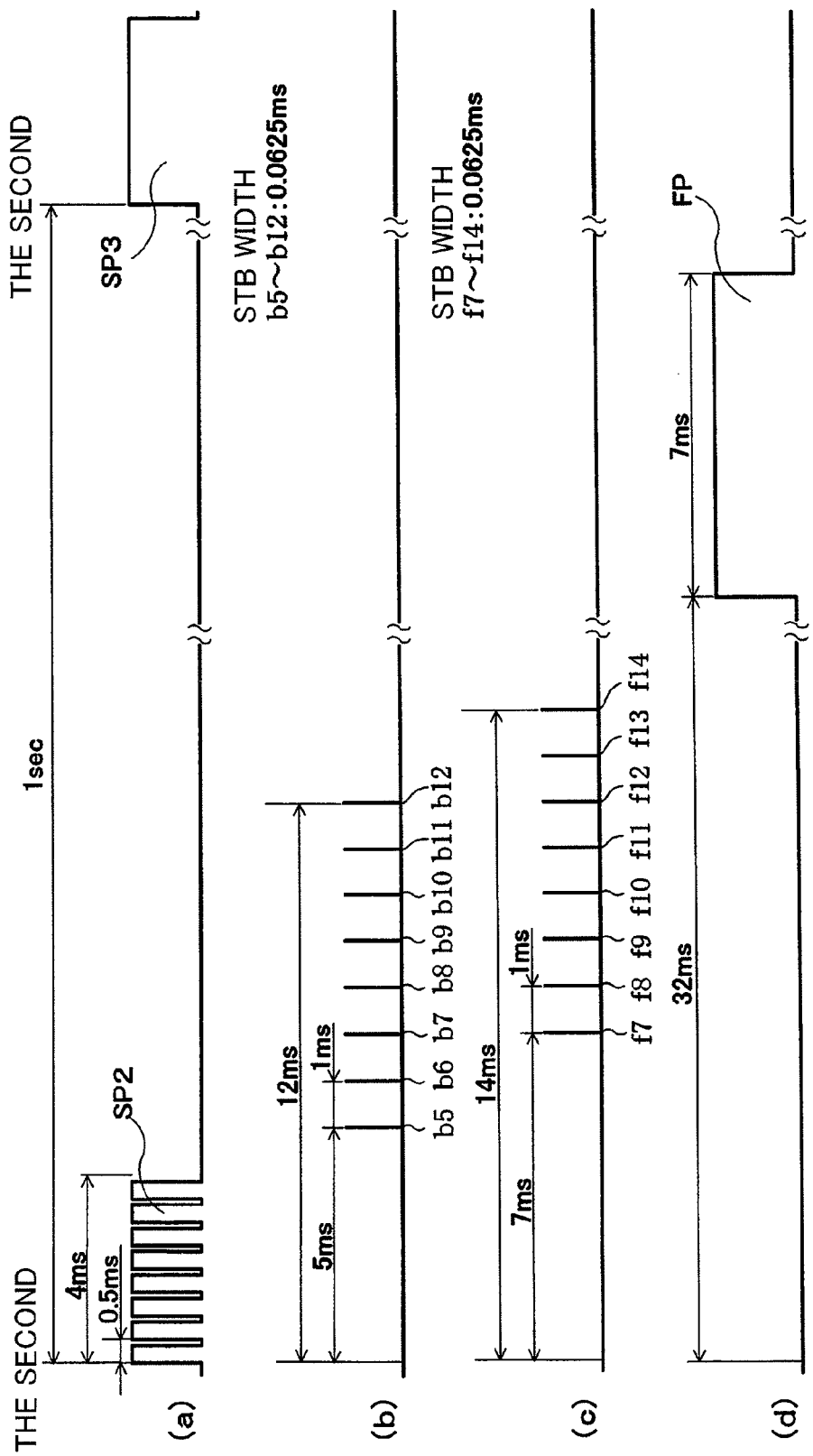
FIG. 19 are waveform diagrams of pulses that are generated by the circuits of the electronic watch according to the fourth embodiment of the present invention.
Figure 20:
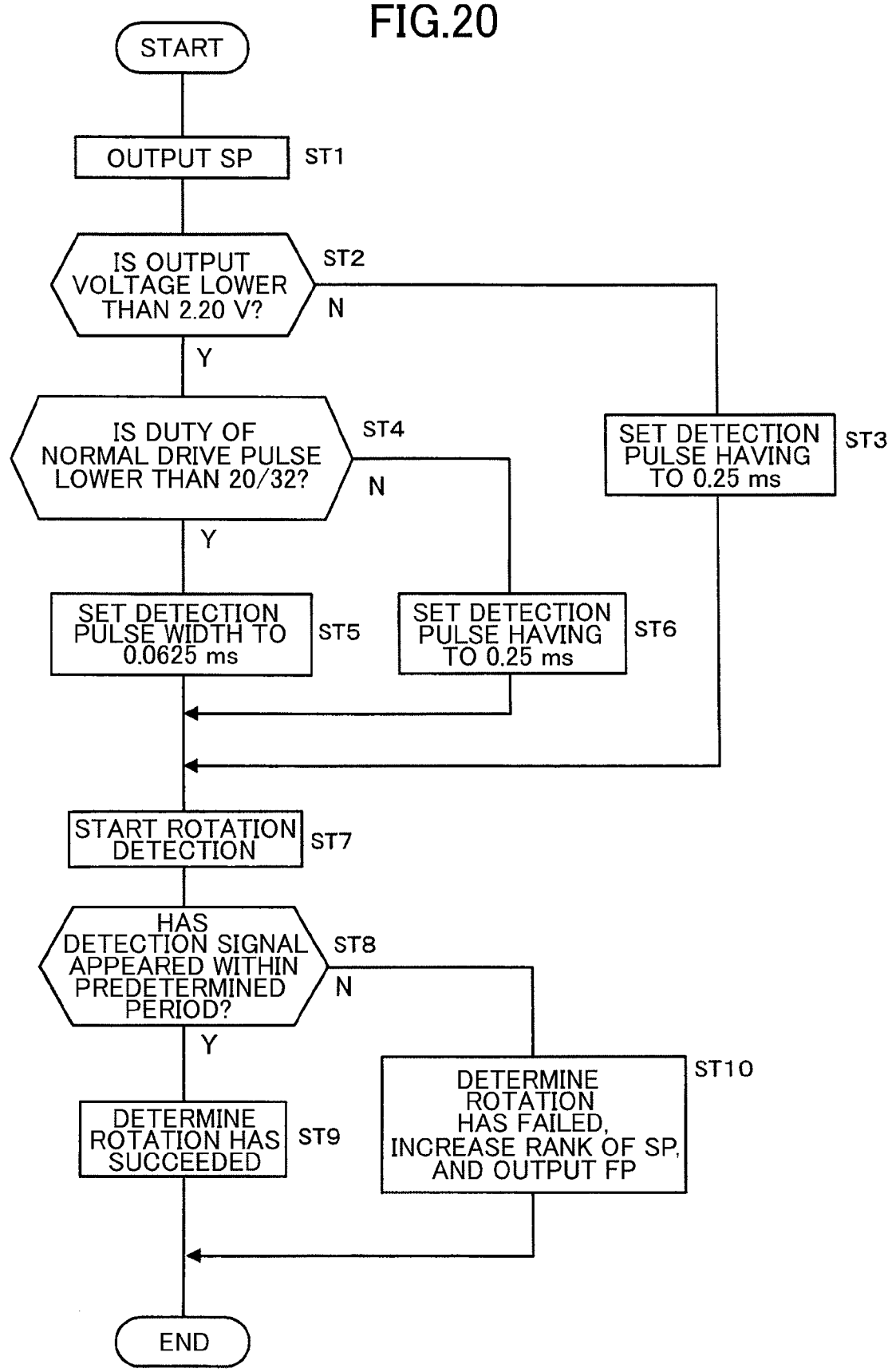
FIG. 20 is a flowchart of the electronic watch according to the fourth embodiment of the present invention.
Figure 23:
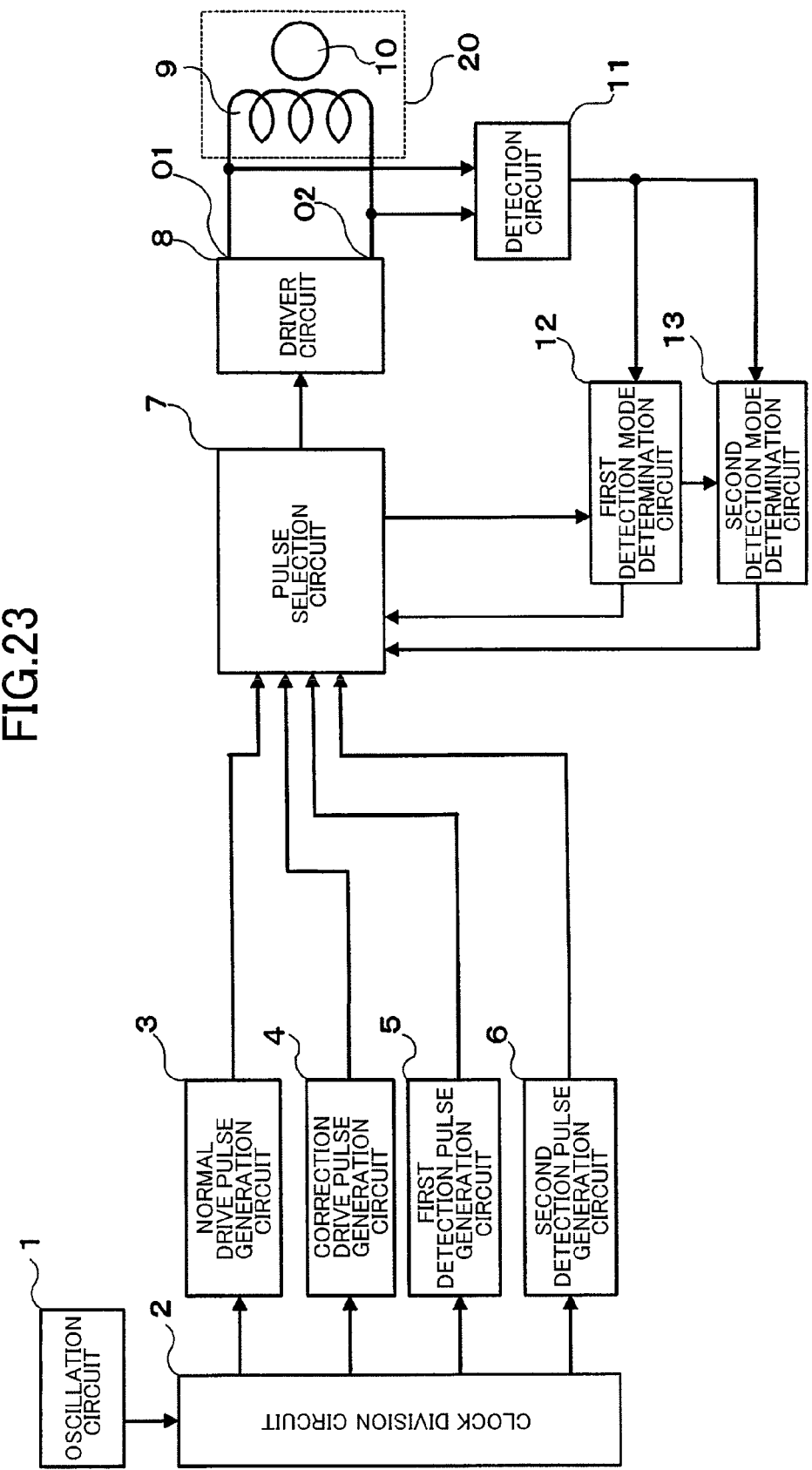
FIG. 23 is a block diagram illustrating a circuit configuration of a conventional electronic watch.
Figure 24:
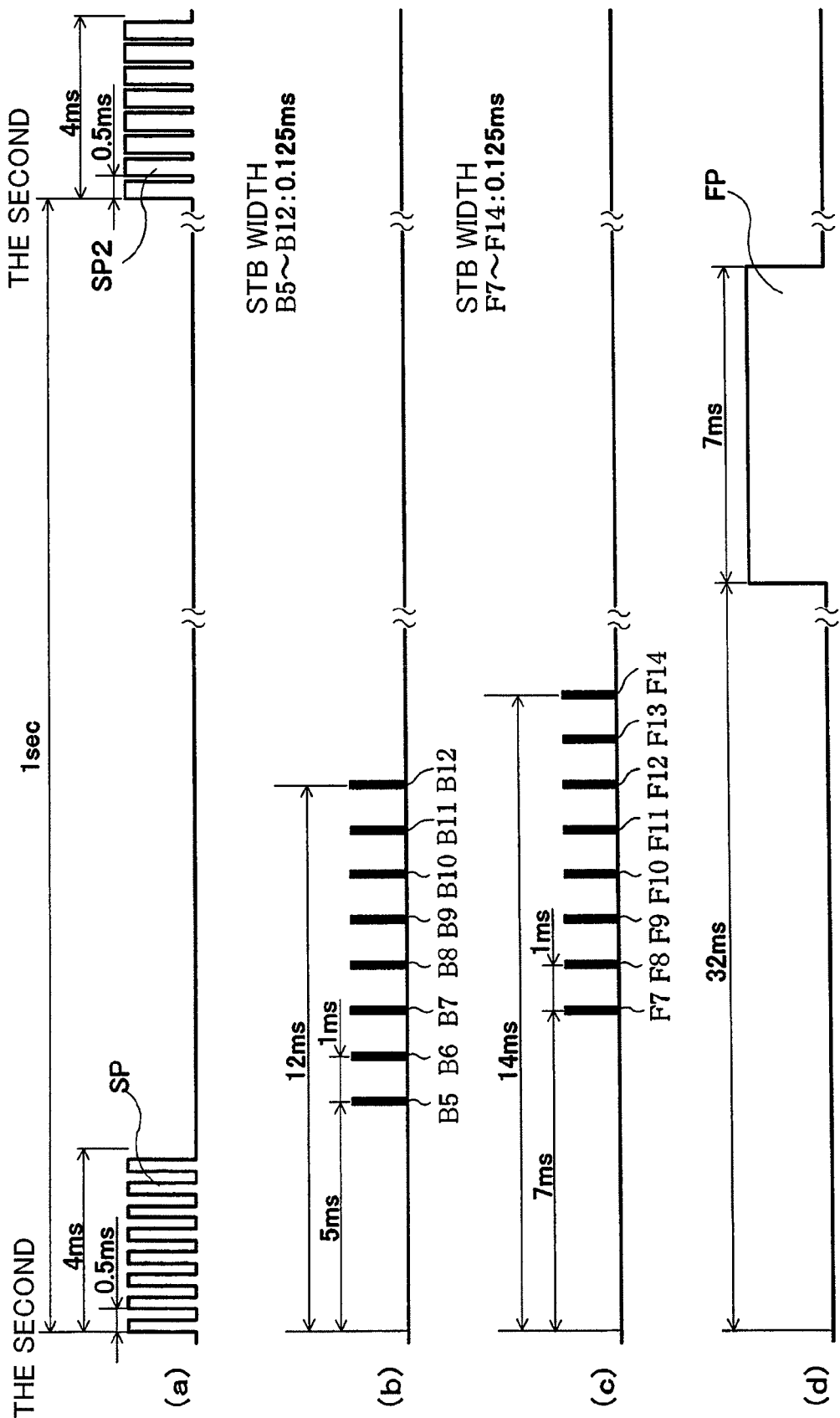
FIG. 24 are waveform diagrams of pulses that are generated by circuits of the conventional electronic watch.

FIG. 17 is a block diagram illustrating a circuit configuration of an electronic watch according to the fourth embodiment. FIG. 14 (the same figures as in the third embodiment) and FIGS. 18 and 19 are waveform diagrams of pulses that are generated by circuits of the electronic watch according to the fourth embodiment. FIG. 20 is a flowchart of the electronic watch according to the fourth embodiment. FIG. 16 (the same figures as in the third embodiment) are waveform diagrams of current and voltage that are generated in a coil when a rotor 10 has failed to rotate because an output voltage of power supply is 2.15 V and driving power of a stepper motor 20 is weak in the case where an indicating hand having a large moment of inertia is attached to the electronic watch according to the fourth embodiment. FIG. 21 are waveform diagrams of current and voltage that are generated in the coil after the switching to a normal drive pulse having the next higher-ranked driving power from the state of FIG. 16. FIG. 22 are waveform diagrams of current and voltage that are generated in the coil when the detection pulse width is increased from 0.0625 ms to 0.25 ms from the state of FIG. 21. Note that, the same components as those described in the conventional example and the first, second, and third embodiments are denoted by the same numerals and further description is omitted.

In FIG. 17, reference numeral 20 denotes the stepper motor including a coil 9 and the rotor 10; 1, an oscillation circuit; 2, a clock division circuit; and 3, a normal drive pulse generation circuit, which outputs a normal drive pulse SP having a Duty of 16/32 every 0.5 ms with a width of 4 ms every second, on the second as illustrated in FIG. 14(a). In this case, when a rotation detection signal of the rotor 10 is not generated and it is determined that the rotation has failed, the normal drive pulse SP is switched to a normal drive pulse SP2 having a Duty of 24/32 and having the next higher-ranked driving power to the previous one as illustrated in FIG. 14(a) and is then output from the normal drive pulse generation circuit 3. When the rotation detection signal of the rotor 10 is not generated even by the normal drive pulse SP2 and it is determined that the rotation has failed, the normal drive pulse SP2 is switched to a normal drive pulse SP3 having a Duty of 32/32 and having the next higher-ranked driving power to the previous one as illustrated in FIG. 19(a) and is then output from the normal drive pulse generation circuit 3. Reference numeral 4 denotes a correction drive pulse generation circuit. Reference numeral 5 denotes a first detection pulse generation circuit, which outputs detection pulses B5 to B12 or detection pulses b5 to b12 for performing the first detection mode based on a signal of the clock division circuit 2 and a signal of a detection pulse selection circuit 154 to be described later. The detection pulses B5 to B12 are pulses each having a width of 0.25 ms as illustrated in FIG. 18(b), and the detection pulses b5 to b12 are pulses each having a width of 0.0625 ms as illustrated in FIG. 14(b) or FIG. 19(b). The detection pulses B5 to B12 and b5 to b12 are output every 1 ms from 5 ms after the second until 12 ms has elapsed since the second. Reference numeral 6 denotes a second detection pulse generation circuit, which outputs detection pulses F7 to F14 or detection pulses f7 to f14 to be used in the second detection mode based on a signal of the clock division circuit 2 and a signal of the detection pulse selection circuit 154 to be described later. The detection pulses F7 to F14 as illustrated in FIG. 18(c) are pulses each having a width of 0.25 ms, and the detection pulses f7 to f14 as illustrated in FIG. 14(c) or FIG. 19(c) are pulses each having a width of 0.0625 ms. The detection pulses F7 to F14 and f7 to f14 are output every 1 ms from 7 ms after the second until 14 ms has elapsed since the second.

Reference numeral 7 denotes a pulse selection circuit; 8, a driver circuit; 9, the coil; 10, the rotor; 11, a detection circuit; 12, a first detection mode determination circuit for determining the first detection mode based on a detection signal of the detection circuit 11; 13, a second detection mode determination circuit for determining the second detection mode based on a detection signal of the detection circuit 11; and 16, the BD circuit for detecting the output voltage of the power supply 17. Reference numeral 154 denotes a detection pulse selection circuit, which selects the detection pulses having different pulse widths generated by the first detection pulse generation circuit 5 and the second detection pulse generation circuit 6 based on an output result of the BD circuit 16 and a driving rank of the normal drive pulse output from the normal drive pulse generation circuit 3, and controls the first detection pulse generation circuit 5 and the second detection pulse generation circuit 6 so as to output the selected detection pulses. That is, the detection pulse selection circuit 154 is detection pulse control means for controlling the first detection pulse generation circuit 5 and the second detection pulse generation circuit 6 so that the width of the detection pulse can be changed based on the output result of the BD circuit 16 and the driving rank of the normal drive pulse output from the normal drive pulse generation circuit 3. In this embodiment, the BD circuit 16 and the normal drive pulse generation circuit 3 correspond to the detection pulse change factor detection circuit 140.

Subsequently, the operation of the above-mentioned configuration is described. The pulse selection circuit 7 selects, at the time of the second, a normal drive pulse output from the normal drive pulse generation circuit 3 and drives the stepper motor 20. After 5 ms from the second, the first detection mode is started. In the first detection mode, the pulse selection circuit 7 outputs the detection pulses, which are output from the first detection pulse generation circuit 5, and controls the stepper motor 20 so as to change the impedance of the coil 9. Note that depending on the output result of the BD circuit 16 and the driving rank of the normal drive pulse output from the normal drive pulse generation circuit 3, different detection pulses are output from the first detection pulse generation circuit 5. When the BD circuit 16 detects that the output voltage of the power supply 17 is 2.20 V or higher, the detection pulse selection circuit 154 controls the first detection pulse generation circuit 5 so as to output the detection pulses B5 to B12. When the BD circuit 16 detects that the output voltage of the power supply 17 is lower than 2.20 V and when the normal drive pulse generation circuit 3 outputs a normal drive pulse having a Duty of less than 20/32, on the other hand, the detection pulse selection circuit 154 controls the first detection pulse generation circuit 5 so as to output the detection pulses b5 to b12. When the BD circuit 16 detects that the output voltage of the power supply 17 is lower than 2.20 V and when the normal drive pulse generation circuit 3 outputs a normal drive pulse having a Duty of 20/32 or more, the detection pulse selection circuit 154 controls the first detection pulse generation circuit 5 so as to output the detection pulses B5 to B12. The detection circuit 11 then detects induced voltages that are generated in the coil 9 by the detection pulses B5 to B12 or b5 to b12, and outputs a detection signal when detecting an induced voltage exceeding a threshold Vth. The pulse selection circuit 7, on the other hand, instructs the first detection mode determination circuit 12 to start its determination operation. The first detection mode determination circuit 12 determines the presence or absence of the detection signal in the first detection mode based on the input of the detection signal from the detection circuit 11. When the detection signal has been generated from the detection circuit 11 twice, the first detection mode determination circuit 12 determines the detection and immediately stops the detection pulses output from the first detection pulse generation circuit 5 to notify the pulse selection circuit 7 so as to end the operation of the first detection mode and not to generate a correction drive pulse FP. The first detection mode determination circuit 12 further instructs the second detection mode determination circuit 13 to start its operation, to thereby shift to the second detection mode. However, when the detection pulses B5 to B12 and b5 to b12 have produced no detection signal at all, or only one detection signal, the first detection mode determination circuit 12 determines that the rotation has failed and ends the operation of the first detection mode. Then, without shifting to the second detection mode, the correction drive pulse FP is output, and when the next normal drive pulse is output, a normal drive pulse having the next higher-ranked driving power to the previous one is output from the normal drive pulse generation circuit 3.

After the shift to the second detection mode, the pulse selection circuit 7 outputs the detection pulses output from the second detection pulse generation circuit 6, and controls the stepper motor 20. Note that, similarly to the first detection mode, depending on the output result of the BD circuit 16 and the driving rank of the normal drive pulse output from the normal drive pulse generation circuit 3, different detection pulses are output from the second detection pulse generation circuit 6. When the BD circuit 16 detects that the output voltage of the power supply 17 is 2.20 V or higher, the detection pulse selection circuit 154 controls the second detection pulse generation circuit 6 so as to output the detection pulses F7 to F14. When the BD circuit 16 detects that the output voltage of the power supply 17 is lower than 2.20 V and when the normal drive pulse generation circuit 3 outputs a normal drive pulse having a Duty of less than 20/32, the detection pulse selection circuit 154 controls the second detection pulse generation circuit 6 so as to output the detection pulses f7 to f14. When the BD circuit 16 detects that the output voltage of the power supply 17 is lower than 2.20 V and when the normal drive pulse generation circuit 3 outputs a normal drive pulse having a Duty of 20/32 or more, the detection pulse selection circuit 154 controls the second detection pulse generation circuit 6 so as to output the detection pulses F7 to F14. The detection circuit 11 then detects induced voltages that are generated in the coil 9 by the detection pulses, and outputs a detection signal when detecting an induced voltage exceeding the threshold Vth. The second detection mode determination circuit 13 receives the detection signal of the detection circuit 11. When the detection signal has been generated twice, the second detection mode determination circuit 13 determines that the rotation has succeeded and immediately stops the detection pulses output from the second detection pulse generation circuit 6 to end the operation of the second detection mode, and further controls the pulse selection circuit 7 so as not to output the correction drive pulse FP. However, the detection of the detection signal generated by the detection pulses F7 to F14 or f7 to f14 is finished when the detection signal has been detected six times at most. If no detection signal, or only one detection signal, has been generated during the detection, it is determined that the rotation has failed and the correction drive pulse FP is output.

As described above, in the fourth embodiment, the first detection pulse generation circuit 5 and the second detection pulse generation circuit 6 each include a two-system pulse generation circuit for the detection pulse widths of 0.0625 ms and 0.25 ms, and the detection pulses are selected by the detection pulse selection circuit 154 and then output. That is, in the case where the output voltage of the power supply is 2.20 V or higher or lower than 2.20 V but the normal drive pulse has a driving rank that can rotate the rotor 10, the detection is performed with the detection pulse having a larger width of 0.25 ms, and hence an electromagnetic brake is suppressed so that the free oscillation of the rotor 10 is less likely to attenuate. In the case where the output voltage of the power supply is lower than 2.20 V and the normal drive pulse has a driving rank that cannot rotate the rotor 10, the detection is performed with the detection pulse having a smaller width of 0.0625 ms, and hence the electromagnetic brake is easily generated to suppress the free oscillation of the rotor 10.

An actual method of detecting the rotation through the above-mentioned operation is described. The method for the case where the output voltage of the power supply is 2.20 V or higher is the same as in the third embodiment and hence description thereof is omitted. First, the case where an indicating hand having a large moment of inertia is attached, the output voltage of the power supply is 2.15 V, and a normal drive pulse having a Duty of 16/32 is output is described. Waveform diagrams in this case are the same as the waveform diagrams of FIGS. 16 and 14 of the third embodiment, and the same rotation detection is performed. That is, in the first detection mode, when the BD circuit detects 2.15 V, which means the output voltage is lower than 2.20 V and the driving rank of the normal drive pulse is a Duty of less than 20/32, the detection pulse selection circuit 154 selects the detection pulses b5 to b12 each having a detection pulse width of 0.0625 ms in order to suppress the free oscillation of the rotor 10. Then, as illustrated in FIG. 16(*a*), at 7 ms and 8 ms, the current waveform is in the region of the current waveform c5, and the induced voltages V7 and V8 generated by the detection pulses B7 and B8 become detection signals exceeding the threshold Vth. Because the two detection signals of the induced voltages V7 and V8 have exceeded the threshold Vth, the mode is switched to the second detection mode. Similarly in the second detection mode, because the BD circuit has detected 2.15 V, the detection pulse selection circuit 154 selects the detection pulses F7 to F14 each having a detection pulse width of 0.0625 ms in order to suppress the free oscillation of the rotor 10. After the selection of the detection pulses, as illustrated in FIG. 16(*a*), the current waveform for the induced voltages V9 to V13 generated by the detection pulses f9 to f13 is in the region of the current waveform c5, in which the current value is positive. Accordingly, as illustrated in FIG. 16(*b*), the induced voltages V9 to V13 never exceed the threshold Vth. Even at 14 ms, which corresponds to the sixth detection in the second detection mode, the induced voltage V14 generated by the detection pulse F14 never exceeds the threshold Vth. Accordingly, the second detection mode determination circuit 13 normally determines that the rotation has failed. Then, the correction drive pulse FP is output, and when the next normal drive pulse is output, the normal drive pulse SP2 having the next higher-ranked driving power to the previous one is output from the normal drive pulse generation circuit 3. Therefore, the clock never stops.

Subsequently, the case where the output voltage of the power supply is 2.15 V and the driving rank of the normal drive pulse is changed to a Duty of 24/32 so as to output the normal drive pulse SP2 is described with reference to the waveform diagrams of FIGS. 22 and 18. FIG. 22(*a*) is, similarly to FIG. 27(*a*) in the conventional example, a waveform of a current that is induced in the coil 9 when an indicating hand having a large moment of inertia is attached. FIG. 22(*b*) is a waveform of a voltage generated at one terminal O1 of the coil 9 at this time and FIG. 22(*c*) is a waveform of a voltage generated at another terminal O2 of the coil 9.

First, when the BD circuit detects that the output voltage is 2.15 V, which is lower than 2.20 V, and when the normal drive pulse generation circuit 3 outputs a normal drive pulse having a driving rank of a Duty 24/32, which is a Duty of 20/32 or more, the detection pulse selection circuit 154 selects the detection pulses B5 to B12 each having a detection pulse width of 0.25 ms so that the free oscillation of the rotor 10 is less likely to attenuate. After the selection of the detection pulses, the first detection mode is started at the time of 5 ms, and the detection pulse B5 is applied to the coil 9. As illustrated in FIG. 22(*a*), at 7 ms, the current waveform is in the region of the current waveform c3, in which the current value is changed to the positive direction. Accordingly, as illustrated in FIG. 22(*c*), the induced voltage V7 becomes a detection signal exceeding the threshold Vth. Also at 8 ms, the current waveform is in the region of the current waveform c3, and the induced voltage V8 becomes a detection signal exceeding the threshold Vth. Because the two detection signals of the induced voltages V7 and V8 have exceeded the threshold Vth, the mode shifts to the second detection mode.

In response to the shift to the second detection mode by the induced voltage V8, because the BD circuit has detected 2.15 V and the normal drive pulse generation circuit 3 has output the normal drive pulse having the driving rank of a Duty of 24/32, the detection pulse selection circuit 154 selects the detection pulses F7 to F14 each having a detection pulse width of 0.25 ms so that the free oscillation of the rotor 10 is less likely to attenuate. Then, a detection pulse at the time following 8 ms, namely the detection pulse F9 at the time of 9 ms illustrated in FIG. 18(*c*), is applied to the coil 9. As illustrated in FIG. 22(*a*), at 9 ms, the current waveform is in the region of the current waveform c3, in which the current value is positive. Accordingly, as illustrated in FIG. 22(*b*), the induced voltage V9 generated by the detection pulse F9 never exceeds the threshold Vth. Similarly, the current waveform for the induced voltages V10 and V11 generated by the detection pulses F10 and F11 is also in the region of the current waveform c3, and the induced voltages V10 and V11 never exceed the threshold Vth. At 12 ms, however, because the free oscillation is less likely to attenuate, the current waveform is in the region of the current waveform c4 as illustrated in FIG. 22(*a*), in which the current value is changed to the negative direction. Accordingly, as illustrated in FIG. 22(*c*), the induced voltage V12 generated by the detection pulse F12 becomes a detection signal exceeding the threshold Vth. Similarly at 13 ms, the current waveform is also in the region of the current waveform c4, and the induced voltage V13 generated by the detection pulse F13 becomes a detection signal exceeding the threshold Vth. Because the two detection signals of the induced voltages V12 and V13 have exceeded the threshold Vth, the second detection mode determination circuit 13 normally determines that the rotation has succeeded. Then, the correction drive pulse FP is not output, and when the next normal drive pulse is output, the normal drive pulse SP having the same driving power as the previous one is output.

In the state in which the output voltage of the power supply is 2.15 V, if the detection pulse width is not switched depending on the driving rank of the normal drive pulse, specifically if the detection pulse selection circuit 154 selects the detection pulses f7 to f14 having a detection pulse width of 0.0625 ms, similarly to the case where the driving rank of the normal drive pulse is a Duty of less than 20/32, the current exhibits a waveform as illustrated in FIG. 21(*a*). That is, the waveform profile represented by induced current waveforms c2, c3, and c4 appears subsequent to the current waveform c1. Compared with the current waveform illustrated in FIG. 21(*a*), the current waveform c4 is flattened because of an electromagnetic brake. In this case, in the second detection mode, at 12 ms, the current waveform is in the region of the current waveform c4, in which the current value is changed to the negative direction. As illustrated in FIG. 21(*b*), the induced voltage V12 generated by the detection pulse f12 becomes a detection signal exceeding the threshold Vth, but an induced voltage exceeding the threshold Vth cannot be obtained from the other induced voltages V9 to V11, V13, and V14 generated by the detection pulses f9 to f11, f13, and f14. It follows that a detection signal exceeding the threshold is not detected twice within six detection periods from the induced voltage V9 to the induced voltage V14. Therefore, the second detection mode determination circuit 13 determines that the rotation has failed, and the pulse selection circuit 7 selects and outputs the correction drive pulse FP. In other words, even though the rotation has succeeded, the correction drive pulse FP is output due to such erroneous determination, and when the next normal drive pulse is output, the normal drive pulse SP3 having the next higher-ranked driving power to the previous one is output from the normal drive pulse generation circuit 3, with the result that current consumption is increased.

As described above, in the fourth embodiment, the detection pulse width is switched depending on the output voltage of the power supply and the driving rank of the normal drive pulse. Accordingly, it is possible to support an indicating hand having a large moment of inertia, and when the driving power of the stepper motor 20 is too low to rotate the rotor 10, it can be normally determined that the rotation has failed. Besides, compared with the third embodiment, current consumption can be suppressed even when the output voltage of the power supply is low.

The above-mentioned operation is described with reference to a flowchart. FIG. 20 is a flowchart illustrating the method of detecting the rotation of the rotor 10 in the electronic watch according to the fourth embodiment, and illustrates the operation performed every second, on the second. The normal drive pulse SP is output at the time of the second (Step ST1), and it is determined whether the output voltage of the power supply is lower than 2.20 V (Step ST2). When the output voltage of the power supply is 2.20 V or higher, the detection pulse width is set to 0.25 ms in order to reduce the period in which the electromagnetic brake is generated in the first detection mode and the second detection mode (Step ST3). When the output voltage of the power supply is lower than 2.20 V, it is determined whether the Duty of the normal drive pulse is less than 20/32 (Step ST4). When the Duty of the normal drive pulse is less than 20/32, the detection pulse width is set to 0.0625 ms in order to increase the period in which the electromagnetic brake is generated in the first detection mode and the second detection mode (Step ST5). When the Duty of the normal drive pulse is 20/32 or more, the detection pulse width is set to 0.25 ms in order to reduce the period in which the electromagnetic brake is generated in the first detection mode and the second detection mode (Step ST6). The rotation detection is then started after 5 ms from the second (Step ST7). It is determined whether a detection signal has been detected within a predetermined period (Step ST8). When a detection signal has been detected within the predetermined period, it is determined that the rotation has succeeded. Then, the correction drive pulse FP is not output, and when the next normal drive pulse is output, the normal drive pulse SP having the same driving power as the previous one is output (Step ST9). When a detection signal has not been detected within the predetermined period, it is determined that the rotation has failed, and then the correction drive pulse FP is output, and at the same time, a normal drive pulse having the next higher-ranked driving power is output (Step ST10). This step completes the operation for the second concerned, and the operation is restarted from the beginning after waiting for the next second.

Note that the above description is illustrative of this embodiment, which may be modified as follows, for example.

(1) In the above embodiment, the determination voltage is a single level of 2.20 V, but as in the third embodiment, a plurality of levels may be set so that the detection pulse width is changed in three or more multiple voltage sections.

(2) It should be understood that the numerical value of the determination voltage level is not limited to 2.20 V and should be optimized depending on the motor or the indicator (such as an indicating hand and date dial) to be attached or the type of power supply. The same applies to the number of voltage levels.

(3) In the above-mentioned embodiment, the same detection pulse width is used when the output voltage is 2.20 V or higher and when the output voltage is 2.20 V or lower and the Duty of the normal drive pulse is 20/32. It should be understood that different values may be employed and adjusted as appropriate.

(4) The Duty for determination of the normal drive pulse may also be divided into three or more multiple Duty sections. Of course, the detection pulse width is changed in the respective sections.

Fifth Embodiment

Change Depending on First Half and Second Half of First Detection Mode

Next, a fifth embodiment of the present invention is described. The fifth embodiment is an example in which the detection pulse width is changed between the first half and the second half of the first detection mode. This example utilizes the fact that a detection signal in the first detection mode is detected at different times between when the rotor has succeeded in rotating and when the rotor has failed to rotate. In this example, when the rotation has succeeded, the electromagnetic brake is weakened to suppress the increase in consumption power resulting from erroneous detection, and when the rotation has failed, the electromagnetic brake is enabled so as to prevent erroneous determination that the rotation has succeeded. Hereinafter, the detailed description is given with reference to the drawings.

Figure 31:
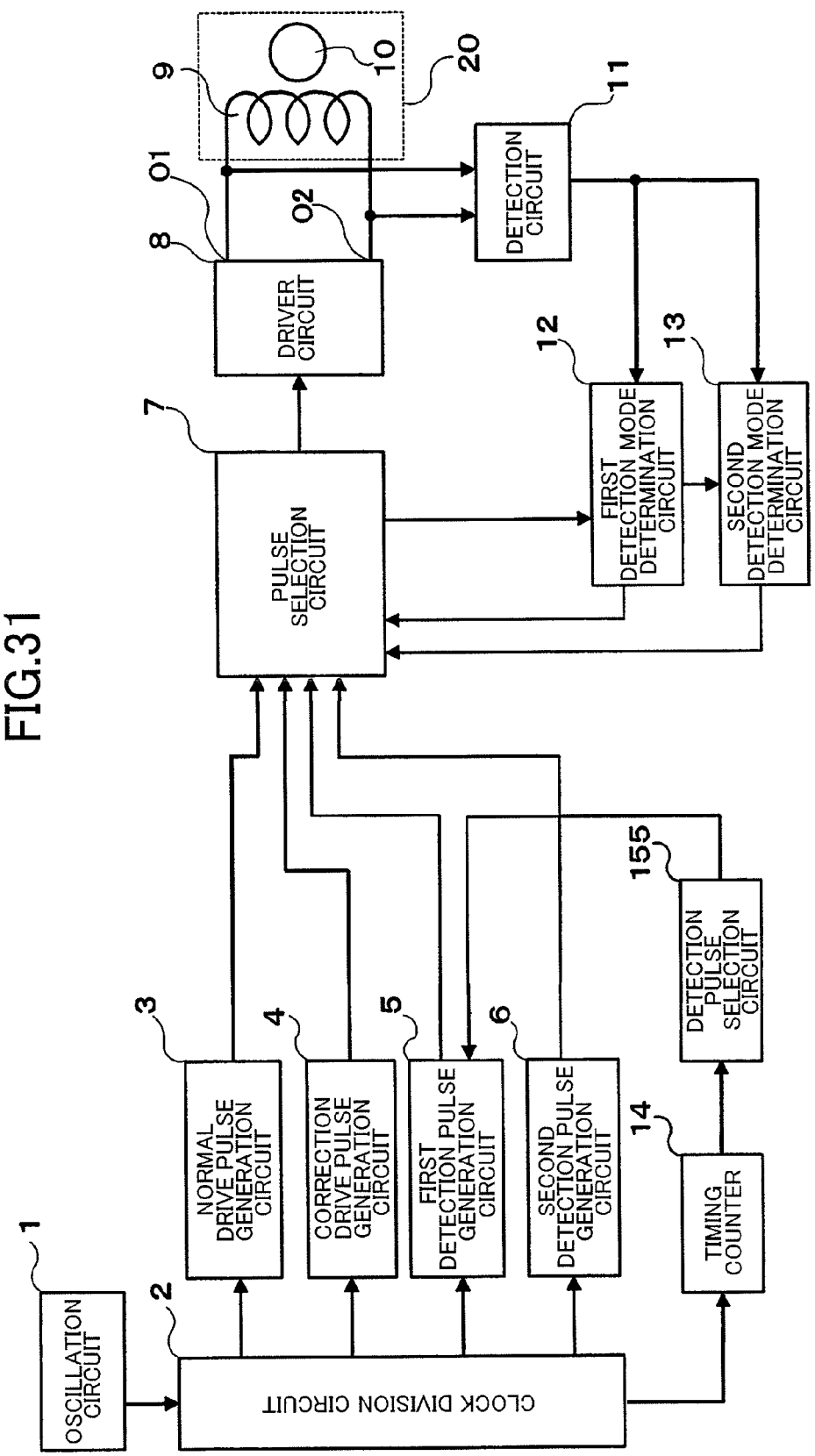
FIG. 31 is a block diagram illustrating a circuit configuration according to a fifth embodiment of the present invention.
Figure 32:
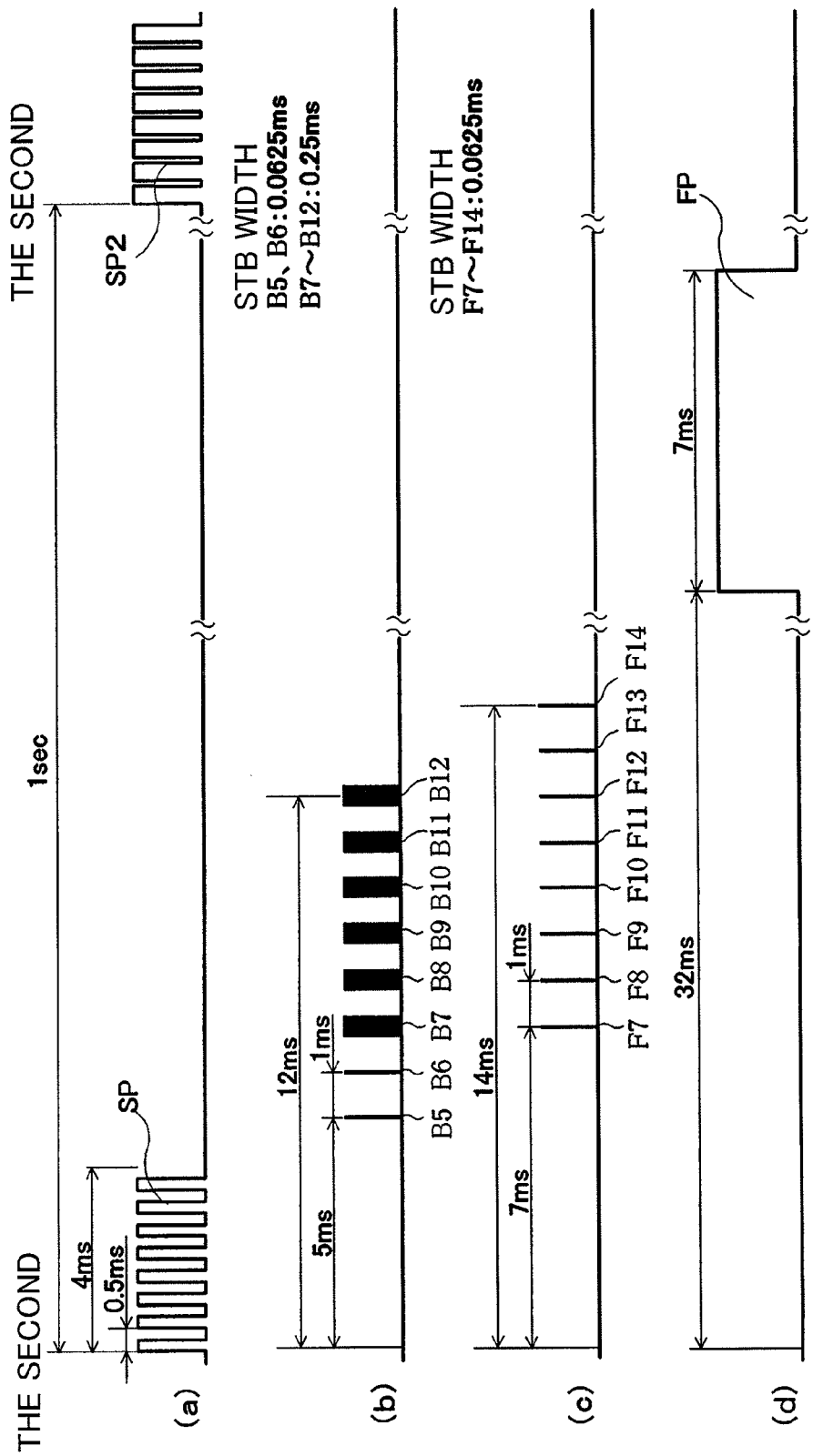
FIG. 32 are waveform diagrams of pulses that are generated by circuits of the electronic watch according to the fifth embodiment of the present invention.
Figure 34:
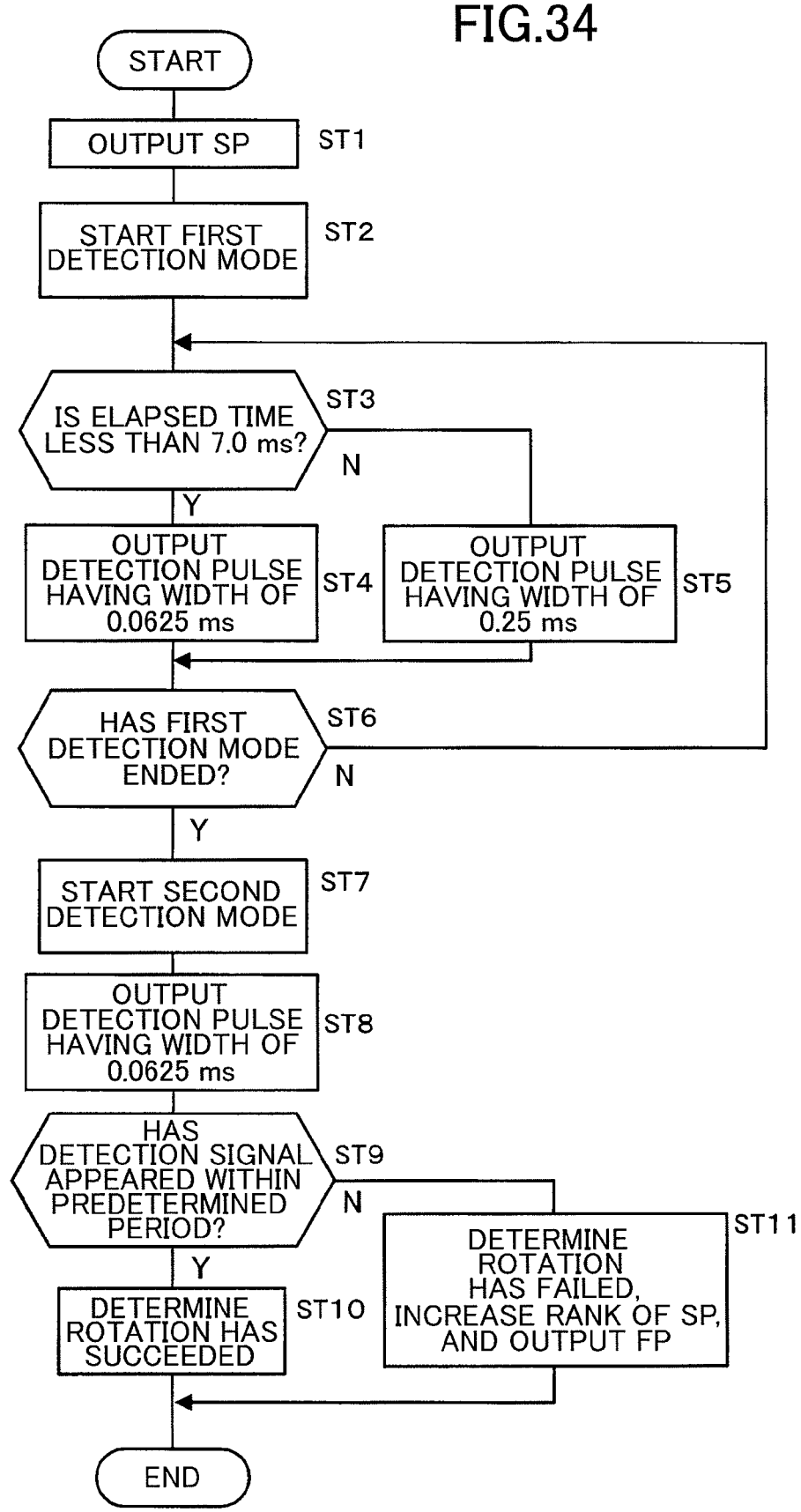
FIG. 34 is a flowchart of the electronic watch according to the fifth embodiment of the present invention.

FIG. 31 is a block diagram illustrating a circuit configuration of an electronic watch according to the fifth embodiment. FIG. 32 are waveform diagrams of pulses that are generated by circuits of the electronic watch according to the fifth embodiment. FIG. 33 are waveform diagrams of current and voltage that are generated in a coil when a rotor 10 has succeeded in rotating in the case where an indicating hand having a large moment of inertia is attached to the electronic watch according to the fifth embodiment. FIG. 34 is a flowchart of the electronic watch according to the fifth embodiment. Note that the same components as those described in the conventional example and the first to fourth embodiments are denoted by the same numerals and further description is omitted.

In FIG. 31, reference numeral 20 denotes the stepper motor including a coil 9 and the rotor 10; 1, an oscillation circuit; 2, a clock division circuit; 3, a normal drive pulse generation circuit; 4, a correction drive pulse generation circuit; and 5, a first detection pulse generation circuit, which outputs detection pulses B5 to B12 for the first detection mode based on a signal of the clock division circuit 2. As illustrated in FIG. 32(b), the detection pulses B5 and B6 are pulses each having a width of 0.0625 ms, and the detection pulses B7 to B12 after 7 ms from the second are pulses each having a width of 0.25 ms. The detection pulses B5 to B12 are output every 1 ms from 5 ms after the second until 12 ms has elapsed since the second. Reference numeral 6 denotes a second detection pulse generation circuit, which outputs detection pulses F7 to F14 to be used in the second detection mode based on a signal of the clock division circuit 2. As illustrated in FIG. 32(c), the detection pulses F7 to F14 are pulses each having a width of 0.0625 ms and are output every 1 ms from 7 ms after the second until 14 ms has elapsed since the second.

Reference numeral 7 denotes a pulse selection circuit; 8, a driver circuit; 9, the coil; 10, the rotor; 11, a detection circuit; 12, a first detection mode determination circuit for determining the first detection mode based on a detection signal of the detection circuit 11; 13, a second detection mode determination circuit for determining the second detection mode based on a detection signal of the detection circuit 11; and 14, the timing counter for counting the time which has elapsed after the SP output. In this embodiment, the timing counter 14 corresponds to the detection pulse change factor detection circuit 140.

Reference numeral 155 denotes a detection pulse selection circuit, which selects the detection pulses having different pulse widths generated by the first detection pulse generation circuit 5 based on a count signal of the timing counter 14, and controls the first detection pulse generation circuit 5 so as to output the selected detection pulses. That is, the detection pulse selection circuit 155 is detection pulse control means for controlling the first detection pulse generation circuit 5 so that the width of the detection pulse can be changed in a rotation detection period.

Subsequently, the operation of the above-mentioned configuration is described. The pulse selection circuit 7 selects, at the time of the second, a normal drive pulse output from the normal drive pulse generation circuit 3 and drives the stepper motor 20. After 5 ms from the second, the first detection mode is started. In the first detection mode, the pulse selection circuit 7 outputs the detection pulses, which are output from the first detection pulse generation circuit 5, and controls the stepper motor 20 so as to change the impedance of the coil 9. The detection circuit 11 then detects induced voltages that are generated in the coil 9 by the detection pulses B5 to B12, and outputs a detection signal when detecting an induced voltage exceeding a threshold Vth. The pulse selection circuit 7, on the other hand, instructs the first detection mode determination circuit 12 to start its determination operation. The first detection mode determination circuit 12 determines the presence or absence of the detection signal in the first detection mode based on the input of the detection signal from the detection circuit 11. When the detection signal has been generated from the detection circuit 11 twice, the first detection mode determination circuit 12 determines the detection and immediately stops the detection pulses output from the first detection pulse generation circuit 5 to notify the pulse selection circuit 7 so as to end the operation of the first detection mode and not to generate a correction drive pulse FP. The first detection mode determination circuit 12 further instructs the second detection mode determination circuit 13 to start its operation, to thereby shift to the second detection mode. However, when the detection pulses B5 to B12 have produced no detection signal at all, or only one detection signal, the first detection mode determination circuit 12 determines that the rotation has failed and ends the operation of the first detection mode. Then, without shifting to the second detection mode, the correction drive pulse FP is output, and when the next normal drive pulse is output, a normal drive pulse having the next higher-ranked driving power to the previous one is output from the normal drive pulse generation circuit 3.

After the shift to the second detection mode, the pulse selection circuit 7 outputs the detection pulses output from the second detection pulse generation circuit 6, and controls the stepper motor 20. The detection circuit 11 then detects induced voltages that are generated in the coil 9 by the detection pulses, and outputs a detection signal when detecting an induced voltage exceeding the threshold Vth. The second detection mode determination circuit 13 receives the detection signal of the detection circuit 11. When the detection signal has been generated twice, the second detection mode determination circuit 13 determines that the rotation has succeeded and immediately stops the detection pulses output from the second detection pulse generation circuit 6 to end the operation of the second detection mode, and further controls the pulse selection circuit 7 so as not to output the correction drive pulse FP. However, the detection of the detection signal generated by the detection pulses F7 to F14 is finished when the detection signal has been detected six times at most. If no detection signal, or only one detection signal, has been generated during the detection, it is determined that the rotation has failed and the correction drive pulse FP is output.

As described above, in the fifth embodiment, the elapsed period from the output of the normal drive pulse involves two rotation detection periods in the first detection mode, namely the first and second rotation detection periods, having different detection pulse widths. That is, in the first rotation detection period, the detection pulse width is reduced to 0.0625 ms so that the electromagnetic brake is generated to suppress free oscillation of the rotor 10, and in the second rotation detection period, the detection pulse width is increased to 0.25 ms so that the electromagnetic brake acts less and the free oscillation of the rotor 10 is suppressed less.

An actual method of detecting the rotation through the above-mentioned operation is described with reference to FIGS. 32, 33, and 12. FIG. 33(a) is a waveform of a current that is induced in the coil 9 when an indicating hand having a large moment of inertia is attached, and illustrates the waveform obtained when the rotor 10 has succeeded in rotating. FIG. 33(b) is a waveform of a voltage generated at one terminal O1 of the coil 9 at this time and FIG. 33(c) is a waveform of a voltage generated at another terminal O2 of the coil 9.

First, as illustrated in FIG. 32(a), the normal drive pulse SP is applied to the terminal O1 of the coil 9 from the second, and the rotor rotates to generate a current waveform c1 illustrated in FIG. 33(a). At the time when 5 ms has elapsed from the second, the first detection mode is started, and the detection pulse B5 illustrated in FIG. 32(b) is applied to the coil 9 and, after 1 ms, the detection pulse B6 is applied thereto. At this time, as illustrated in FIG. 33(a), the current waveform is in the region of a current waveform c2, in which the current value is negative, and hence, as illustrated in FIG. 33(c), the induced voltages V5 and V6 do not exceed the threshold Vth. At the time when 7 ms has elapsed, the current waveform is in the region of a current waveform c3 illustrated in FIG. 33(a), in which the current value is positive. Accordingly, induced voltages V7 and V8 regarding the detection pulses B7 and B8 illustrated in FIG. 32(b) become detection signals exceeding the threshold Vth as illustrated in FIG. 33(c). Because the two detection signals of the induced voltages V7 and V8 have exceeded the threshold Vth, the mode shifts to the second detection mode.

In this case, the detection pulses B7 and B8, which are detection pulses in the first detection mode after 7 ms from the second, have a larger width of 0.25 ms, and hence the electromagnetic brake acts less and the free oscillation of the rotor 10 is suppressed less. Accordingly, the subsequent current waveform is less likely to be flattened, and the rotation of the rotor 10 is accurately detected more easily.

Then, in response to the shift to the second detection mode, after the subsequent time of 9 ms from the second, the detection pulse F9 illustrated in FIG. 32(c) is applied to the coil 9. At the times between 9 ms and 11 ms from the second, as illustrated in FIG. 33(a), the current waveform is in the region c3, in which the current value is positive. Accordingly, the induced voltages V9 to V11 obtained by the detection pulses F9 to F11 do not exceed the threshold Vth as illustrated in FIG. 33(b). When 12 ms has elapsed from the second, a region c4 appears in the current waveform as illustrated in FIG. 33(a) because, as described above, the electromagnetic brake is weakened in the first detection mode so that the free oscillation of the rotor 10 is suppressed less. This current value is negative, and hence the detection signals V12 and V13 exceeding the threshold Vth are obtained with respect to the detection pulses F12 and F13 of FIG. 32(c). Accordingly, the second detection mode determination circuit 13 normally determines that the rotation has succeeded. Then, the correction drive pulse FP is not output, and when the next normal drive pulse is output, the normal drive pulse SP having the same driving power as the previous one is output.

On the other hand, the operation performed when the rotor 10 has failed to rotate is as follows. In the fifth embodiment, waveform diagrams of current and voltage that are generated in the coil when the rotor 10 has failed to rotate are the same as FIG. 12 corresponding to the waveform diagrams of current and voltage that are generated in the coil when the rotor 10 has failed to rotate in the second embodiment, and hence FIG. 12 are referred to in the following description. FIG. 12(a) is a waveform of a current that is induced in the coil 9 in this case when an indicating hand having a large moment of inertia is attached. FIG. 12(b) is a waveform of a voltage generated at one terminal O1 of the coil 9 at this time and FIG. 12(c) is a waveform of a voltage generated at another terminal O2 of the coil 9.

First, as illustrated in FIG. 32(a), the normal drive pulse SP is applied to the terminal O1 of the coil 9 from the second, and the current waveform c1 illustrated in FIG. 12(a) is generated. At the time when 5 ms has elapsed from the second, the first detection mode is started, and the detection pulse B5 illustrated in FIG. 32(b) is applied to the coil 9, and after 1 ms, the detection pulse B6 is applied thereto. At this time, because the rotor 10 has failed to rotate, the current waveform c5 illustrated in FIG. 12(a) in which the current value is positive appears. Accordingly, as illustrated in FIG. 12(c), the induced voltages V5 and V6 exceed the threshold Vth. Because the two detection signals have exceeded the threshold Vth, the mode shifts to the second detection mode.

In the subsequent second detection mode, the detection pulse F7 illustrated in FIG. 32(c) having a smaller width of 0.0625 ms is applied to the coil 9 at the time when 7 ms has elapsed from the second. At this time, as illustrated in FIG. 12(a), the current waveform is in the region c5, in which the current value is positive, and hence the induced voltage V7 never exceeds the threshold Vth. Subsequently, the detection pulses F8 to F12 illustrated in FIG. 32(c) are similarly applied to the coil 9 every 1 ms. At this time, throughout the first detection mode and the second detection mode, the detection pulses applied to the coil all have a smaller width of 0.0625 ms, and hence the electromagnetic brake is easily generated and the free oscillation of the rotor 10 is suppressed. Accordingly, at the time beyond the region c5 of the current waveform, the rotor 10 almost stops, and as illustrated in FIG. 12(a), does not exhibit a current value in the negative direction. Therefore, as illustrated in FIG. 12(b), the induced voltages V8 to V12 obtained from the detection pulses F8 to F12 do not exceed the threshold Vth, either.

The second detection mode is terminated because two detection signals exceeding the threshold Vth have not been obtained during the six detections by the detection pulses F7 to F12. Accordingly, the second detection mode determination circuit 13 normally determines that the rotation has failed. Then, the correction drive pulse FP is output, and when the next normal drive pulse is output, the normal drive pulse SP2 having the next higher-ranked driving power to the previous one is output from the normal drive pulse generation circuit 3. Therefore, the clock never stops.

As described above, in the fifth embodiment, the detection pulse width is changed between the first half and the second half of the first detection mode, utilizing the timing difference that, when the rotor 10 has succeeded in rotating, a detection signal exceeding the threshold Vth in the first detection mode is obtained at a delayed timing, and when the rotation has failed, a detection signal exceeding the threshold Vth in the first detection mode is obtained immediately after the normal drive pulse SP. Therefore, when the rotation has succeeded, the electromagnetic brake is weakened to suppress the increase in consumption power resulting from erroneous detection, and when the rotation has failed, the electromagnetic brake is enabled so as to prevent erroneous determination that the rotation has succeeded.

The above-mentioned operation is described with reference to a flowchart. FIG. 34 is a flowchart illustrating the method of detecting the rotation of the rotor 10 in the electronic watch according to the fifth embodiment, and illustrates the operation performed every second, on the second. The normal drive pulse SP is output at the time of the second (Step ST1), and the rotation detection in the first detection mode is started after 5 ms has elapsed since the second (Step ST2). It is determined whether the elapsed time from the second in the first detection mode is less than 7.0 ms (Step ST3). When the elapsed time is less than 7.0 ms, the detection pulse having a width of 0.0625 ms is output (Step ST4). When the elapsed time is 7.0 ms or more, the detection pulse having a width of 0.25 ms is output (Step ST5). The process from ST3 to ST5 is repeated until the first detection mode ends (Step ST6). After the end of the first detection mode, the second detection mode is started (Step ST7). In the second detection mode, the detection pulse having a width set to 0.0625 ms is output (Step ST8). It is then determined whether a detection signal has been detected within a predetermined period (Step ST9). When a detection signal has been detected, it is determined that the rotation has succeeded. Then, the correction drive pulse FP is not output, and when the next normal drive pulse is output, the normal drive pulse SP having the same driving power as the previous one is output (Step ST10). When a detection signal has not been detected within the predetermined period, it is determined that the rotation has failed, and then the correction drive pulse FP is output, and at the same time, a normal drive pulse having the next higher-ranked driving power is output from the next second (Step ST11). This step completes the operation for the second concerned, and the operation is restarted from the beginning after waiting for the next second.

Note that the above description is illustrative of this embodiment, and various modifications are possible. For example, the time of changing the detection pulse width in the first detection mode and other such factors may be changed depending on an actual device to which this embodiment is to be applied.

Sixth Embodiment

Change Depending on Detection Result in First Half of First Detection Mode

Next, a sixth embodiment of the present invention is described. The sixth embodiment is an example in which the first detection mode is divided into the first half and the second half, and the detection pulse width is changed depending on a detection result obtained in the first half. As in the fifth embodiment, this example utilizes the fact that a detection signal in the first detection mode is detected at different times between when the rotor has succeeded in rotating and when the rotor has failed to rotate. In this example, when the rotation has succeeded, the electromagnetic brake is weakened to suppress the increase in consumption power resulting from erroneous detection, while when the rotation has failed, the electromagnetic brake is enabled so as to prevent erroneous determination that the rotation has succeeded. Hereinafter, the detailed description is given with reference to the drawings.

Figure 35:
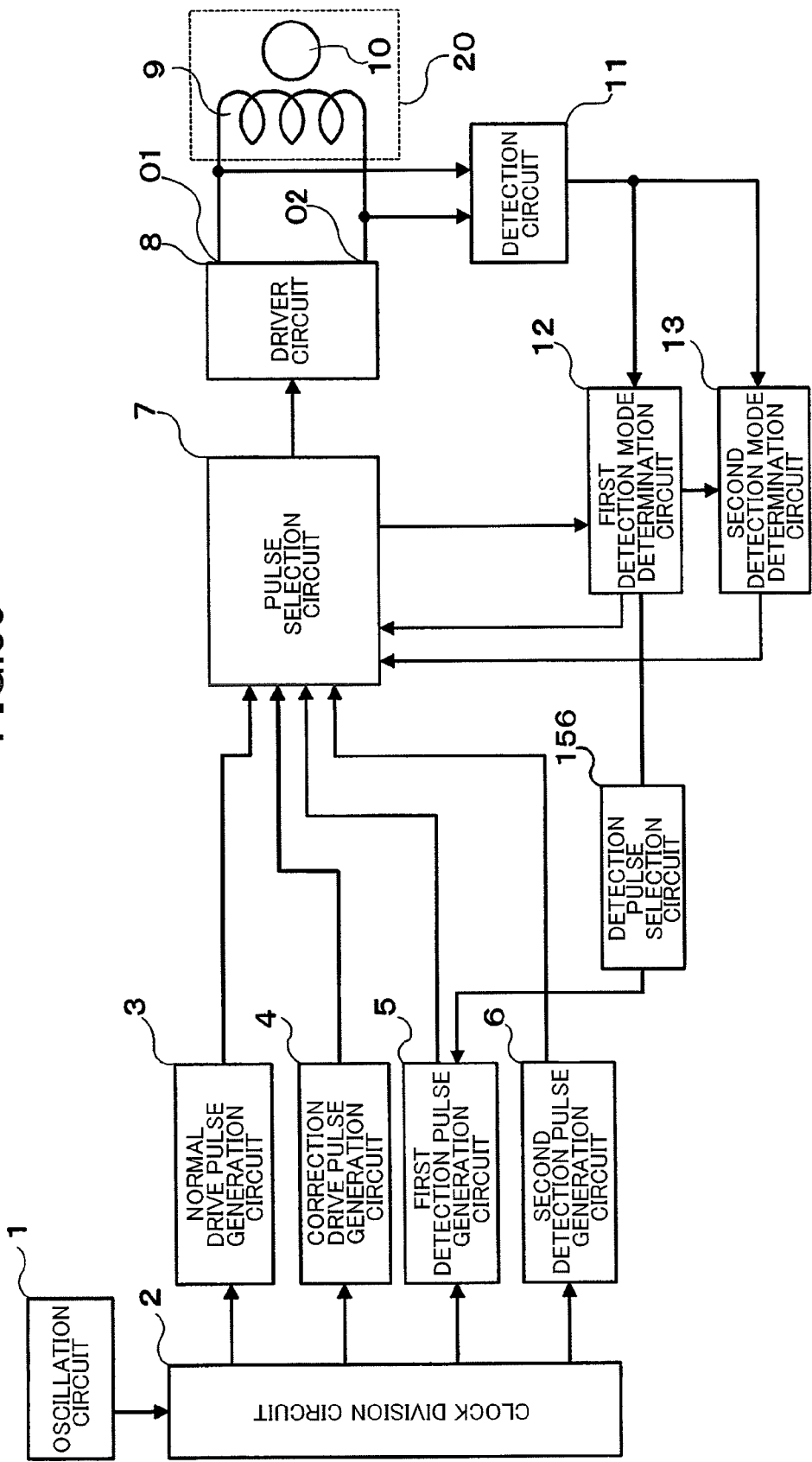
FIG. 35 is a block diagram illustrating a circuit configuration according to sixth, eighth, and ninth embodiments of the present invention.
Figure 36:
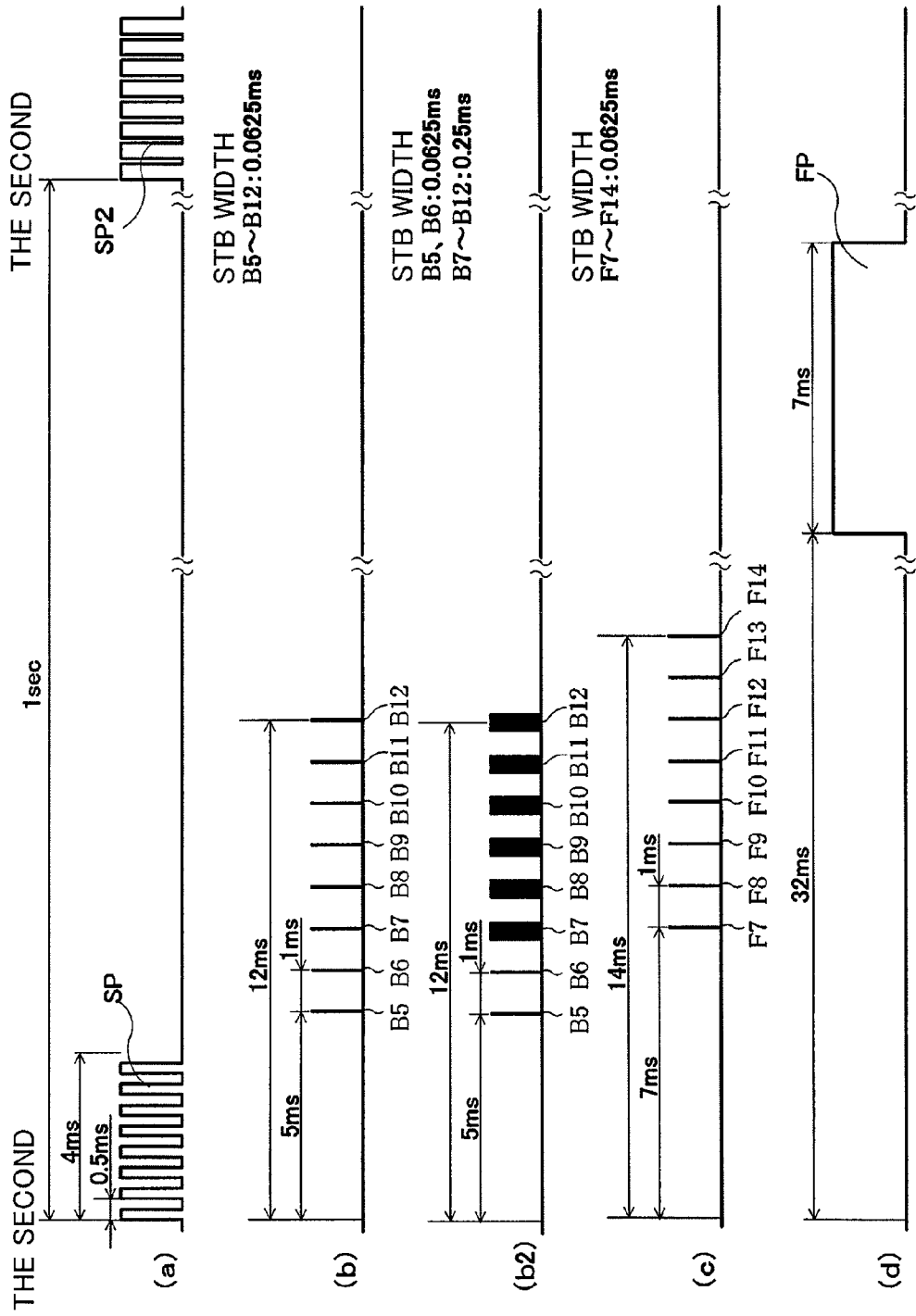
FIG. 36 are waveform diagrams of pulses that are generated by circuits of the electronic watch according to the sixth embodiment of the present invention.
Figure 39:
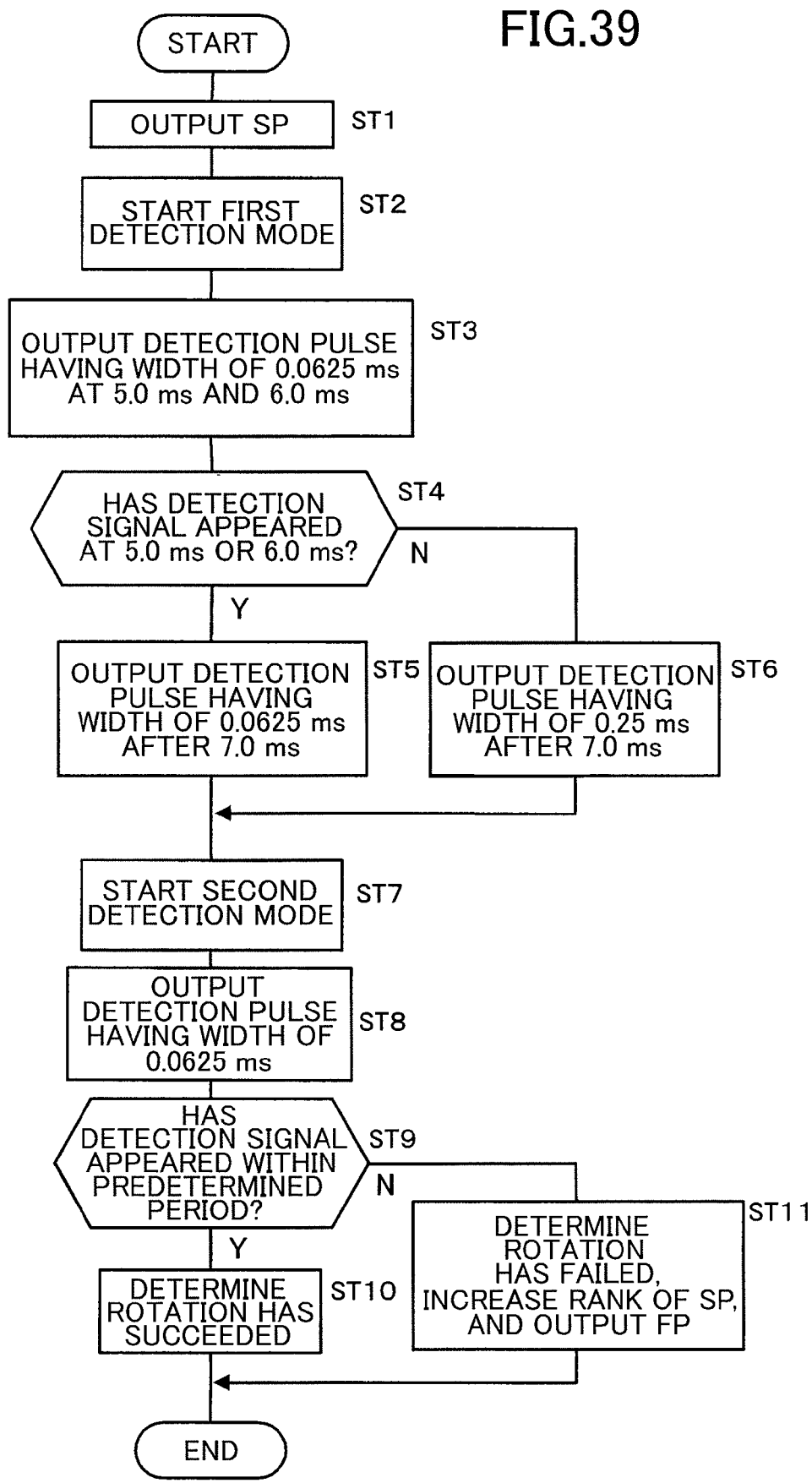
FIG. 39 is a flowchart of the electronic watch according to the sixth embodiment of the present invention.

FIG. 35 is a block diagram illustrating a circuit configuration of an electronic watch according to the sixth embodiment. FIG. 36 are waveform diagrams of pulses that are generated by circuits of the electronic watch according to the sixth embodiment. FIG. 37 are waveform diagrams of current and voltage that are generated in a coil when a rotor 10 has succeeded in rotating in the case where an indicating hand having a large moment of inertia is attached to the electronic watch according to the sixth embodiment. FIG. 38 are waveform diagrams of current and voltage that are generated in the coil when the rotor 10 has failed to rotate. FIG. 39 is a flowchart of the electronic watch according to the sixth embodiment. Note that the same components as those described in the conventional example and the first to fifth embodiments are denoted by the same numerals and further description is omitted.

In FIG. 35, reference numeral 20 denotes the stepper motor including a coil 9 and the rotor 10; 1, an oscillation circuit; 2, a clock division circuit; 3, a normal drive pulse generation circuit; 4, a correction drive pulse generation circuit; and 5, a first detection pulse generation circuit, which outputs detection pulses B5 to B12 for the first detection mode based on a signal of the clock division circuit 2. As illustrated in FIGS. 36(b) and 36(b2), the detection pulses B5 and B6 are pulses each having a width of 0.0625 ms, and there are two kinds of the detection pulses B7 to B12 after 7 ms from the second, one having a width of 0.0625 ms (FIG. 36(b)) and the other having a width of 0.25 ms (FIG. 36(b2)), which are output every 1 ms from 5 ms after the second until 12 ms has elapsed since the second. Reference numeral 6 denotes a second detection pulse generation circuit, which outputs detection pulses F7 to F14 to be used in the second detection mode based on a signal of the clock division circuit 2. As illustrated in FIG. 36(c), the detection pulses F7 to F14 are pulses each having a width of 0.0625 ms and are output every 1 ms from 7 ms after the second until 14 ms has elapsed since the second.

Reference numeral 7 denotes a pulse selection circuit; 8, a driver circuit; 9, the coil; 10, the rotor; 11, a detection circuit; 12, a first detection mode determination circuit for determining the first detection mode based on a detection signal of the detection circuit 11; and 13, a second detection mode determination circuit for determining the second detection mode based on a detection signal of the detection circuit 11. In this embodiment, the first detection mode determination circuit 12 serves also as the detection pulse change factor detection circuit 140.

Reference numeral 156 denotes the detection pulse selection circuit, which selects the detection pulses having different pulse widths generated by the first detection pulse generation circuit 5 based on the output of the first detection mode determination circuit 12, and controls the first detection pulse generation circuit 5 so as to output the selected detection pulses. That is, the detection pulse selection circuit 156 is detection pulse control means for controlling the first detection pulse generation circuit 5 so that the width of the detection pulse can be changed depending on the output of the first detection mode determination circuit.

Subsequently, the operation of the above-mentioned configuration is described. The pulse selection circuit 7 selects, at the time of the second, a normal drive pulse output from the normal drive pulse generation circuit 3 and drives the stepper motor 20. After 5 ms from the second, the first detection mode is started. In the first detection mode, the pulse selection circuit 7 outputs the detection pulses, which are output from the first detection pulse generation circuit 5, and controls the stepper motor 20 so as to change the impedance of the coil 9. The detection circuit 11 then detects induced voltages that are generated in the coil 9 by the detection pulses B5 to B12, and outputs a detection signal when detecting an induced voltage exceeding a threshold Vth. The pulse selection circuit 7, on the other hand, instructs the first detection mode determination circuit 12 to start its determination operation. The first detection mode determination circuit 12 determines the presence or absence of the detection signal in the first detection mode based on the input of the detection signal from the detection circuit 11. When the detection signal has been generated from the detection circuit 11 three times, the first detection mode determination circuit 12 determines the detection and immediately stops the detection pulses output from the first detection pulse generation circuit 5 to notify the pulse selection circuit 7 so as to end the operation of the first detection mode and not to generate a correction drive pulse FP. The first detection mode determination circuit 12 further instructs the second detection mode determination circuit 13 to start its operation, to thereby shift to the second detection mode. However, when the detection pulses B5 to B12 have produced no detection signal at all, or only one or two detection signals, the first detection mode determination circuit 12 determines that the rotation has failed and ends the operation of the first detection mode. Then, without shifting to the second detection mode, the correction drive pulse FP is output, and when the next normal drive pulse is output, a normal drive pulse having the next higher-ranked driving power to the previous one is output from the normal drive pulse generation circuit 3.

Note that the first detection mode is sectioned into the first half containing the detection pulses B5 and B6 and the second half containing the other pulses, and the method of detecting the detection signal in the second half of the first detection mode is different depending on the detection result in the first half of the first detection mode. In other words, when a detection signal has been generated from one or both of the detection pulses B5 and B6 contained in the first half of the first detection mode, the probability of failure of the rotation is high, and hence, in the second half of the first detection mode, the detection pulses B7 to B12 of FIG. 36(b), that is, the pulses having a smaller width of 0.0625 ms, are output so that the electromagnetic brake acts. On the other hand, when no detection signal has been generated from the detection pulse B5 nor B6 contained in the first half of the first detection mode, the probability of success of the rotation is high, and hence, in the second half of the first detection mode, the detection pulses B7 to B12 of FIG. 36(b2), that is, the pulses having a larger width of 0.25 ms, are output so that the electromagnetic brake is suppressed.

After the shift to the second detection mode, the pulse selection circuit 7 outputs the detection pulses output from the second detection pulse generation circuit 6, and controls the stepper motor 20. The detection circuit 11 then detects induced voltages that are generated in the coil 9 by the detection pulses, and outputs a detection signal when detecting an induced voltage exceeding the threshold Vth. The second detection mode determination circuit 13 receives the detection signal of the detection circuit 11. When the detection signal has been generated twice, the second detection mode determination circuit 13 determines that the rotation has succeeded and immediately stops the detection pulses output from the second detection pulse generation circuit 6 to end the operation of the second detection mode, and further controls the pulse selection circuit 7 so as not to output the correction drive pulse FP. However, the detection of the detection signal generated by the detection pulses F7 to F14 is finished when the detection signal has been detected six times at most. If no detection signal, or only one detection signal, has been generated during the detection, it is determined that the rotation has failed and the correction drive pulse FP is output.

As described above, in the sixth embodiment, the first detection mode is divided into the first and second rotation detection periods, and the detection pulse width in the second rotation detection period is changed depending on the detection result obtained in the first rotation detection period. That is, when a detection signal has been detected in the first rotation detection period, the detection pulse width in the second rotation detection period is reduced to 0.0625 ms so that the electromagnetic brake is generated to suppress the free oscillation of the rotor 10. On the other hand, when no detection signal has been detected in the first rotation detection period, the detection pulse width in the second rotation detection period is increased to 0.25 ms so that the electromagnetic brake acts less and the free oscillation of the rotor 10 is suppressed less.

An actual method of detecting the rotation through the above-mentioned operation is described with reference to FIGS. 36 to 38. FIG. 37(a) is a waveform of a current that is induced in the coil 9 when an indicating hand having a large moment of inertia is attached, and illustrates the waveform obtained when the rotor 10 has succeeded in rotating. FIG. 37(b) is a waveform of a voltage generated at one terminal O1 of the coil 9 at this time and FIG. 37(c) is a waveform of a voltage generated at another terminal O2 of the coil 9.

First, as illustrated in FIG. 36(a), the normal drive pulse SP is applied to the terminal O1 of the coil 9 from the second, and the rotor rotates to generate a current waveform c1 illustrated in FIG. 37(a). At the time when 5 ms has elapsed from the second, the first detection mode is started, and the detection pulse B5 illustrated in FIG. 36(b) is applied to the coil 9, and after 1 ms, the detection pulse B6 is applied thereto. At this time, as illustrated in FIG. 37(a), the current waveform is in the region of a current waveform c2, in which the current value is negative, and hence, as illustrated in FIG. 37(c), the induced voltages V5 and V6 do not exceed the threshold Vth. No detection signal has been obtained in the first rotation detection period, that is, no detection signal has been obtained from the detection pulses B5 and B6, and hence, in the second rotation detection period, the detection pulses B7 to B12 illustrated in FIG. 36(b2) are selected.

At the time when 7 ms has elapsed, the current waveform is in the region of a current waveform c3 illustrated in FIG. 37(a), in which the current value is positive. Accordingly, induced voltages V7, V8, and V9 regarding the detection pulses B7, B8, and B9 illustrated in FIG. 36(b2) become detection signals exceeding the threshold Vth as illustrated in FIG. 37(c). Because the three detection signals of the induced voltages V7, V8, and V9 have exceeded the threshold Vth, the mode shifts to the second detection mode.

In this case, the detection pulses B7, B8, and B9, which are detection pulses in the first detection mode after 7 ms from the second, have a larger width of 0.25 ms, and hence the electromagnetic brake acts less and the free oscillation of the rotor 10 is suppressed less. Accordingly, the subsequent current waveform is less likely to be flattened, and the rotation of the rotor 10 is accurately detected more easily.

Then, in response to the shift to the second detection mode, after the subsequent time of 10 ms from the second, the detection pulse F10 illustrated in FIG. 36(c) is applied to the coil 9. At the times between 10 ms and 11 ms from the second, as illustrated in FIG. 37(a), the current waveform is in the region c3, in which the current value is positive. Accordingly, the induced voltages V10 and V11 obtained by the detection pulses F10 and F11 do not exceed the threshold Vth as illustrated in FIG. 37(b). When 12 ms has elapsed from the second, a region c4 appears in the current waveform as illustrated in FIG. 37(a) because, as described above, the electromagnetic brake is weakened in the first detection mode so that the free oscillation of the rotor 10 is suppressed less. This current value is negative, and hence the detection signals V12 and V13 exceeding the threshold Vth are obtained as illustrated in FIG. 37(b) with respect to the detection pulses F12 and F13 of FIG. 36(c). Accordingly, the second detection mode determination circuit 13 normally determines that the rotation has succeeded. Then, the correction drive pulse FP is not output, and when the next normal drive pulse is output, the normal drive pulse SP having the same driving power as the previous one is output.

On the other hand, the operation performed when the rotor 10 has failed to rotate is as follows. FIG. 38(a) is a waveform of a current that is induced in the coil 9 in this case when an indicating hand having a large moment of inertia is attached. FIG. 38(b) is a waveform of a voltage generated at one terminal O1 of the coil 9 at this time and FIG. 38(c) is a waveform of a voltage generated at another terminal O2 of the coil 9.

First, as illustrated in FIG. 36(a), the normal drive pulse SP is applied to the terminal O1 of the coil 9 from the second, and the current waveform c1 illustrated in FIG. 38(a) is generated. At the time when 5 ms has elapsed from the second, the first detection mode is started, and the detection pulse B5 illustrated in FIG. 36(b) is applied to the coil 9 and, after 1 ms, the detection pulse B6 is applied thereto. At this time, because the rotor 10 has failed to rotate, the current waveform c5 illustrated in FIG. 38(a) in which the current value is positive appears. Accordingly, as illustrated in FIG. 38(c), the induced voltages V5 and V6 exceed the threshold Vth. The detection signals have been obtained in the first rotation detection period, that is, the detection signals have been obtained from both the detection pulses B5 and B6, and hence, in the second rotation detection period, the detection pulses B7 to B12 illustrated in FIG. 36(b) are selected. Also from the detection pulse B7 applied subsequently at the time of 7 ms from the second, the induced voltage V7 exceeding the threshold Vth is obtained as illustrated in FIG. 38(c). Because the three detection signals have exceeded the threshold Vth, the mode shifts to the second detection mode.

In the subsequent second detection mode, the detection pulse F8 illustrated in FIG. 36(c) having a smaller width of 0.0625 ms is applied to the coil 9 at the time when 8 ms has elapsed from the second. At this time, as illustrated in FIG. 38(a), the current waveform is in the region c5, in which the current value is positive, and hence the induced voltage V8 never exceeds the threshold Vth. Subsequently, the detection pulses F9 to F13 illustrated in FIG. 36(c) are similarly applied to the coil 9 every 1 ms. At this time, throughout the first detection mode and the second detection mode, the detection pulses applied to the coil all have a smaller width of 0.0625 ms, and hence the electromagnetic brake is easily generated and the free oscillation of the rotor 10 is suppressed. Accordingly, at the time beyond the region c5 of the current waveform, the rotor 10 almost stops, and as illustrated in FIG. 38(a), does not exhibit a current value in the negative direction. Therefore, as illustrated in FIG. 38(b), the induced voltages V9 to V13 obtained from the detection pulses F9 to F13 do not exceed the threshold Vth, either.

The second detection mode is terminated because two detection signals exceeding the threshold Vth have not been obtained during the six detections by the detection pulses F8 to F13. Accordingly, the second detection mode determination circuit 13 normally determines that the rotation has failed. Then, the correction drive pulse FP is output, and when the next normal drive pulse is output, the normal drive pulse SP2 having the next higher-ranked driving power to the previous one is output from the normal drive pulse generation circuit 3. Therefore, the clock never stops.

As described above, in the sixth embodiment, the first detection mode is divided into the first and second rotation detection periods and the detection pulse width in the second rotation detection period is changed depending on the detection result obtained in the first rotation detection period, utilizing the timing difference that, when the rotor 10 has succeeded in rotating, a detection signal exceeding the threshold Vth in the first detection mode is obtained at a delayed timing, and, when the rotation has failed, a detection signal exceeding the threshold Vth in the first detection mode is obtained immediately after the normal drive pulse SP. Therefore, when the rotation has succeeded, the electromagnetic brake is weakened to suppress the increase in consumption power resulting from erroneous detection, while when the rotation has failed, the electromagnetic brake is enabled so as to prevent erroneous determination that the rotation has succeeded.

The above-mentioned operation is described with reference to a flowchart. FIG. 39 is a flowchart illustrating the method of detecting the rotation of the rotor 10 in the electronic watch according to the sixth embodiment, and illustrates the operation performed every second, on the second. The normal drive pulse SP is output at the time of the second (Step ST1), and the rotation detection in the first detection mode is started after 5 ms has elapsed since the second (Step ST2). In the first detection mode, at the times of 5.0 ms and 6.0 ms from the second, the detection pulses having a width set to 0.0625 ms are first output (Step ST3). In this case, depending on whether or not a detection signal appears at 5.0 ms or 6.0 ms, the setting of the detection pulse width in the first detection mode after 7.0 ms from the second is different (Step ST4). When a detection signal appears at the time of 5.0 ms or 6.0 ms, after 7.0 ms the detection pulses having a width of 0.0625 ms are output (Step ST5). When no detection signal appears at 5.0 ms or 6.0 ms, after 7.0 ms the detection pulses having a width of 0.25 ms are output (Step ST6). After the end of the first detection mode, the second detection mode is started (Step ST7). In the second detection mode, the detection pulse having a width set to 0.0625 ms is output (Step ST8). It is determined whether a detection signal has been detected within a predetermined period (Step ST9). When a detection signal has been detected within the predetermined period, it is determined that the rotation has succeeded. Then, the correction drive pulse FP is not output, and when the next normal drive pulse is output, the normal drive pulse SP having the same driving power as the previous one is output (Step ST10). When a detection signal has not been detected within the predetermined period, it is determined that the rotation has failed, and then the correction drive pulse FP is output and, at the same time, a normal drive pulse having the next higher-ranked driving power is output from the next second (Step ST11). This step completes the operation for the second concerned, and the operation is restarted from the beginning after waiting for the next second.

Note that the above description is illustrative of this embodiment, and various modifications are possible. For example, the time of dividing the first detection mode into the first and second rotation detection sections, the number of detection signals necessary for the first detection mode to shift to the second detection mode, and other such factors may be changed depending on an actual device to which this embodiment is to be applied. Further, in the example described above, the detection pulse width in the second half of the first detection mode is selected depending on whether or not at least one detection signal has been detected in the first half of the first detection mode. Alternatively, however, the detection pulse width in the second half of the first detection mode may be selected under the condition that the detection signals have been detected an arbitrary plurality of times in the first half of the first detection mode.

Seventh Embodiment

Change Depending on Detection Result in First Detection Mode, with Three Detection Modes Provided Next, a seventh embodiment of the present invention is described. The seventh embodiment is an example in which three detection modes, the first to third detection modes, are provided, and the detection pulse width in the second detection mode is changed in accordance with a detection result obtained in the first detection mode. This example utilizes the difference in presence or absence of the detection of a detection signal in the first detection mode executed immediately after a drive signal, between when the rotor has succeeded in rotating and when the rotor has failed to rotate. In this example, when the rotation has succeeded, the electromagnetic brake is weakened to suppress the increase in consumption power resulting from erroneous detection, while when the rotation has failed, the electromagnetic brake is enabled to prevent erroneous determination that the rotation has failed. Hereinafter, the detailed description is given with reference to the drawings.

Figure 40:
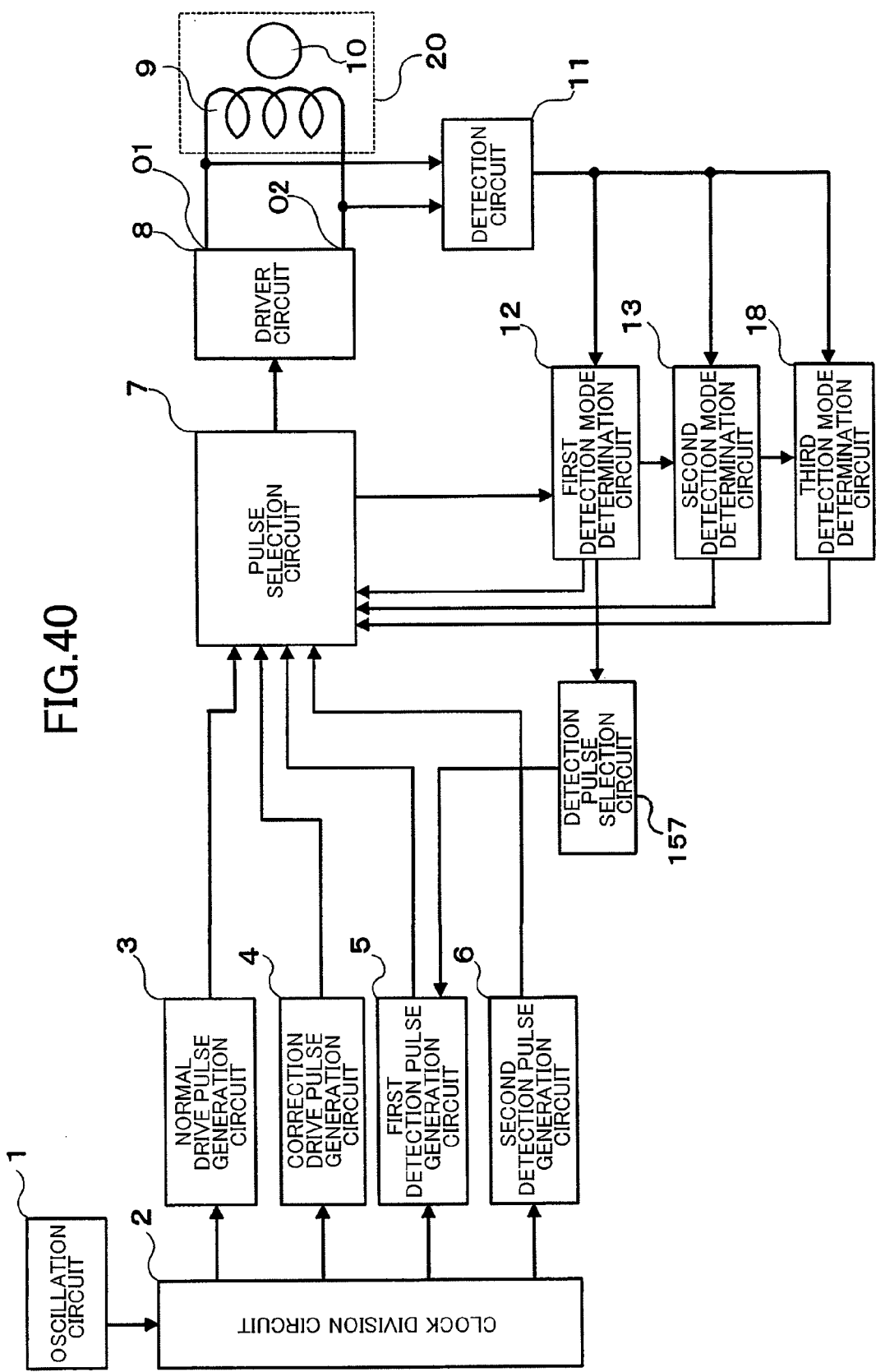
FIG. 40 is a block diagram illustrating a circuit configuration according to a seventh embodiment of the present invention.
Figure 41:
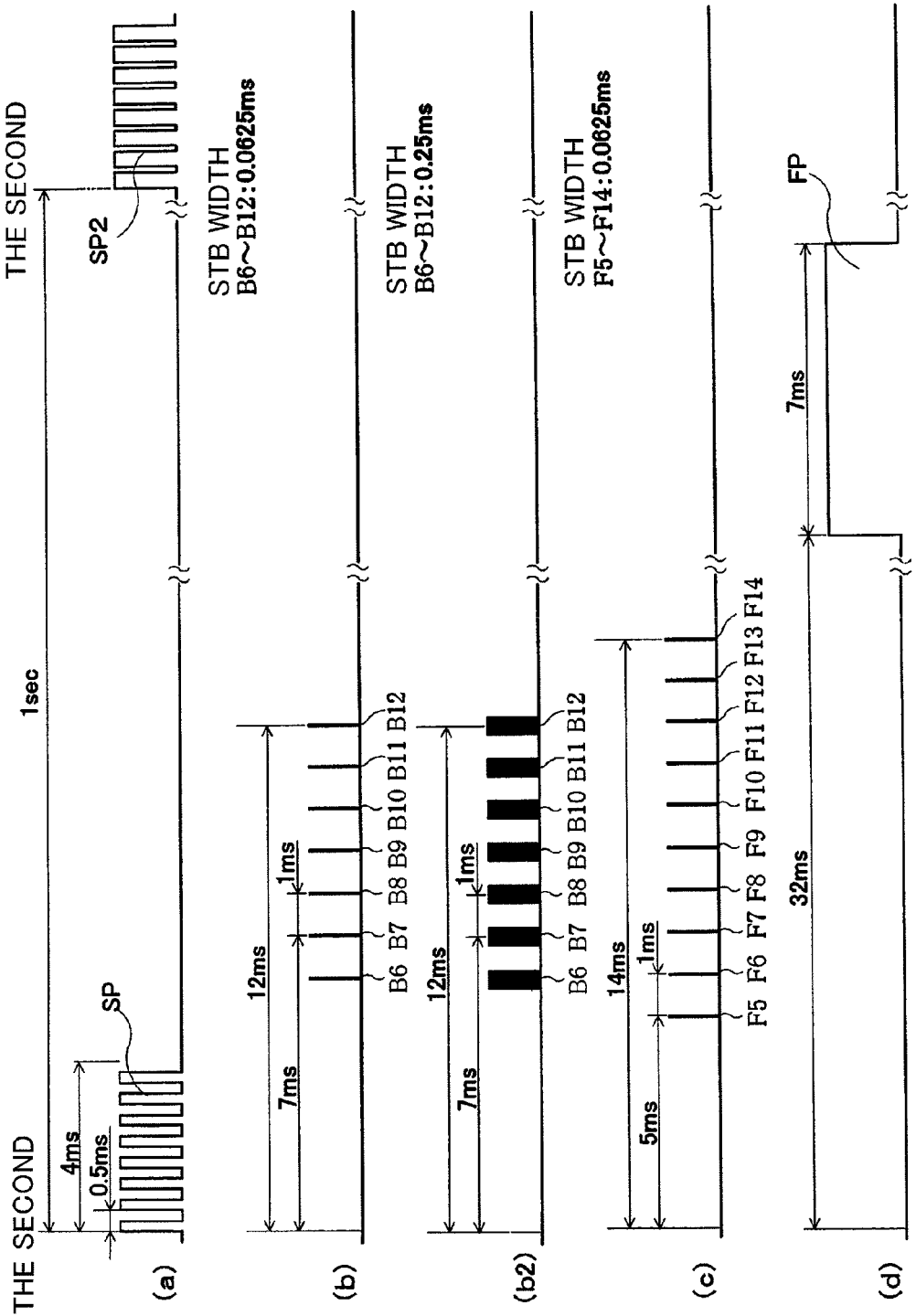
FIG. 41 are waveform diagrams of pulses that are generated by circuits of an electronic watch according to the seventh embodiment of the present invention.
Figure 44:
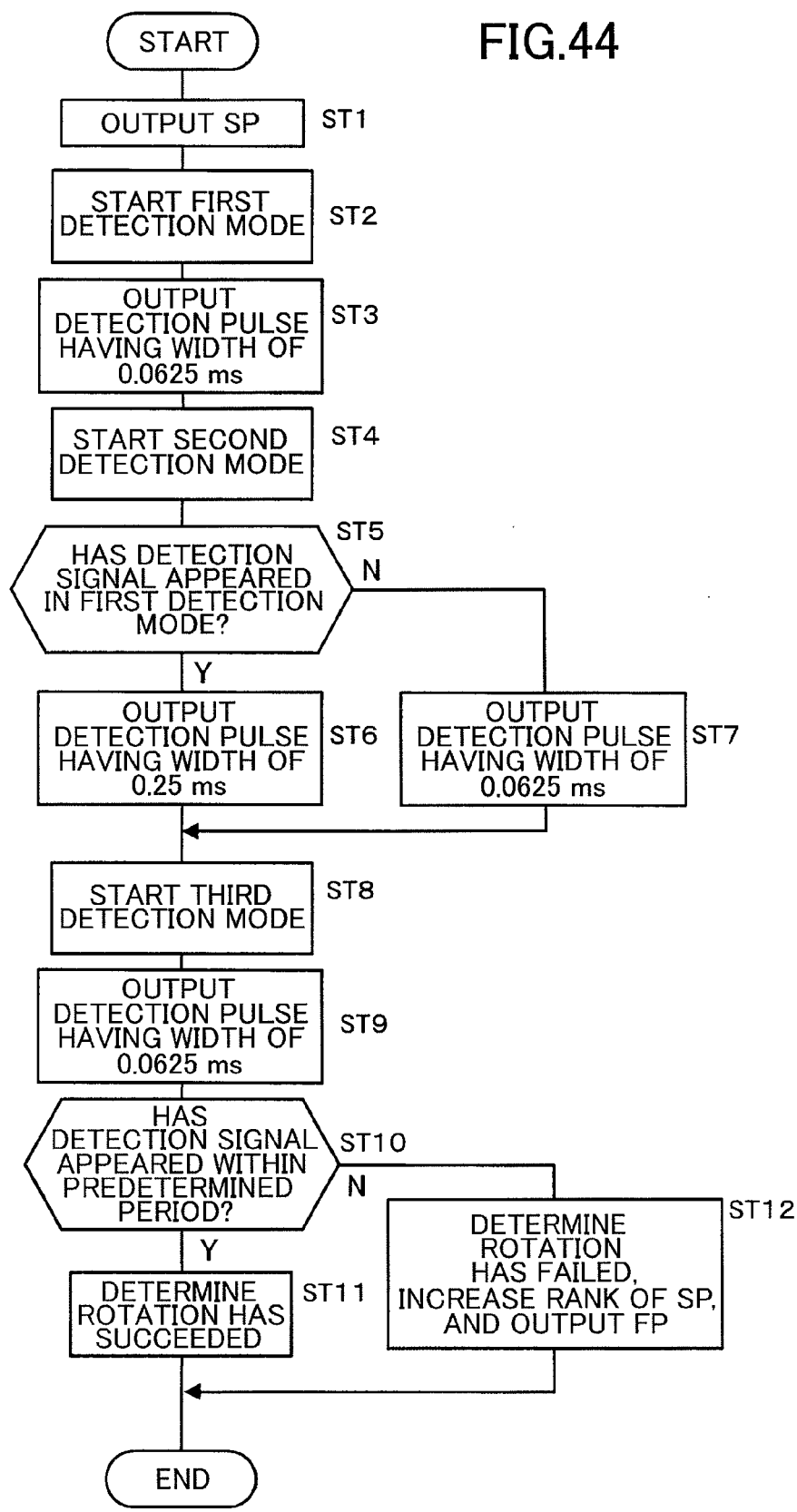
FIG. 44 is a flowchart of the electronic watch according to the seventh embodiment of the present invention.

FIG. 40 is a block diagram illustrating a circuit configuration of an electronic watch according to the seventh embodiment. FIG. 41 are waveform diagrams of pulses that are generated by circuits of the electronic watch according to the seventh embodiment. FIG. 42 are waveform diagrams of current and voltage that are generated in a coil when a rotor 10 has succeeded in rotating in the case where an indicating hand having a large moment of inertia is attached to the electronic watch according to the seventh embodiment. FIG. 43 are waveform diagrams of current and voltage that are generated in the coil when the rotor 10 has failed to rotate. FIG. 44 is a flowchart of the electronic watch according to the seventh embodiment. Note that the same components as those described in the conventional example and the first to sixth embodiments are denoted by the same numerals and further description is omitted.

In FIG. 40, reference numeral 20 denotes the stepper motor including a coil 9 and the rotor 10; 1, an oscillation circuit; 2, a clock division circuit; 3, a normal drive pulse generation circuit; 4, a correction drive pulse generation circuit; and 5, a first detection pulse generation circuit. In this embodiment, the first detection pulse generation circuit 5 outputs, based on a signal of the clock division circuit 2, detection pulses B6 to B12 for performing the second detection mode. As illustrated in FIGS. 41(b) and 41(b2), there are two kinds of the detection pulses B6 to B12, one having a width of 0.0625 ms (FIG. 41(b)) and the other having a width of 0.25 ms (FIG. 41(b2)), which are output every 1 ms from 6 ms after the second until 12 ms has elapsed since the second. Reference numeral 6 denotes a second detection pulse generation circuit. In this embodiment, the second detection pulse generation circuit 6 outputs detection pulses F5 to F14 to be used in the first detection mode and the third detection mode based on a signal of the clock division circuit 2. As illustrated in FIG. 41(c), the detection pulses F5 to F14 are pulses each having a width of 0.0625 ms and are output every 1 ms from 5 ms after the second until 14 ms has elapsed since the second.

Reference numeral 7 denotes a pulse selection circuit; 8, a driver circuit; 9, the coil; 10, the rotor; 11, a detection circuit; 12, a first detection mode determination circuit for determining the first detection mode based on a detection signal of the detection circuit 11; 13, a second detection mode determination circuit for determining the second detection mode based on a detection signal of the detection circuit 11; and 18, a third detection mode determination circuit for determining the third detection mode based on a detection signal of the detection circuit 11. In this embodiment, the first detection mode determination circuit 12 serves also as the detection pulse change factor detection circuit 140.

Reference numeral 157 denotes the detection pulse selection circuit, which selects the detection pulses having different pulse widths generated by the first detection pulse generation circuit 5 based on the output of the first detection mode determination circuit 12, and controls the first detection pulse generation circuit 5 so as to output the selected detection pulses. That is, the detection pulse selection circuit 157 is detection pulse control means for controlling the first detection pulse generation circuit 5 so that the width of the detection pulse can be changed depending on the output of the first detection mode determination circuit.

Subsequently, the operation of the above-mentioned configuration is described. The pulse selection circuit 7 selects, at the time of the second, a normal drive pulse output from the normal drive pulse generation circuit 3 and drives the stepper motor 20. After 5 ms from the second, the first detection mode is started. In the first detection mode, the pulse selection circuit 7 outputs the detection pulse F5, which is output from the first detection pulse generation circuit 6, and controls the stepper motor 20 so as to change the impedance of the coil 9. The detection circuit 11 then detects induced voltages that are generated in the coil 9 by the detection pulse F5, and outputs a detection signal when detecting an induced voltage exceeding a threshold Vth. The pulse selection circuit 7, on the other hand, instructs the first detection mode determination circuit 12 to start its determination operation. In response to the input of the detection signal from the detection circuit 11, the first detection mode determination circuit outputs a signal to the detection pulse selection circuit 157 to change the detection pulse width in the second detection mode. Irrespective of the presence or absence of the detection signal, the first detection mode ends after a predetermined number of detection pulses (one in this example) are output, and then shifts to the second detection mode.

In the second detection mode, the pulse selection circuit 7 outputs the detection pulses output from the first detection pulse generation circuit 5 and controls the stepper motor 20. The second detection mode determination circuit 13 determines the presence or absence of the detection signal in the second detection mode based on the input of the detection signal from the detection circuit 11. The second detection mode determination circuit 13 determines the detection when two detection signals have been generated from the detection circuit 11, and immediately stops the detection pulses output from the first detection pulse generation circuit 5 to notify the pulse selection circuit 7 so as to end the operation of the second detection mode and not to generate the correction drive pulse FP. The second detection mode determination circuit 13 further instructs the third detection mode determination circuit 18 to start its operation, to thereby shift to the third detection mode. However, when the detection pulses B6 to B12 have produced no detection signal at all, or only one detection signal, the second detection mode determination circuit 13 determines that the rotation has failed and ends the operation of the second detection mode. Then, without shifting to the third detection mode, the correction drive pulse FP is output, and when the next normal drive pulse is output, a normal drive pulse having the next higher-ranked driving power to the previous one is output from the normal drive pulse generation circuit 3.

Note that two kinds of the detection pulses used in the second detection mode are prepared, one having a smaller width of 0.0625 ms (FIG. 41(*b*)) and the other having a larger width of 0.25 ms (FIG. 41(*b*2)). Different detection pulses are used depending on the detection result in the first detection mode. In other words, when a detection signal has been generated from the detection pulse F5 contained in the first detection mode, the probability of success of the rotation is high, and hence, in the second detection mode, the detection pulses B6 to B12 of FIG. 41(*b*2), that is, the pulses having a larger width of 0.25 ms, are output so that the electromagnetic brake is suppressed. On the other hand, when no detection signal has been generated from the detection pulse F5 contained in the first detection mode, the probability of failure of the rotation is high, and hence, in the second detection mode, the detection pulses B6 to B12 of FIG. 41(*b*), that is, the pulses having a smaller width of 0.0625 ms, are output so that the electromagnetic brake acts.

After the shift to the third detection mode, the pulse selection circuit 7 outputs the detection pulses output from the second detection pulse generation circuit 6, and controls the stepper motor 20. The detection circuit 11 then detects induced voltages that are generated in the coil 9 by the detection pulses, and outputs a detection signal when detecting an induced voltage exceeding the threshold Vth. The third detection mode determination circuit 18 receives the detection signal of the detection circuit 11. When the detection signal has been generated twice, the third detection mode determination circuit 18 determines that the rotation has succeeded and immediately stops the detection pulses output from the second detection pulse generation circuit 6 to end the operation of the third detection mode, and further controls the pulse selection circuit 7 so as not to output the correction drive pulse FP. However, in the third detection mode, the detection of the detection signal generated by the detection pulses F6 to F14 is finished when the detection signal has been detected six times at most. If no detection signal, or only one detection signal, has been generated during the detection, it is determined that the rotation has failed and the correction drive pulse FP is output.

As described above, in the seventh embodiment, three detection modes, the first to third detection modes, are provided, and the detection pulse width in the second detection mode is changed in accordance with the detection result obtained in the first detection mode. That is, when a detection signal has been generated in the first detection mode, the detection pulse width in the second detection mode is increased to 0.25 ms so that the electromagnetic brake acts less and the free oscillation of the rotor 10 is suppressed less. On the other hand, when no detection signal has been generated in the first detection mode, the detection pulse width in the second detection mode is reduced to 0.0625 ms so that the electromagnetic brake is generated to suppress the free oscillation of the rotor 10.

An actual method of detecting the rotation through the above-mentioned operation is described with reference to FIGS. 41 to 43. FIG. 42(*a*) is a waveform of a current that is induced in the coil 9 when an indicating hand having a large moment of inertia is attached, and illustrates the waveform obtained when the rotor 10 has succeeded in rotating. FIG. 42(*b*) is a waveform of a voltage generated at one terminal O1 of the coil 9 at this time and FIG. 42(*c*) is a waveform of a voltage generated at another terminal O2 of the coil 9.

First, as illustrated in FIG. 41(*a*), the normal drive pulse SP is applied to the terminal O1 of the coil 9 from the second, and the rotor rotates to generate a current waveform c1 illustrated in FIG. 42(*a*). At the time when 5 ms has elapsed from the second, the first detection mode is started, and the detection pulse F5 illustrated in FIG. 41(*c*) is applied to the coil 9. At this time, as illustrated in FIG. 42(a), the current waveform is in the region of a current waveform c2, in which the current value is negative, and hence, as illustrated in FIG. 42(b), the induced voltage V5 exceeds the threshold Vth and a detection signal is detected. Therefore, in the subsequent second detection mode, the detection pulses B6 to B12 illustrated in FIG. 41(b2) are selected.

At the subsequent time when 6 ms has elapsed from the second, the detection pulse B6 illustrated in FIG. 41(b2) is applied to the coil 9. At this time, as illustrated in FIG. 42(a), the current waveform is still in the region c2, in which the current value is negative, and hence the induced voltage V6 illustrated in FIG. 42(c) does not exceed the threshold Vth.

At the time when 7 ms has elapsed, the current waveform is in the region of a current waveform c3 illustrated in FIG. 42(a), in which the current value is positive. Accordingly, induced voltages V7 and V8 regarding the detection pulses B7 and B8 illustrated in FIG. 41(b) become detection signals exceeding the threshold Vth as illustrated in FIG. 42(c). Because the two detection signals of the induced voltages V7 and V8 have exceeded the threshold Vth, the mode shifts to the third detection mode.

In this case, the detection pulses B6, B7, and B8, which are detection pulses in the second detection mode after 7 ms from the second, have a larger width of 0.25 ms, and hence the electromagnetic brake acts less and the free oscillation of the rotor 10 is suppressed less. Accordingly, the subsequent current waveform is less likely to be flattened, and the rotation of the rotor 10 is accurately detected more easily.

Then, in response to the shift to the third detection mode, at the subsequent time of 9 ms from the second, the detection pulse F9 illustrated in FIG. 41(c) is applied to the coil 9. At the times between 9 ms and 11 ms from the second, as illustrated in FIG. 42(a), the current waveform is in the region c3, in which the current value is positive. Accordingly, the induced voltage V9 obtained by the detection pulse F9 does not exceed the threshold Vth as illustrated in FIG. 42(b). The same applies to the detection pulses F10 and F11. When 12 ms has elapsed from the second, a region c4 appears in the current waveform as illustrated in FIG. 42(a) because, as described above, the electromagnetic brake is weakened in the second detection mode so that the free oscillation of the rotor 10 is suppressed less. This current value is negative, and hence the detection signals V12 and V13 exceeding the threshold Vth are obtained with respect to the detection pulses F12 and F13 of FIG. 41(c). Accordingly, the second detection mode determination circuit 13 normally determines that the rotation has succeeded. Then, the correction drive pulse FP is not output, and when the next normal drive pulse is output, the normal drive pulse SP having the same driving power as the previous one is output.

On the other hand, the operation performed when the rotor 10 has failed to rotate is as follows. FIG. 43(a) is a waveform of a current that is induced in the coil 9 in this case when an indicating hand having a large moment of inertia is attached. FIG. 43(b) is a waveform of a voltage generated at one terminal O1 of the coil 9 at this time and FIG. 43(c) is a waveform of a voltage generated at another terminal O2 of the coil 9.

First, as illustrated in FIG. 41(a), the normal drive pulse SP is applied to the terminal O1 of the coil 9 from the second, and the current waveform c1 illustrated in FIG. 43(a) is generated. At the time when 5 ms has elapsed from the second, the first detection mode is started, and the detection pulse F5 illustrated in FIG. 41(c) is applied to the coil 9. At this time, because the rotor 10 has failed to rotate, the current waveform c5 illustrated in FIG. 43(a) in which the current value is positive appears. Accordingly, as illustrated in FIG. 43(b), the induced voltage V5 does not exceed the threshold Vth. No detection signal has been generated in the first detection mode, and hence, in the subsequent second detection mode, the detection pulses B6 to B12 illustrated in FIG. 41(b) are selected.

After the shift to the second detection mode, at the subsequent time when 6 ms has elapsed from the second, the detection pulse B6 illustrated in FIG. 41(b) is applied to the coil 9 and subsequently the detection pulse B7 is applied thereto. At this time, as illustrated in FIG. 43(a), the current waveform is still in the region c5, in which the current value is positive, and hence the induced voltages V6 and V7 illustrated in FIG. 43(c) exceed the threshold Vth. Because the two detection signals of the induced voltages V6 and V7 have exceeded the threshold Vth, the mode shifts to the third detection mode.

In the subsequent third detection mode, the detection pulse F8 illustrated in FIG. 43(b) is applied to the coil 9 at the time when 8 ms has elapsed from the second. At this time, as illustrated in FIG. 43(a), the current waveform is in the region c5, in which the current value is positive, and hence the induced voltage V8 never exceeds the threshold Vth. Subsequently, the detection pulses F9 to F13 illustrated in FIG. 41(c) are similarly applied to the coil 9 every 1 ms. At this time, throughout the first detection mode to the third detection mode, the detection pulses applied to the coil all have a smaller width of 0.0625 ms, and hence the electromagnetic brake is easily generated and the free oscillation of the rotor 10 is suppressed. Accordingly, at the time beyond the region c5 of the current waveform, the rotor 10 almost stops, and as illustrated in FIG. 43(a), does not exhibit a current value in the negative direction. Therefore, as illustrated in FIG. 43(b), the induced voltages V9 to V13 obtained from the detection pulses F9 to F13 do not exceed the threshold Vth, either.

The third detection mode is terminated because two detection signals exceeding the threshold Vth have not been obtained during the six detections by the detection pulses F8 to F13. Accordingly, the third detection mode determination circuit 18 normally determines that the rotation has failed. Then, the correction drive pulse FP is output, and when the next normal drive pulse is output, the normal drive pulse SP2 having the next higher-ranked driving power to the previous one is output from the normal drive pulse generation circuit 3. Therefore, the clock never stops.

As described above, the seventh embodiment utilizes the difference that, when the rotor 10 has succeeded in rotating, a detection signal exceeding the threshold Vth is obtained in the first detection mode executed immediately after the normal drive pulse SP, but when the rotation has failed, a detection signal exceeding the threshold Vth is not obtained in the first detection mode. Therefore, when the rotation has succeeded, the electromagnetic brake is weakened to suppress the increase in consumption power resulting from erroneous detection, while when the rotation has failed, the electromagnetic brake is enabled so as to prevent erroneous determination that the rotation has succeeded.

The above-mentioned operation is described with reference to a flowchart. FIG. 44 is a flowchart illustrating the method of detecting the rotation of the rotor 10 in the electronic watch according to the seventh embodiment, and illustrates the operation performed every second, on the second. The normal drive pulse SP is output at the time of the second (Step ST1), and the rotation detection in the first detection mode is started after 5 ms has elapsed since the second (Step ST2). In the first detection mode, the detection pulse having a width set to 0.0625 ms is output (Step ST3). After the end of the first detection mode, the second detection mode is started (Step ST4). In this case, depending on whether or not a detection signal has appeared in the first detection mode, the setting of the detection pulse width in the second detection mode is different (Step ST5). When a detection signal has appeared in the first detection mode, the detection pulse having a width of 0.25 ms is output in the second detection mode (Step ST6). When no detection signal has appeared in the first detection mode, the detection pulse having a width of 0.0625 ms is output in the second detection mode (Step ST7). After the end of the second detection mode, the third detection mode is started (Step ST8). In the third detection mode, the detection pulse having a width set to 0.0625 ms is output (Step ST9). It is determined whether a detection signal has been detected within a predetermined period (Step ST10). When a detection signal has been detected, it is determined that the rotation has succeeded. Then, the correction drive pulse FP is not output, and when the next normal drive pulse is output, the normal drive pulse SP having the same driving power as the previous one is output (Step ST11). When a detection signal has not been detected, it is determined that the rotation has failed, and then, the correction drive pulse FP is output, and at the same time, a normal drive pulse having the next higher-ranked driving power is output from the next second (Step ST12). This step completes the operation for the second concerned, and the operation is restarted from the beginning after waiting for the next second.

Note that the above description is illustrative of this embodiment, and various modifications are possible. For example, the number of detection pulses executed in the first detection mode is not limited to one, and may be plural. In this case, the conditions for changing the detection pulse width in the second detection mode may be set as appropriate. For example, the conditions may include whether a predetermined number of detection signals are obtained with respect to a plurality of detection pulses and whether a predetermined number of detection signals are obtained with respect to all detection pulses.

Eighth Embodiment

Output of Dummy Pulses Depending on Detection Result in First Half of First Detection Mode Next, an eighth embodiment of the present invention is described. The eighth embodiment is an example in which the first detection mode is divided into the first half and the second half and dummy pulses are output depending on a detection result obtained in the first half. The dummy pulse as used herein refers to a detection pulse which is used to set the state of the closed loop including the coil to the high impedance state similarly to a normal detection pulse but whose induced voltage that is induced in the coil thereby is not used as a detection signal. Similarly to the second, fifth, and sixth embodiments, this example utilizes the fact that a detection signal in the first detection mode is detected at different times between when the rotation has succeeded and when the rotation has failed. In this example, when the rotation has succeeded, the electromagnetic brake is weakened to suppress the increase in consumption power resulting from erroneous detection, while when the rotation has failed, erroneous determination that the rotation has failed is prevented owing to the electromagnetic brake. Hereinafter, the detailed description is given with reference to the drawings.

Figure 45:
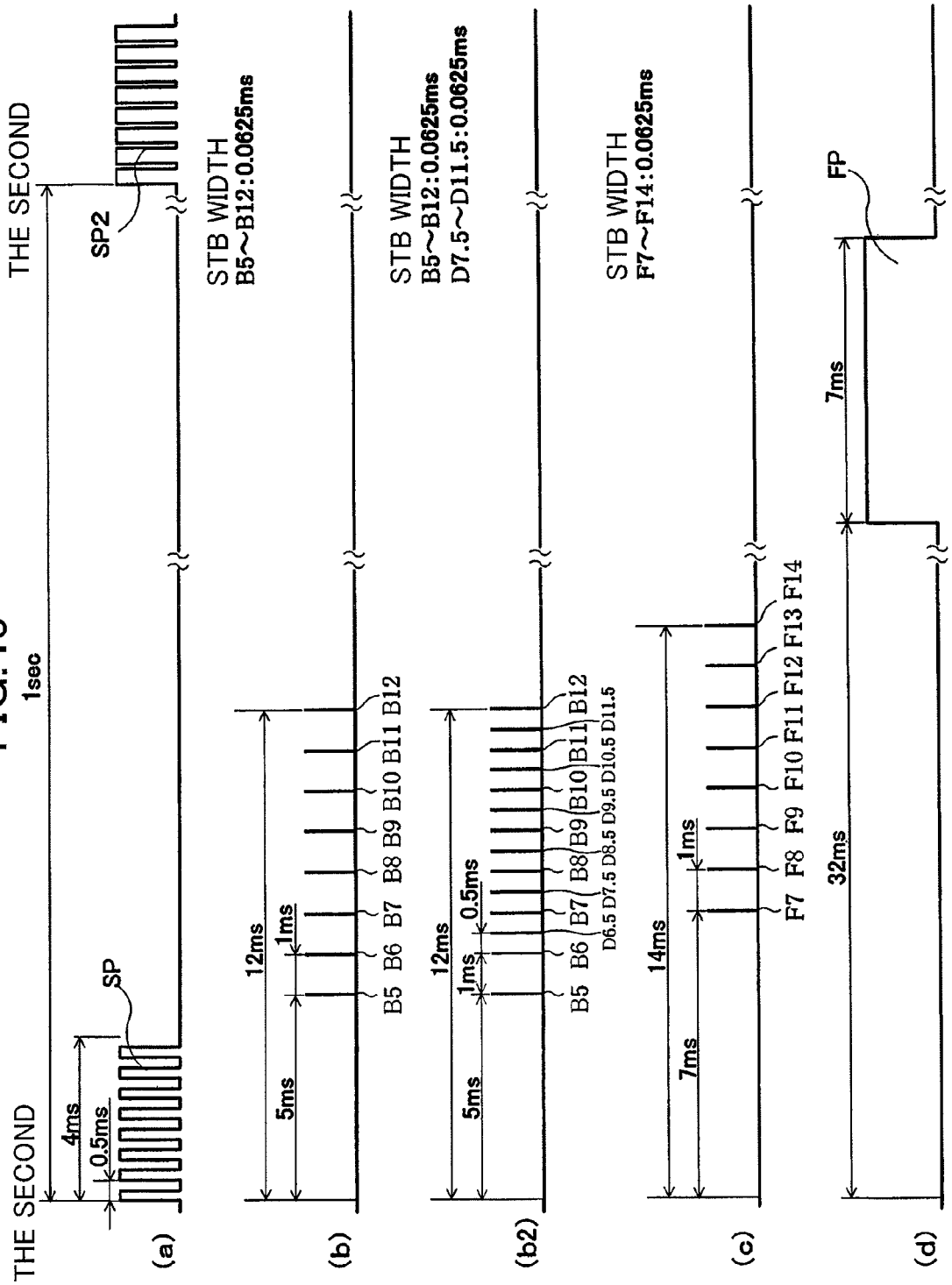
FIG. 45 are waveform diagrams of pulses that are generated by circuits of the electronic watch according to the eighth embodiment of the present invention.
Figure 47:
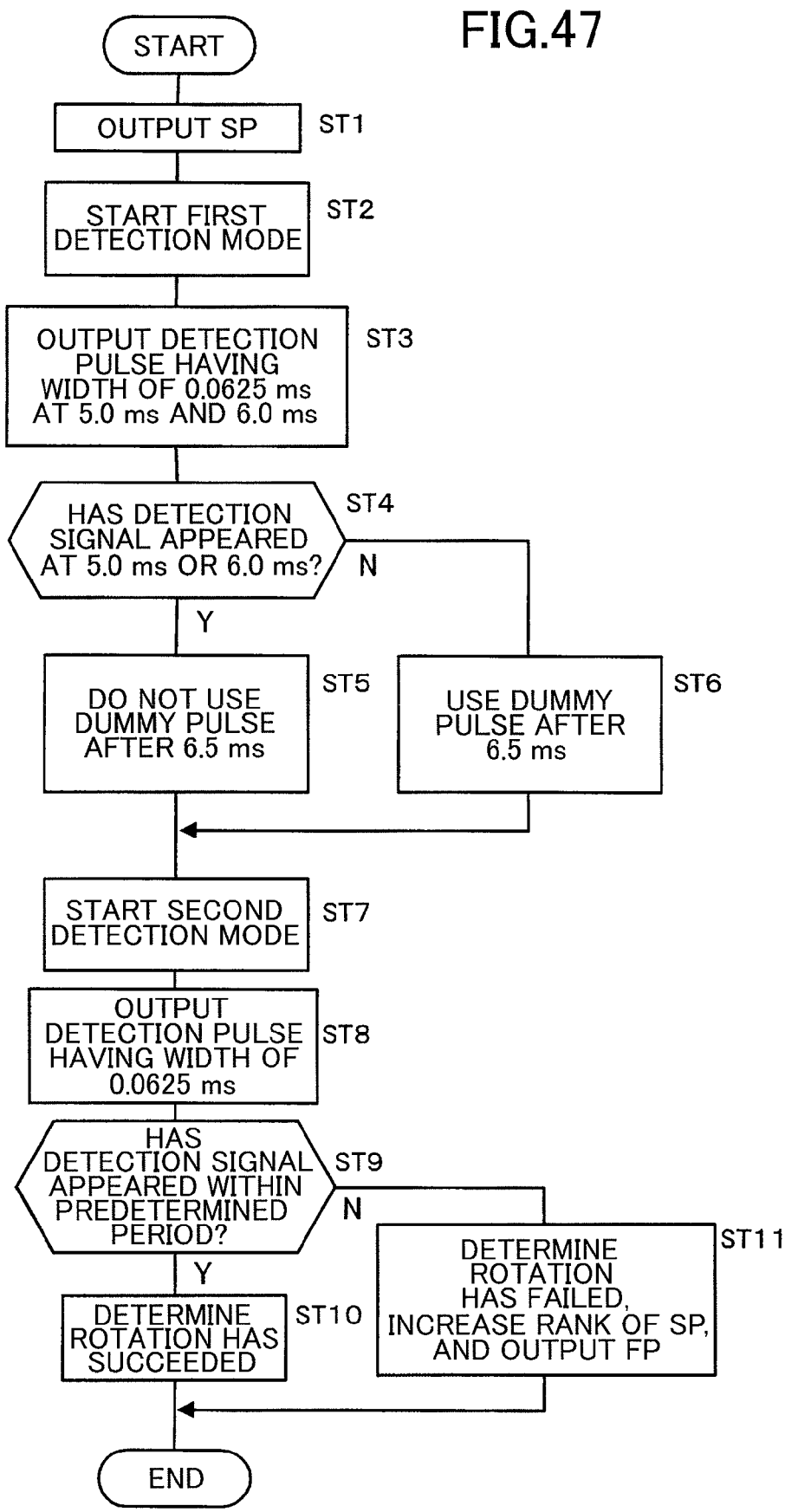
FIG. 47 is a flowchart of the electronic watch according to the eighth embodiment of the present invention.

The block diagram illustrating a circuit configuration of an electronic watch according to the eighth embodiment is the same as FIG. 35 corresponding to the block diagram illustrating the circuit configuration of the electronic watch according to the sixth embodiment, and hence FIG. 35 is referred to in the following. FIG. 45 are waveform diagrams of pulses that are generated by circuits of the electronic watch according to the eighth embodiment. FIG. 46 are waveform diagrams of current and voltage that are generated in a coil when a rotor 10 has succeeded in rotating in the case where an indicating hand having a large moment of inertia is attached to the electronic watch according to the eighth embodiment. FIG. 47 is a flowchart of the electronic watch according to the eighth embodiment. Note that the same components as those described in the conventional example and the first to seventh embodiments are denoted by the same numerals and further description is omitted.

A description regarding FIG. 35 is the same as that in the sixth embodiment. Refer to the sixth embodiment for overlapping parts. This embodiment is different from the sixth embodiment in that there are two kinds of the detection pulses generated by the first detection pulse generation circuit, as illustrated in FIGS. 45(b) and 45(b2), one containing dummy pulses D6.5 to D11.5 (FIG. 45(b2)) and the other not containing dummy pulses (FIG. 45(b)). The dummy pulses D6.5 to D11.5 are output every 1 ms from 6.5 ms after the second until 11.5 ms has elapsed since the second. Also in this embodiment, the first detection mode determination circuit 12 serves also as the detection pulse change factor detection circuit 140.

The detection pulse selection circuit 156 selects the presence or absence of outputs of the dummy pulses generated by the first detection pulse generation circuit 5 based on the output of the first detection mode determination circuit 12, and controls the first detection pulse generation circuit 5. That is, the detection pulse selection circuit 156 is detection pulse control means for controlling the first detection pulse generation circuit 5 so that the presence or absence of outputs of the dummy pulses can be changed based on the output of the first detection mode determination circuit. Considering that the dummy pulse is output between normal detection pulses, it can also be said that the detection pulse selection circuit 156 is detection pulse control means for controlling the frequency of the detection pulses generated from the first detection pulse generation circuit 5 based on the output of the first detection mode determination circuit.

Subsequently, the operation of the above-mentioned configuration is described. The pulse selection circuit 7 selects, at the time of the second, a normal drive pulse output from the normal drive pulse generation circuit 3 and drives the stepper motor 20. After 5 ms from the second, the first detection mode is started. In the first detection mode, the pulse selection circuit 7 outputs the detection pulses, which are output from the first detection pulse generation circuit 5, and controls the stepper motor 20 so as to change the impedance of the coil 9. The detection circuit 11 then detects induced voltages that are generated in the coil 9 by the detection pulses B5 to B12, and outputs a detection signal when detecting an induced voltage exceeding a threshold Vth. The pulse selection circuit 7, on the other hand, instructs the first detection mode determination circuit 12 to start its determination operation. The first detection mode determination circuit 12 determines the presence or absence of the detection signal in the first detection mode based on the input of the detection signal from the detection circuit 11. When the detection signal has been generated from the detection circuit 11 three times, the first detection mode determination circuit 12 determines the detection and immediately stops the detection pulses output from the first detection pulse generation circuit 5 to notify the pulse selection circuit 7 so as to end the operation of the first detection mode and not to generate a correction drive pulse FP. The first detection mode determination circuit 12 further instructs the second detection mode determination circuit 13 to start its operation, to thereby shift to the second detection mode. However, when the detection pulses B5 to B12 have produced no detection signal at all, or only one or two detection signals, the first detection mode determination circuit 12 determines that the rotation has failed and ends the operation of the first detection mode. Then, without shifting to the second detection mode, the correction drive pulse FP is output, and when the next normal drive pulse is output, a normal drive pulse having the next higher-ranked driving power to the previous one is output from the normal drive pulse generation circuit 3.

Note that the first detection mode is sectioned into the first half containing the detection pulses B5 and B6 and the second half containing the other pulses, and the method of detecting the detection signal in the second half of the first detection mode is different depending on the detection result in the first half of the first detection mode. In other words, when a detection signal has been generated from one or both of the detection pulses B5 and B6 contained in the first half of the first detection mode, the probability of failure of the rotation is high, and hence, in the second half of the first detection mode, no dummy pulse is output, as illustrated in FIG. 45(b). As a result, only the pulses B7 to B12, which have a smaller width of 0.0625 ms and are used for the detection by the detection circuit 11, are output so that the electromagnetic brake acts. On the other hand, when no detection signal has been generated from the detection pulse B5 nor B6 contained in the first half of the first detection mode, the probability of success of the rotation is high, and hence, in the second half of the first detection mode, the dummy pulses D6.5 to D11.5 of FIG. 45(b2) are output. As a result, because the dummy pulses D6.5 to D11.5, in addition to the normal detection pulses B7 to B12, are output, the ratio of time during which the closed loop including the coil 9 is set to the high impedance state is lengthened and the electromagnetic brake is suppressed. Note that in this embodiment, the dummy pulses D6.5 to D11.5 are pulses each having a width of 0.0625 ms, similarly to the normal detection pulses B7 to B12.

After the shift to the second detection mode, the pulse selection circuit 7 outputs the detection pulses output from the second detection pulse generation circuit 6, and controls the stepper motor 20. The detection circuit 11 then detects induced voltages that are generated in the coil 9 by the detection pulses, and outputs a detection signal when detecting an induced voltage exceeding the threshold Vth. The second detection mode determination circuit 13 receives the detection signal of the detection circuit 11. When the detection signal has been generated twice, the second detection mode determination circuit 13 determines that the rotation has succeeded and immediately stops the detection pulses output from the second detection pulse generation circuit 6 to end the operation of the second detection mode, and further controls the pulse selection circuit 7 so as not to output the correction drive pulse FP. However, the detection of the detection signals generated by the detection pulses F7 to F14 is finished when the detection signal has been detected six times at most. If no detection signal or only one detection signal is generated during the detection, it is determined that the rotation has failed and the correction drive pulse FP is output.

As described above, in the eighth embodiment, the first detection mode is divided into the first and second rotation detection periods, and the presence or absence of outputs of the dummy pulses in the second rotation detection period is changed depending on the detection result obtained in the first rotation detection period. That is, when a detection signal has been generated in the first rotation detection period, no dummy pulse is generated in the second rotation detection period so that the electromagnetic brake acts to suppress the free oscillation of the rotor 10. On the other hand, when no detection signal has been generated in the first rotation detection period, the dummy pulses are generated in the second rotation detection period so that the electromagnetic brake acts less and the free oscillation of the rotor 10 is suppressed less.

An actual method of detecting the rotation through the above-mentioned operation is described with reference to FIGS. 45, 46, and 38. FIG. 46(a) is a waveform of a current that is induced in the coil 9 when an indicating hand having a large moment of inertia is attached, and illustrates the waveform obtained when the rotor 10 has succeeded in rotating. FIG. 46(b) is a waveform of a voltage generated at one terminal O1 of the coil 9 at this time and FIG. 46(c) is a waveform of a voltage generated at another terminal O2 of the coil 9.

First, as illustrated in FIG. 45(a), the normal drive pulse SP is applied to the terminal O1 of the coil 9 from the second, and the rotor rotates to generate a current waveform c1 illustrated in FIG. 46(a). At the time when 5 ms has elapsed from the second, the first detection mode is started, and the detection pulse B5 illustrated in FIG. 45(b) is applied to the coil 9 and, after 1 ms, the detection pulse B6 is applied thereto. At this time, as illustrated in FIG. 46(a), the current waveform is in the region of a current waveform c2, in which the current value is negative, and hence, as illustrated in FIG. 46(c), the induced voltages V5 and V6 do not exceed the threshold Vth. No detection signal has been obtained in the first rotation detection period, that is, no detection signal has been obtained from the detection pulses B5 and B6, and hence, in the second rotation detection period, the detection pulses B7 to B12 containing the dummy pulses D6.5 to D11.5 illustrated in FIG. 45(b2) are selected.

Then, at the time when 7 ms has elapsed, the current waveform is in the region of a current waveform c3 illustrated in FIG. 46(a), in which the current value is positive. Accordingly, induced voltages V7, V8, and V9 regarding the detection pulses B7, B8, and B9 illustrated in FIG. 45(b2) become detection signals exceeding the threshold Vth as illustrated in FIG. 46(c). Because the three detection signals of the induced voltages V7, V8, and V9 have exceeded the threshold Vth, the mode shifts to the second detection mode. In this case, in the first detection mode after 6.5 ms from the second, the dummy pulses D6.5 to D8.5 are output, and hence the electromagnetic brake acts less and the free oscillation of the rotor 10 is suppressed less. Accordingly, the subsequent current waveform is less flattened so that the rotation of the rotor 10 is accurately detected more easily. Note that induced voltages obtained by the dummy pulses D6.5 to D8.5 are not used as detection targets of detection signals of the detection circuit 11, and hence, in FIG. 46(c), the induced voltages are indicated by broken lines for discrimination from the induced voltages used as detection targets.

Then, in response to the shift to the second detection mode, after the subsequent time of 10 ms from the second, the detection pulse F10 illustrated in FIG. 45(c) is applied to the coil 9. At the times between 10 ms and 11 ms from the second, as illustrated in FIG. 46(a), the current waveform is in the region c3, in which the current value is positive. Accordingly, the induced voltages V10 and V11 obtained by the detection pulses F10 and F11 do not exceed the threshold Vth as illustrated in FIG. 46(b). When 12 ms has elapsed from the second, a region c4 appears in the current waveform as illustrated in FIG. 46(a) because, as described above, the electromagnetic brake is weakened in the first detection mode so that the free oscillation of the rotor 10 is suppressed less. This current value is negative, and hence the detection signals V12 and V13 exceeding the threshold Vth are obtained with respect to the detection pulses F12 and F13 of FIG. 45(*c*) as illustrated in FIG. 46(*b*). Accordingly, the second detection mode determination circuit 13 normally determines that the rotation has succeeded. Then, the correction drive pulse FP is not output, and when the next normal drive pulse is output, the normal drive pulse SP having the same driving power as the previous one is output.

On the other hand, the operation performed when the rotor 10 has failed to rotate is as follows. In the eighth embodiment, waveform diagrams of current and voltage that are generated in the coil when the rotor 10 has failed to rotate are the same as FIG. 38 corresponding to the waveform diagrams of current and voltage that are generated in the coil when the rotor 10 has failed to rotate in the sixth embodiment, and hence FIG. 38 are referred to in the following description. FIG. 38(*a*) is a waveform of a current that is induced in the coil 9 in this case when an indicating hand having a large moment of inertia is attached. FIG. 38(*b*) is a waveform of a voltage generated at one terminal O1 of the coil 9 at this time and FIG. 38(*c*) is a waveform of a voltage generated at another terminal O2 of the coil 9.

First, as illustrated in FIG. 45(*a*), the normal drive pulse SP is applied to the terminal O1 of the coil 9 from the second, and the current waveform c1 illustrated in FIG. 38(*a*) is generated. At the time when 5 ms has elapsed from the second, the first detection mode is started, and the detection pulse B5 illustrated in FIG. 45(*b*) is applied to the coil 9 and, after 1 ms, the detection pulse B6 is applied thereto. At this time, because the rotor 10 has failed to rotate, the current waveform c5 illustrated in FIG. 38(*a*) in which the current value is positive appears. Accordingly, as illustrated in FIG. 38(*c*), the induced voltages V5 and V6 exceed the threshold Vth. The detection signals have been obtained in the first rotation detection period, that is, the detection signals have been obtained from both the detection pulses B5 and B6, and hence, in the second rotation detection period, the detection pulses B7 to B12 illustrated in FIG. 45(*b*) are selected and no dummy pulse is output. Also using the detection pulse B7 subsequently applied at the time of 7 ms from the second, the induced voltage V7 exceeding the threshold Vth is obtained as illustrated in FIG. 38(*c*). Because the three detection signals have exceeded the threshold Vth, the mode shifts to the second detection mode.

In the subsequent second detection mode, the detection pulse F8 illustrated in FIG. 45(*c*) is applied to the coil 9 at the time when 8 ms has elapsed from the second. At this time, as illustrated in FIG. 38(*a*), the current waveform is in the region c5, in which the current value is positive, and hence the induced voltage V8 never exceeds the threshold Vth. Subsequently, the detection pulses F9 to F13 illustrated in FIG. 45(*c*) are similarly applied to the coil 9 every 1 ms. At this time, throughout the first detection mode and the second detection mode, the detection pulses applied to the coil all have a smaller width of 0.0625 ms and no dummy pulse is output, and hence the electromagnetic brake is easily generated and the free oscillation of the rotor 10 is suppressed. Accordingly, at the time beyond the region c5 of the current waveform, the rotor 10 almost stops, and as illustrated in FIG. 38(*a*), does not exhibit a current value in the negative direction. Therefore, as illustrated in FIG. 38(*b*), the induced voltages V9 to V13 obtained from the detection pulses F9 to F13 do not exceed the threshold Vth, either.

The second detection mode is terminated because two detection signals exceeding the threshold Vth have not been obtained during the six detections by the detection pulses F8 to F13. Accordingly, the second detection mode determination circuit 13 normally determines that the rotation has failed. Then, the correction drive pulse FP is output, and when the next normal drive pulse is output, the normal drive pulse SP2 having the next higher-ranked driving power to the previous one is output from the normal drive pulse generation circuit 3. Therefore, the clock never stops.

As described above, in the eighth embodiment, the first detection mode is divided into the first and second rotation detection periods and the presence or absence of outputs of the dummy pulses in the second rotation detection period is changed depending on the detection result obtained in the first rotation detection period, utilizing the timing difference that, when the rotor 10 has succeeded in rotating, a detection signal exceeding the threshold Vth in the first detection mode is obtained at a delayed time, and, when the rotation has failed, a detection signal exceeding the threshold Vth in the first detection mode is obtained immediately after the normal drive pulse SP. Therefore, when the rotation has succeeded, the electromagnetic brake is weakened to suppress the increase in consumption power resulting from erroneous detection, while when the rotation has failed, the electromagnetic brake is enabled so as to prevent erroneous determination that the rotation has succeeded.

The above-mentioned operation is described with reference to a flowchart. FIG. 47 is a flowchart illustrating the method of detecting the rotation of the rotor 10 in the electronic watch according to the eighth embodiment, and illustrates the operation performed every second, on the second. The normal drive pulse SP is output at the time of the second (Step ST1), and the rotation detection in the first detection mode is started after 5 ms has elapsed since the second (Step ST2). In the first detection mode, at the times of 5.0 ms and 6.0 ms from the second, the detection pulses having a width of 0.0625 ms are output (Step ST3). In this case, depending on whether or not a detection signal appears at 5.0 ms or 6.0 ms, the setting of whether to use dummy pulses in the first detection mode after 6.5 ms is different (Step ST4). When a detection signal appears at the time of 5.0 ms or 6.0 ms, no dummy pulse is output after 6.5 ms, and only the detection pulses are output (Step ST5). When no detection signal appears at the time of 5.0 ms or 6.0 ms, after 6.5 ms, the dummy pulses are output as well as the detection pulses (Step ST6). After the end of the first detection mode, the second detection mode is started (Step ST7). In the second detection mode, the detection pulse having a width of 0.0625 ms is output (Step ST8). It is determined whether a detection signal has been detected within a predetermined period (Step ST9). When a detection signal has been detected, it is determined that the rotation has succeeded. Then, the correction drive pulse FP is not output, and when the next normal drive pulse is output, the normal drive pulse SP having the same driving power as the previous one is output (Step ST10). When a detection signal has not been detected within the predetermined period, it is determined that the rotation has failed, and then, the correction drive pulse FP is output, and at the same time, a normal drive pulse having the next higher-ranked driving power is output from the next second (Step ST11). This step completes the operation for the second concerned, and the operation is restarted from the beginning after waiting for the next second.

Note that the above description is illustrative of this embodiment, and various modifications are possible. In particular, there is no problem if the frequency and timing of outputting the dummy pulse and the width of the dummy pulse are different from those in this example. For example, in the example described above, one dummy pulse is output with respect to one normal detection pulse after 0.5 ms from the output of the normal detection pulse, but two or more dummy pulses may be output with respect to one normal detection pulse at arbitrary timings. Further, the width of the dummy pulse may be different from that of the normal detection pulse. In addition, of course, the same modifications as described in the sixth embodiment may be made.

Ninth Embodiment

Change Depending on Detection Result in First Half of First Detection Mode

Next, a ninth embodiment of the present invention is described. The ninth embodiment is an example in which the first detection mode is divided into the first half and the second half, and depending on a detection result obtained in the first half, dummy pulses are output after the detection of a detection signal in the first detection mode. Similarly to the second, fifth, sixth, and eighth embodiments, this example utilizes the fact that a detection signal in the first detection mode is detected at different times between when the rotation has succeeded and when the rotation has failed. In this example, when the rotation has succeeded, the electromagnetic brake is weakened to suppress the increase in consumption power resulting from erroneous detection, while when the rotation has failed, erroneous determination that the rotation has succeeded is prevented owing to the electromagnetic brake. Hereinafter, the detailed description is given with reference to the drawings.

Figure 48:
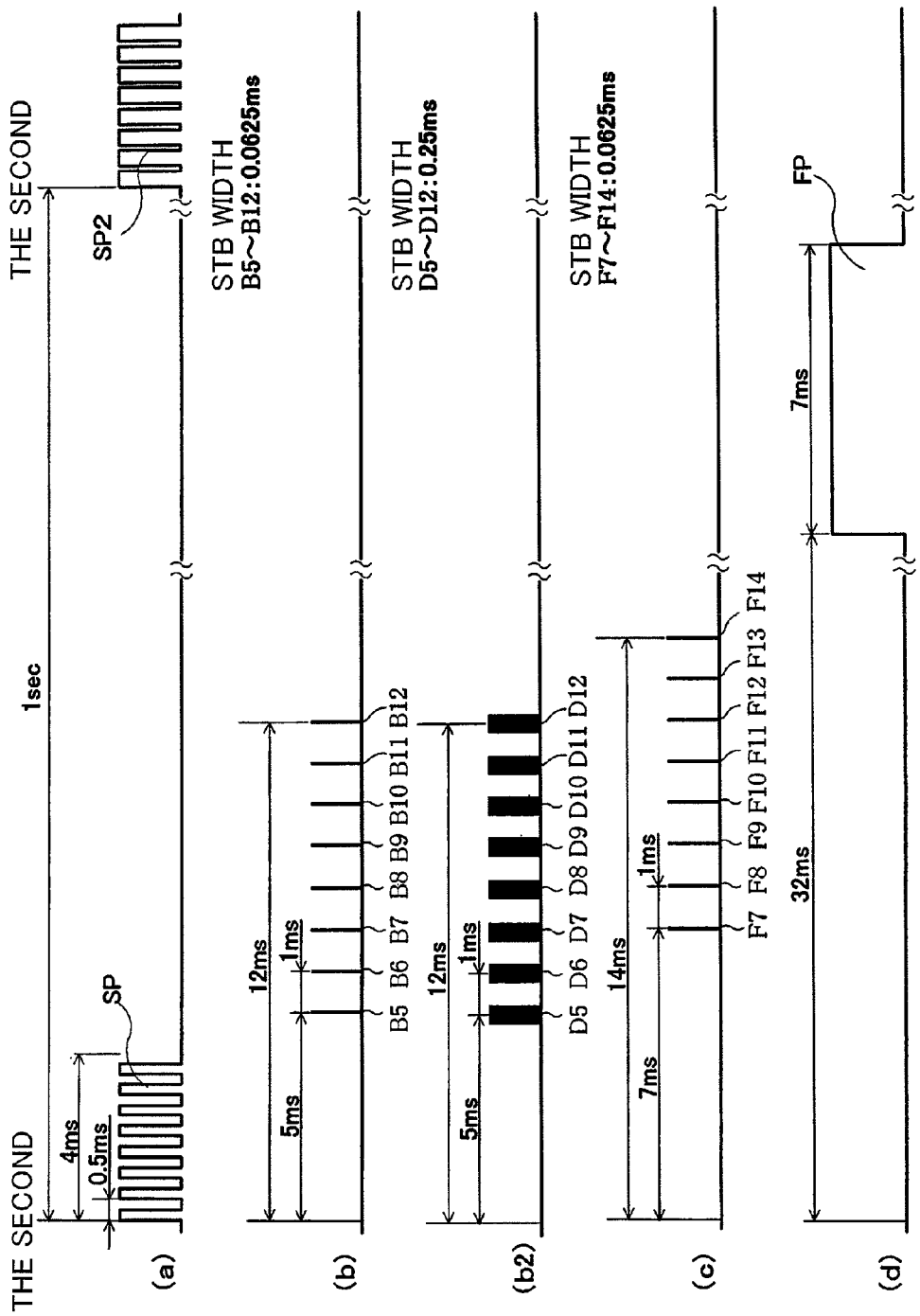
FIG. 48 are waveform diagrams of pulses that are generated by circuits of the electronic watch according to the ninth embodiment of the present invention.
Figure 50:
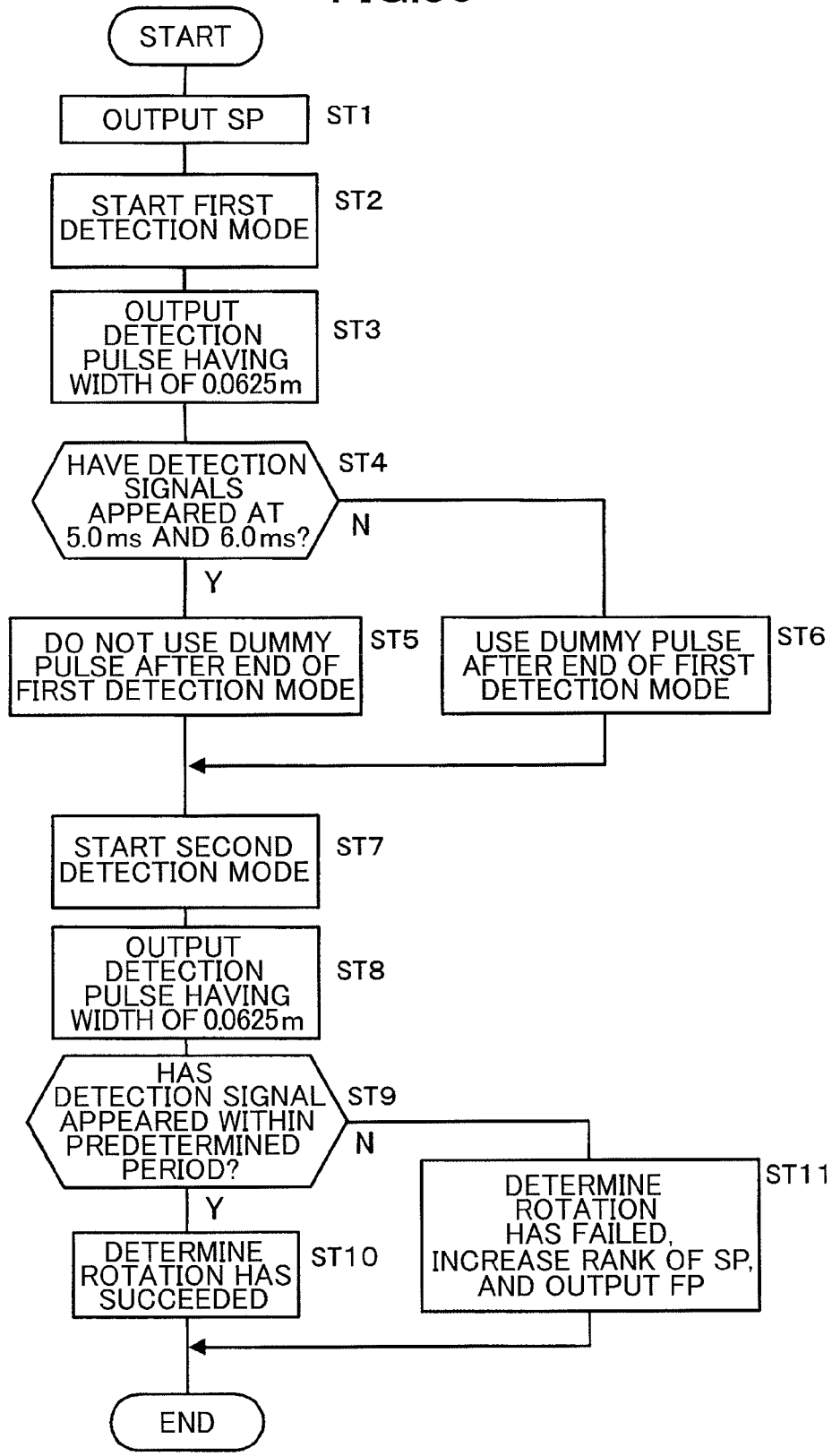
FIG. 50 is a flowchart of the electronic watch according to the ninth embodiment of the present invention.

The block diagram illustrating a circuit configuration of an electronic watch according to the ninth embodiment is the same as FIG. 35 corresponding to the block diagram illustrating the circuit configuration of the electronic watch according to the sixth embodiment, and hence FIG. 35 is referred to in the following. FIG. 48 are waveform diagrams of pulses that are generated by circuits of the electronic watch according to the ninth embodiment. FIG. 49 are waveform diagrams of current and voltage that are generated in a coil when a rotor 10 has succeeded in rotating in the case where an indicating hand having a large moment of inertia is attached to the electronic watch according to the ninth embodiment. FIG. 50 is a flowchart of the electronic watch according to the ninth embodiment. Note that the same components as those described in the conventional example and the first to eighth embodiments are denoted by the same numerals and further description is omitted.

A description regarding FIG. 35 is the same as that in the sixth embodiment. Refer to the sixth embodiment for overlapping parts. This embodiment is different from the sixth embodiment in that there are two kinds of the detection pulses generated by the first detection pulse generation circuit, one being normal detection pulses B5 to B12 having a smaller width of 0.0625 ms illustrated in FIG. 48(b) and the other being dummy pulses D5 to D12 having a larger width of 0.25 ms illustrated in FIG. 48(b2). The dummy pulses D5 to D12 are output every 1 ms from 5 ms after the second until 12 ms has elapsed since the second, whose output times are not different from those of the normal detection pulses B5 to B12. Also in this embodiment, the first detection mode determination circuit 12 serves also as the detection pulse change factor detection circuit 140.

The detection pulse selection circuit 156 selects the presence or absence of outputs of the dummy pulses generated by the first detection pulse generation circuit 5 based on the output of the first detection mode determination circuit 12, and controls the first detection pulse generation circuit 5. That is, the detection pulse selection circuit 156 is detection pulse control means for controlling the first detection pulse generation circuit 5 so that the presence or absence of outputs of the dummy pulses can be changed based on the output of the first detection mode determination circuit.

Subsequently, the operation of the above-mentioned configuration is described. The pulse selection circuit 7 selects, at the time of the second, a normal drive pulse output from the normal drive pulse generation circuit 3 and drives the stepper motor 20. After 5 ms from the second, the first detection mode is started. In the first detection mode, the pulse selection circuit 7 outputs the detection pulses, which are output from the first detection pulse generation circuit 5, and controls the stepper motor 20 so as to change the impedance of the coil 9. The detection circuit 11 then detects induced voltages that are generated in the coil 9 by the detection pulses B5 to B12, and outputs a detection signal when detecting an induced voltage exceeding a threshold Vth. The pulse selection circuit 7, on the other hand, instructs the first detection mode determination circuit 12 to start its determination operation. The first detection mode determination circuit 12 determines the presence or absence of the detection signal in the first detection mode based on the input of the detection signal from the detection circuit 11. When the detection signal has been generated from the detection circuit 11 twice, the first detection mode determination circuit 12 determines the detection and immediately stops the detection pulses output from the first detection pulse generation circuit 5 to notify the pulse selection circuit 7 so as to end the operation of the first detection mode and not to generate a correction drive pulse FP. The first detection mode determination circuit 12 further instructs the second detection mode determination circuit 13 to start its operation, to thereby shift to the second detection mode. However, when the detection pulses B5 to B12 have produced no detection signal at all, or only one detection signal, the first detection mode determination circuit 12 determines that the rotation has failed and ends the operation of the first detection mode. Then, without shifting to the second detection mode, the correction drive pulse FP is output, and when the next normal drive pulse is output, a normal drive pulse having the next higher-ranked driving power to the previous one is output from the normal drive pulse generation circuit 3.

Note that the first detection mode is sectioned into the first half containing the detection pulses B5 and B6 and the second half containing the other pulses, and whether or not to use the dummy pulses in the second half of the first detection mode is different depending on whether or not a detection result has been obtained in the first half of the first detection mode, that is, whether or not two detection signals have been obtained from the detection pulses B5 and B6. In other words, when detection signals has been generated from both of the detection pulses B5 and B6 contained in the first half of the first detection mode and accordingly the detection in the first detection mode has ended, the mode immediately shifts to the second detection mode, and the dummy pulses D5 to D12 are not used. As a result, the detection pulses to be output are all pulses having a smaller width of 0.0625 ms, and the electromagnetic brake acts. On the other hand, when the detection in the first half of the first detection mode has not ended, the probability of success of the rotation is high, and hence, in the second half of the first detection mode, the dummy pulses D5 to D12 having a larger width of 0.25 ms are output after the end of the rotation detection so that the electromagnetic brake is suppressed. In this embodiment, after the end of the rotation detection, that is, after two detection signals have been detected, two of the dummy pulses D5 to D12 corresponding to the next subsequent times are output, and then the mode shifts to the second detection mode.

After the shift to the second detection mode, the pulse selection circuit 7 outputs the detection pulses output from the second detection pulse generation circuit 6, and controls the stepper motor 20. The detection circuit 11 then detects induced voltages that are generated in the coil 9 by the detection pulses, and outputs a detection signal when detecting an induced voltage exceeding the threshold Vth. The second detection mode determination circuit 13 receives the detection signal of the detection circuit 11. When the detection signal has been generated twice, the second detection mode determination circuit 13 determines that the rotation has succeeded and immediately stops the detection pulses output from the second detection pulse generation circuit 6 to end the operation of the second detection mode, and further controls the pulse selection circuit 7 so as not to output the correction drive pulse FP. However, the detection of the detection signal generated by the detection pulses F7 to F14 is finished when the detection signal has been detected six times at most. If no detection signal, or only one detection signal, has been generated during the detection, it is determined that the rotation has failed and the correction drive pulse FP is output.

As described above, in the ninth embodiment, the first detection mode is divided into the first and second rotation detection periods, and whether or not to use the dummy pulses in the second rotation detection period is changed depending on whether or not the detection has ended in the first rotation detection period. That is, when two detection signals have been detected in the first rotation detection period, the mode immediately shifts to the second detection mode and no dummy pulse is used so that the electromagnetic brake is generated to suppress the free oscillation of the rotor 10. On the other hand, when two detection signals have been detected in the first rotation detection period, after two detection signals are detected in the second rotation detection period, two dummy pulses having a larger width of 0.25 ms are further output so that the electromagnetic brake acts less and the free oscillation of the rotor 10 is suppressed less.

An actual method of detecting the rotation through the above-mentioned operation is described with reference to FIGS. 48, 49, and 12. FIG. 49(a) is a waveform of a current that is induced in the coil 9 when an indicating hand having a large moment of inertia is attached, and illustrates the waveform obtained when the rotor 10 has succeeded in rotating. FIG. 49(b) is a waveform of a voltage generated at one terminal O1 of the coil 9 at this time and FIG. 49(c) is a waveform of a voltage generated at another terminal O2 of the coil 9.

First, as illustrated in FIG. 48(a), the normal drive pulse SP is applied to the terminal O1 of the coil 9 from the second, and the rotor rotates to generate a current waveform c1 illustrated in FIG. 49(a). At the time when 5 ms has elapsed from the second, the first detection mode is started, and the detection pulse B5 illustrated in FIG. 48(b) is applied to the coil 9, and after 1 ms, the detection pulse B6 is applied thereto. At this time, as illustrated in FIG. 49(a), the current waveform is in the region of a current waveform c2, in which the current value is negative, and hence, as illustrated in FIG. 49(c), the induced voltages V5 and V6 do not exceed the threshold Vth. No detection signal has been obtained in the first rotation detection period, that is, no detection signal has been obtained from the detection pulse B5 nor B6, and hence, in the second rotation detection period, the dummy pulses D7 to D12 illustrated in FIG. 36(b2) are controlled to be output after the end of the rotation detection made by the detection pulses B7 to B12 illustrated in FIG. 36(b).

Then, at the time when 7 ms has elapsed, the current waveform is in the region of a current waveform c3 illustrated in FIG. 49(a), in which the current value is positive. Accordingly, induced voltages V7 and V8 regarding the detection pulses B7 and B8 illustrated in FIG. 48(b) become detection signals exceeding the threshold Vth as illustrated in FIG. 49(c). Because the two detection signals of the induced voltages V7 and V8 have exceeded the threshold Vth, the rotation detection in the first detection mode has ended. However, in this example, the rotation detection has not ended in the first rotation detection period, and hence the dummy pulses illustrated in FIG. 48(b2) are subsequently output. Specifically, the dummy pulse D9 is output at the time when 9 ms has elapsed from the second, which is the time next to the time at which the rotation detection has ended. At the time after 1 ms therefrom, the dummy pulse D10 is further output. In this case, the dummy pulses D9 and D10 have a larger width of 0.25 ms, and hence the electromagnetic brake acts less and the free oscillation of the rotor 10 is suppressed less. Accordingly, the subsequent current waveform is less flattened so that the rotation of the rotor 10 is accurately detected more easily. Because the two dummy pulses D9 and D10 have been output, the mode shifts to the second detection mode. Note that induced voltages obtained by the dummy pulses D9 and D10 are not used as detection targets of detection signals of the detection circuit 11, and hence, in FIG. 49(c), the induced voltages are indicated by broken lines for discrimination from the induced voltages used as detection targets (in FIG. 49(c), to show their large pulse widths, the induced voltages are illustrated as if the segments are stacked in the vertical direction).

Then, in response to the shift to the second detection mode, after the subsequent time of 11 ms from the second, the detection pulse F11 illustrated in FIG. 48(c) is applied to the coil 9. At this time, as illustrated in FIG. 41(a), the current waveform is in the region c3, in which the current value is positive. Accordingly, the induced voltage V11 obtained by the detection pulse F11 does not exceed the threshold Vth as illustrated in FIG. 49(b). When 12 ms has elapsed from the second, a region c4 appears in the current waveform as illustrated in FIG. 49(a) because, as described above, the electromagnetic brake is weakened in the first detection mode so that the free oscillation of the rotor 10 is suppressed less. This current value is negative, and hence the detection signals V12 and V13 exceeding the threshold Vth are obtained with respect to the detection pulses F12 and F13 of FIG. 48(c) as illustrated in FIG. 49(b). Accordingly, the second detection mode determination circuit 13 normally determines that the rotation has succeeded. Then, the correction drive pulse FP is not output, and when the next normal drive pulse is output, the normal drive pulse SP having the same driving power as the previous one is output.

On the other hand, the operation performed when the rotor 10 has failed to rotate is as follows. In the ninth embodiment, waveform diagrams of current and voltage that are generated in the coil when the rotor 10 has failed to rotate are the same as FIG. 12 corresponding to the waveform diagrams of current and voltage that are generated in the coil when the rotor 10 has failed to rotate in the second embodiment, and hence FIG. 12 are referred to in the following description. FIG. 12(a) is a waveform of a current that is induced in the coil 9 in this case when an indicating hand having a large moment of inertia is attached. FIG. 12(b) is a waveform of a voltage generated at one terminal O1 of the coil 9 at this time and FIG. 12(c) is a waveform of a voltage generated at another terminal O2 of the coil 9.

First, as illustrated in FIG. 48(a), the normal drive pulse SP is applied to the terminal O1 of the coil 9 from the second, and the current waveform c1 illustrated in FIG. 12(a) is generated. At the time when 5 ms has elapsed from the second, the first detection mode is started, and the detection pulse B5 illustrated in FIG. 48(b) is applied to the coil 9 and, after 1 ms, the detection pulse B6 is applied thereto. At this time, because the rotor 10 has failed to rotate, the current waveform c5 illustrated in FIG. 12(a) in which the current value is positive appears. Accordingly, as illustrated in FIG. 12(c), the induced voltages V5 and V6 exceed the threshold Vth. The rotation detection has ended in the first rotation detection period, that is, the two detection signals of the induced voltages V5 and V6 have been obtained from the detection pulses B5 and B6, and hence the dummy pulses illustrated in FIG. 48(b2) are not used and the mode immediately shifts to the second detection mode.

In the subsequent second detection mode, the detection pulse F7 illustrated in FIG. 48(c) having a smaller width of 0.0625 ms is applied to the coil 9 at the time when 7 ms has elapsed from the second. At this time, as illustrated in FIG. 12(a), the current waveform is in the region c5, in which the current value is positive, and hence the induced voltage V7 never exceeds the threshold Vth. Subsequently, the detection pulses F8 to F12 illustrated in FIG. 48(c) are similarly applied to the coil 9 every 1 ms. At this time, throughout the first detection mode and the second detection mode, the detection pulses applied to the coil all have a smaller width of 0.0625 ms, and hence the electromagnetic brake is easily generated and the free oscillation of the rotor 10 is suppressed. Accordingly, at the time beyond the region c5 of the current waveform, the rotor 10 almost stops, and as illustrated in FIG. 12(a), does not exhibit a current value in the negative direction. Therefore, as illustrated in FIG. 12(b), the induced voltages V8 to V12 obtained from the detection pulses F8 to F12 do not exceed the threshold Vth, either.

The second detection mode is terminated because two detection signals exceeding the threshold Vth have not been obtained during the six detections by the detection pulses F7 to F12. Accordingly, the second detection mode determination circuit 13 normally determines that the rotation has failed. Then, the correction drive pulse FP is output, and when the next normal drive pulse is output, the normal drive pulse SP2 having the next higher-ranked driving power to the previous one is output from the normal drive pulse generation circuit 3. Therefore, the clock never stops.

As described above, in the ninth embodiment, the first detection mode is divided into the first and second rotation detection periods, and whether or not to use the dummy pulses is changed depending on whether or not the rotation detection has ended in the first rotation detection period, utilizing the timing difference that, when the rotor 10 has succeeded in rotating, a detection signal exceeding the threshold Vth in the first detection mode is obtained at a delayed time, while when the rotation has failed, a detection signal exceeding the threshold Vth in the first detection mode is obtained immediately after the normal drive pulse SP. Therefore, when the rotation has succeeded, the electromagnetic brake is weakened to suppress the increase in consumption power resulting from erroneous detection, while when the rotation has failed, the electromagnetic brake is enabled so as to prevent erroneous determination that the rotation has succeeded.

The above-mentioned operation is described with reference to a flowchart. FIG. 50 is a flowchart illustrating the method of detecting the rotation of the rotor 10 in the electronic watch according to the ninth embodiment, and illustrates the operation performed every second, on the second. The normal drive pulse SP is output at the time of the second (Step ST1), and the rotation detection in the first detection mode is started after 5 ms has elapsed since the second (Step ST2). In the first detection mode, at the times of 5.0 ms and 6.0 ms from the second, the detection pulses having a width of 0.0625 ms are output (Step ST3). In this case, depending on whether or not a detection signal appears at 5.0 ms and 6.0 ms, the setting of whether to use dummy pulses after the end of the first detection mode is different (Step ST4). When detection signals have appeared at the times of 5.0 ms and 6.0 ms, no dummy pulse is output after the end of the first detection mode (Step ST5). When no detection signal has appeared at the times of 5.0 ms and 6.0 ms, the dummy pulses are output after the end of the first detection mode (Step ST6). After the start of the second detection mode (Step ST7), the detection pulse having a width of 0.0625 ms is output (Step ST8). It is determined whether a detection signal has been detected within a predetermined period (Step ST9). When a detection signal has been detected, it is determined that the rotation has succeeded. Then, the correction drive pulse FP is not output, and when the next normal drive pulse is output, the normal drive pulse SP having the same driving power as the previous one is output (Step ST10). When a detection signal has not been detected within the predetermined period, it is determined that the rotation has failed, and then the correction drive pulse FP is output, and at the same time, a normal drive pulse having the next higher-ranked driving power is output from the next second (Step ST11). This step completes the operation for the second concerned, and the operation is restarted from the beginning after waiting for the next second.

Note that the above description is illustrative of this embodiment, and various modifications are possible. For example, the width, the timing, and the number of outputs of the dummy pulses and other such factors may be changed. Further, it may be determined whether or not to use the dummy pulses based on whether or not a detection signal has been obtained in the first half of the first detection mode, instead of based on whether or not the rotation detection has ended in the first half of the first detection mode.

As described above, the respective embodiments of the present invention have the common features that the pulse width or frequency of the detection pulses output from the detection pulse generation circuit is controlled to be changed in accordance with the detection signal from detection pulse change factor detecting means. It follows that the pulse width or frequency of the detection pulses is dynamically changed in accordance with the factors such as the elapsed time from the second, the detection state of rotation detecting means, and the power supply voltage. In other words, for example, in the case of an electronic watch which is configured to change the width or frequency of the detection pulses for detecting the rotation of the rotor, but whose pulse width or frequency is fixed to a given value by initial setting such as adjustment at the factory, such electronic watch is not subject to the change of the pulse width or frequency of the detection pulses output from the detection pulse generation circuit in accordance with the detection signal from the detection pulse change factor detecting means.

The embodiments of the present invention have been described above in detail with reference to the drawings, but the embodiments are each merely illustrative of the present invention and the present invention is not intended to be limited to the configuration of the embodiments. It should be therefore understood that design variations without departing from the gist of the present invention are encompassed in the present invention.

For example, the block diagrams illustrated in FIGS. 3, 8, 13, 17, 31, 35, and 40 are illustrative, and other configurations are also possible as long as the above-mentioned operation is performed. The method of configuring the system of the block diagram may be either control by random logic or control by a microcomputer. Another configuration in which the pulse selection circuit 7 is constituted by a microcomputer while the other circuits are constituted by random logic is also possible. Such a configuration facilitates changes for application to various models.

Note that, in the embodiments described above, in order to drive the motor with minimum effective electric power, the driving power is reduced to the next lower-ranked driving power when the rotation is normally detected about 256 times by normal drive pulses of the same ranks.

Further, the current waveform changes its waveform, that is, its output level or temporal response changes, depending on the electric characteristics of the stepper motor, the voltage value of a drive pulse, and the like. However, the effects of the embodiments can be obtained irrespective of the current waveform as long as the number of determinations by the first detection pulse, the number of determinations by the second detection pulse, the number of detections counted for terminating the second detection mode (the output number of the second detection pulses), the threshold Vth, and other such factors in the embodiments are set to appropriate values in accordance with the current waveform.

The invention claimed is:

1. An electronic watch, comprising:
a stepper motor including a rotor and a coil;
a motor driver for driving the stepper motor;
a reference signal generation circuit for outputting various kinds of timing signals;
a pulse shaping circuit for generating various kinds of pulse signals for driving the stepper motor, in response to the various kinds of timing signals output from the reference signal generation circuit;
a pulse selection circuit for selecting various kinds of pulses supplied from the pulse shaping circuit and outputting the selected pulses to the motor driver; and
a rotation detection circuit for detecting whether the rotor has rotated or not based on counter-electromotive force resulting from free oscillation of the rotor,
the pulse shaping circuit comprising:
a normal drive pulse generation circuit for outputting a normal drive pulse at a time of driving the stepper motor;
a detection pulse generation circuit for outputting, at a predetermined time after the normal drive pulse is output, a detection pulse for causing the rotation detection circuit to perform rotation detection; and
a correction drive pulse generation circuit for outputting a correction drive pulse when the rotation detection circuit detects that the rotor has not rotated,
wherein the electronic watch further comprises a detection pulse change factor detector configured to detect a factor of changing a pulse width of the detection pulse, and output a detection signal,
wherein the detection pulse generation circuit is capable of changing the pulse width of the detection pulse, and wherein the detection pulse generation circuit changes the pulse width of the detection pulse to be output, in accordance with the detection signal of the detection pulse change factor detector.

2. The electronic watch according to claim 1,
wherein the motor driver includes drive terminals for outputting the various kinds of pulses in order to drive the stepper motor,
wherein the rotation detection circuit receives a signal of the drive terminal as an input, and
wherein the counter-electromotive force becomes detectable when the drive terminals are set to have high impedance by the detection pulse.

3. The electronic watch according to claim 1, wherein the detection pulse change factor detector comprises an elapsed time counter for measuring an elapsed time from an output time of the normal drive pulse and outputting a detection signal after a predetermined period has elapsed.

4. The electronic watch according to claim 3, wherein the detection pulse generation circuit is capable of generating a first detection pulse and a second detection pulse, the first detection pulse having a pulse width which is changed in accordance with the detection signal from the elapsed time counter, the second detection pulse having a fixed pulse width.

5. The electronic watch according to claim 4,
wherein the first detection pulse is used in a first detection mode performed after the normal drive pulse is output, and
wherein the second detection pulse is used in a second detection mode performed after the first detection mode.

6. The electronic watch according to claim 1,
wherein the detection pulse change factor detector comprises the rotation detection circuit, and
wherein the detection pulse generation circuit selects the pulse width of the detection pulse depending on a detection state of the rotation detection circuit.

7. The electronic watch according to claim 6,
wherein the rotation detection circuit outputs a detection signal in accordance with a detection state from when the normal drive pulse is output until a predetermined timing, and
wherein the detection pulse generation circuit is capable of generating a first detection pulse and a second detection pulse, the first detection pulse having a pulse width which is changed in accordance with the detection signal from the rotation detection circuit, the second detection pulse having a fixed pulse width.

8. The electronic watch according to claim 7, wherein the rotation detection circuit outputs a detection signal based on the second detection pulse.

9. The electronic watch according to claim 7, wherein the first detection pulse is changed in pulse width based on a detection result of a first detection mode performed after the normal drive pulse is output, and is used in the first detection mode ongoingly.

10. The electronic watch according to claim 1, further comprising a power supply and a power supply voltage detection circuit for detecting an output voltage of the power supply,
wherein the detection pulse change factor detector comprises the power supply voltage detection circuit.

11. The electronic watch according to claim 1,
wherein the normal drive pulse generation circuit is capable of outputting a plurality of kinds of the normal drive pulses, wherein the control circuit includes a normal drive pulse width selector configured to output a normal drive pulse width selection signal for selecting a normal drive pulse having an appropriate pulse width, wherein the detection pulse change factor detector comprises the normal drive pulse width selector, and wherein the detection pulse generation circuit changes the pulse width of the detection pulse in response to the normal drive pulse width selection signal.

12. An electronic watch, comprising:
a stepper motor including a rotor and a coil;
a motor driver for driving the stepper motor;
a reference signal generation circuit for outputting various kinds of timing signals;
a pulse shaping circuit for generating various kinds of pulse signals for driving the stepper motor, in response to the various kinds of timing signals output from the reference signal generation circuit;
a pulse selection circuit for selecting various kinds of pulses supplied from the pulse shaping circuit and outputting the selected pulses to the motor driver; and
a rotation detection circuit for detecting whether the rotor has rotated or not based on counter-electromotive force resulting from free oscillation of the rotor,
the pulse shaping circuit comprising:
  a normal drive pulse generation circuit for outputting a normal drive pulse at a time of driving the stepper motor;
  a detection pulse generation circuit for outputting, at a predetermined time after the normal drive pulse is output, a detection pulse for causing the rotation detection circuit to perform rotation detection; and
  a correction drive pulse generation circuit for outputting a correction drive pulse when the rotation detection circuit detects that the rotor has not rotated,
wherein the detection pulse generation circuit comprises detection pulse change factor detector capable of generating a dummy pulse which sets the drive terminals to have high impedance but is not used for detection, for detecting a factor of generating the dummy pulse, and outputting a detection signal, and wherein the detection pulse generation circuit determines presence or absence of an output of the dummy pulse based on a detection result of the detection pulse change factor detector.

13. The electronic watch according to claim 12,
wherein the detection pulse change factor detector comprises the rotation detection circuit,
wherein the rotation detecting circuit outputs a detection signal in accordance with a detection state from when the normal drive pulse is output until a predetermined time, and
wherein the detection pulse generation circuit is capable of generating a first detection pulse and a second detection pulse, the first detection pulse having a pulse frequency which is changed when the dummy pulse is output in accordance with the detection signal from the rotation detection circuit, the second detection pulse having a fixed pulse frequency.

14. The electronic watch according to claim 12,
wherein the detection pulse change factor detector comprises the rotation detection circuit,
wherein the rotation detection circuit outputs a detection signal in accordance with a detection state from when the normal drive pulse is output until a predetermined time,
wherein the detection pulse generation circuit is capable of generating a first detection pulse and a second detection pulse which has a fixed pulse width, and
wherein, after rotation detection made by the first detection pulse is finished, the detection pulse generation circuit further outputs the first detection pulse having a pulse width changed in accordance with the detection signal from the rotation detection circuit.

\* \* \* \* \*